(12) United States Patent
Stover

(10) Patent No.: US 11,667,549 B2
(45) Date of Patent: Jun. 6, 2023

(54) OSMOTIC METHODS AND SYSTEMS INVOLVING ENERGY RECOVERY

(71) Applicant: Gradiant Corporation, Woburn, MA (US)

(72) Inventor: Richard Stover, Waltham, MA (US)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 17/882,701

(22) Filed: Aug. 8, 2022

(65) Prior Publication Data

US 2022/0380233 A1 Dec. 1, 2022

Related U.S. Application Data

(63) Continuation of application No. PCT/US2021/059441, filed on Nov. 16, 2021.
(Continued)

(51) Int. Cl.
*C02F 1/44* (2023.01)
*C02F 1/26* (2023.01)
(Continued)

(52) U.S. Cl.
CPC .............. *C02F 1/441* (2013.01); *B01D 61/06* (2013.01); *C02F 1/265* (2013.01); *B01D 61/026* (2022.08);
(Continued)

(58) Field of Classification Search
CPC ............ B01D 2317/022; B01D 61/026; B01D 61/06; C02F 1/265; C02F 1/441; C02F 2301/066; C02F 2303/10; Y02A 20/131
See application file for complete search history.

(56) References Cited

U.S. PATENT DOCUMENTS 2,151,990 A 3/1939 Ruys
2,606,820 A 8/1952 Harms
(Continued)

FOREIGN PATENT DOCUMENTS

AU 4665972 A 3/1974
CA 2816746 A1 11/2012
(Continued)

OTHER PUBLICATIONS

Invitation to Pay Additional Fees for International Application No. PCT/US2021/059441 dated Jan. 19, 2022.
(Continued)

*Primary Examiner* — Terry K Cecil
(74) *Attorney, Agent, or Firm* — Wolf, Greenfield & Sacks, P.C.

(57) ABSTRACT

Liquid solution concentration methods and related systems involving osmosis units and energy recovery are generally described. In some embodiments, an osmotic system has a pump, a first reverse osmosis unit, a second reverse osmosis unit, and one or more energy recovery devices. Various embodiments are directed to features such as balancing streams, recirculation streams, and/or valving that alone or in combination may afford improved energy efficiency and/or system performance. Some embodiments may improve performance of certain types of energy recovery devices in combination with osmosis units, such as isobaric or turbine energy recovery devices.

51 Claims, 21 Drawing Sheets

Related U.S. Application Data

(60) Provisional application No. 63/114,643, filed on Nov. 17, 2020, provisional application No. 63/114,656, filed on Nov. 17, 2020, provisional application No. 63/114,648, filed on Nov. 17, 2020, provisional application No. 63/114,652, filed on Nov. 17, 2020.

(51) Int. Cl.
    *B01D 61/06*       (2006.01)
    *B01D 61/02*       (2006.01)

(52) U.S. Cl.
    CPC .. *B01D 2317/022* (2013.01); *C02F 2301/066* (2013.01); *C02F 2303/10* (2013.01)

(56) References Cited

U.S. PATENT DOCUMENTS

| | | |
|---|---|---|
| 2,606,839 A | 8/1952 | Evans |
| 2,640,018 A | 5/1953 | Heath |
| 2,675,173 A | 4/1954 | Jendrassik |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,472,766 A | 10/1969 | Rosenbaum |
| 3,475,331 A | 10/1969 | McLain |
| 3,489,652 A | 1/1970 | Williamson |
| 3,625,761 A | 12/1971 | Tate |
| 3,630,378 A | 12/1971 | Bauman |
| 3,725,209 A | 4/1973 | Rosa |
| 3,906,250 A | 9/1975 | Loeb |
| 3,922,154 A | 11/1975 | Kawasaki et al. |
| 3,926,739 A | 12/1975 | Izumi |
| 4,062,197 A | 12/1977 | Hester |
| 4,105,547 A | 8/1978 | Sandblom |
| 4,156,645 A | 5/1979 | Bray |
| 4,224,148 A | 9/1980 | Lindman et al. |
| 4,251,367 A | 2/1981 | Santora |
| 4,312,755 A | 1/1982 | Hwang |
| 4,334,886 A | 6/1982 | Tani et al. |
| 4,358,377 A | 11/1982 | Clark |
| 4,452,696 A | 6/1984 | Lopez |
| 4,478,719 A | 10/1984 | Michele et al. |
| 4,511,436 A | 4/1985 | el Din Nasser |
| 4,563,337 A | 1/1986 | Kim |
| 4,574,049 A | 3/1986 | Pittner |
| 4,576,724 A | 3/1986 | Colman et al. |
| 4,652,373 A | 3/1987 | Trimmer |
| 4,704,324 A | 11/1987 | Davis et al. |
| 4,708,805 A | 11/1987 | D'Muhala |
| 4,735,722 A | 4/1988 | Krepak |
| 4,755,298 A | 7/1988 | Grinstead |
| 4,765,897 A | 8/1988 | Cadotte et al. |
| 4,769,148 A | 9/1988 | Fibiger et al. |
| 4,770,775 A | 9/1988 | Lopez |
| 4,797,187 A | 1/1989 | Davis et al. |
| 4,806,244 A | 2/1989 | Guilhem |
| 4,812,238 A | 3/1989 | Cadotte et al. |
| 4,824,574 A | 4/1989 | Cadotte et al. |
| 4,828,700 A | 5/1989 | Fibiger et al. |
| 4,832,115 A | 5/1989 | Albers et al. |
| 4,839,203 A | 6/1989 | Davis et al. |
| 4,843,828 A | 7/1989 | Gladman |
| 4,859,338 A | 8/1989 | Behr |
| 4,859,384 A | 8/1989 | Fibiger et al. |
| 4,887,942 A | 12/1989 | Hauge |
| 4,894,165 A | 1/1990 | Fibiger et al. |
| 4,909,943 A | 3/1990 | Fibiger et al. |
| 4,927,540 A | 5/1990 | Wessling et al. |
| 4,941,972 A | 7/1990 | Kau et al. |
| 4,944,882 A | 7/1990 | Ray et al. |
| 4,956,157 A | 9/1990 | Nasu |
| 4,957,817 A | 9/1990 | Chau et al. |
| 4,959,237 A | 9/1990 | Walker |
| 4,973,201 A | 11/1990 | Paul et al. |
| 4,980,063 A | 12/1990 | Mahoney et al. |
| 4,980,077 A | 12/1990 | Morris et al. |
| 4,981,593 A | 1/1991 | Priestley et al. |
| 4,992,485 A | 2/1991 | Koo et al. |
| 5,015,391 A | 5/1991 | Mohn |
| 5,053,132 A | 10/1991 | Sirkar |
| 5,096,590 A | 3/1992 | Watanabe et al. |
| 5,123,481 A | 6/1992 | Albers et al. |
| 5,167,828 A | 12/1992 | Emmons et al. |
| 5,190,656 A | 3/1993 | Paul et al. |
| 5,207,916 A | 5/1993 | Goheen et al. |
| 5,225,087 A | 7/1993 | Kardos |
| 5,238,574 A | 8/1993 | Kawashima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,490,937 A | 2/1996 | van Reis et al. |
| 5,503,750 A | 4/1996 | Russo, Jr. et al. |
| 5,656,161 A | 8/1997 | Solomon et al. |
| 5,670,053 A | 9/1997 | Collentro et al. |
| 5,840,195 A | 11/1998 | Delsalle et al. |
| 5,873,260 A | 2/1999 | Linhardt et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,190,558 B1 | 2/2001 | Robbins |
| 6,270,671 B1 | 8/2001 | Shorr et al. |
| 6,299,766 B1 | 10/2001 | Permar |
| 6,319,409 B1 | 11/2001 | Saitou et al. |
| 6,416,668 B1 | 7/2002 | Al-Samadi |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,547,965 B1 | 4/2003 | Chancellor |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick, Jr. et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot, Jr. |
| 7,225,620 B2 | 6/2007 | Klausner et al. |
| 7,303,666 B1 | 12/2007 | Mitsis |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |
| 7,628,921 B2 | 12/2009 | Efraty |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |

(56) References Cited

U.S. PATENT DOCUMENTS

| | | |
|---|---|---|
| 8,119,007 B2 | 2/2012 | Bajpayee et al. |
| 8,147,696 B1 | 4/2012 | Pandya |
| 8,152,999 B2 | 4/2012 | Lightfoot, Jr. et al. |
| 8,197,693 B2 | 6/2012 | Al-Jlil |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,496,234 B1 | 7/2013 | Govindan et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,647,477 B2 | 2/2014 | Govindan et al. |
| 8,678,080 B2 | 3/2014 | Curole et al. |
| 8,679,347 B2 | 3/2014 | Al-Samadi |
| 8,695,343 B2 | 4/2014 | Moe |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,206,060 B1 | 12/2015 | Abusharkh |
| 9,221,694 B1 | 12/2015 | Govindan et al. |
| 9,266,748 B1 | 2/2016 | Govindan et al. |
| 9,266,762 B2 | 2/2016 | Wang et al. |
| 9,314,742 B2 | 4/2016 | Goodfellow |
| 9,427,705 B1 | 8/2016 | Abusharkh |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,179 B2 | 4/2017 | Govindan et al. |
| 9,700,811 B2 | 7/2017 | Govindan et al. |
| 9,751,045 B2 | 9/2017 | Wohlert |
| 9,950,297 B2 | 4/2018 | Chang et al. |
| 9,957,180 B2 | 5/2018 | Govindan et al. |
| 9,969,638 B2 | 5/2018 | Govindan et al. |
| 10,245,555 B2 | 4/2019 | St. John et al. |
| 10,258,926 B2 | 4/2019 | Thiel et al. |
| 10,308,524 B1 | 6/2019 | Ahmed et al. |
| 10,518,221 B2 | 12/2019 | Choong et al. |
| 10,888,820 B2 | 1/2021 | Govindan et al. |
| 10,940,439 B1 | 3/2021 | Ahmed et al. |
| 10,953,367 B2 | 3/2021 | Chang |
| 11,230,479 B2 * | 1/2022 | Mack .................... B01D 61/02 |
| 2002/0108907 A1 | 8/2002 | Van Reis |
| 2003/0106860 A1 | 6/2003 | Peloquin et al. |
| 2003/0132166 A1 | 7/2003 | Rey |
| 2003/0178367 A1 | 9/2003 | van Reis |
| 2004/0187897 A1 | 9/2004 | Kenowski et al. |
| 2005/0023222 A1 | 2/2005 | Baillie |
| 2006/0127550 A1 | 6/2006 | Kawana et al. |
| 2006/0144787 A1 | 7/2006 | Schmidt et al. |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | Willem Cornelis den Boestert et al. |
| 2007/0181480 A1 | 8/2007 | Lee |
| 2007/0235391 A1 | 10/2007 | Ylikangas et al. |
| 2007/0246406 A1 | 10/2007 | Dibel et al. |
| 2008/0023333 A1 | 1/2008 | Johnson |
| 2008/0073200 A1 | 3/2008 | Godshall et al. |
| 2008/0102119 A1 | 5/2008 | Grovender et al. |
| 2008/0116134 A1 | 5/2008 | Cartwright |
| 2008/0121585 A1 | 5/2008 | Mavis |
| 2008/0164206 A1 | 7/2008 | Dueker |
| 2008/0237110 A1 | 10/2008 | Lightfoot et al. |
| 2008/0245737 A1 | 10/2008 | Coulter |
| 2008/0277344 A1 | 11/2008 | SenGupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0173690 A1 | 7/2009 | Oklejas, Jr. |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0132386 A1 | 6/2010 | Bahar |
| 2010/0163471 A1 | 7/2010 | Elyanow et al. |
| 2010/0163472 A1 | 7/2010 | Thiers et al. |
| 2010/0234795 A1 | 9/2010 | Wallenas |
| 2010/0242995 A1 | 9/2010 | Xiong et al. |
| 2010/0282675 A1 | 11/2010 | SenGupta et al. |
| 2010/0294718 A1 | 11/2010 | Treyvaud |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056822 A1 | 3/2011 | Elsharqawy et al. |
| 2011/0056878 A1 | 3/2011 | Matsushiro et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0203929 A1 | 8/2011 | Buckley et al. |
| 2011/0215039 A1 | 9/2011 | Acernese et al. |
| 2011/0233137 A1 | 9/2011 | Cath et al. |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067819 A1 | 3/2012 | McGinnis |
| 2012/0067820 A1 | 3/2012 | Henthorne et al. |
| 2012/0090833 A1 | 4/2012 | Ligthelm et al. |
| 2012/0091061 A1 | 4/2012 | Al-Jlil |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0174639 A1 | 7/2012 | Herron |
| 2012/0199524 A1 | 8/2012 | Bly, Jr. et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | SenGupta et al. |
| 2012/0267307 A1 | 10/2012 | McGinnis |
| 2012/0273417 A1 | 11/2012 | McGinnis et al. |
| 2012/0273422 A1 | 11/2012 | Wohlert |
| 2012/0279396 A1 | 11/2012 | Brammer et al. |
| 2012/0285886 A1 | 11/2012 | Liberman |
| 2012/0292259 A1 | 11/2012 | Marcin |
| 2012/0312755 A1 | 12/2012 | Ryan et al. |
| 2012/0318729 A1 | 12/2012 | Yip et al. |
| 2013/0008079 A1 | 1/2013 | Chung et al. |
| 2013/0043190 A1 | 2/2013 | Al-Samadi |
| 2013/0056193 A1 | 3/2013 | Thiers |
| 2013/0074694 A1 | 3/2013 | Govindan et al. |
| 2013/0075098 A1 | 3/2013 | Janjua et al. |

(56) References Cited

U.S. PATENT DOCUMENTS

| | | |
|---|---|---|
| 2013/0075940 A1 | 3/2013 | Govindan et al. |
| 2013/0087501 A1 | 4/2013 | Moe et al. |
| 2013/0092622 A1 | 4/2013 | Kas et al. |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0186822 A1 | 7/2013 | Herron et al. |
| 2013/0193074 A1 | 8/2013 | Voigt et al. |
| 2013/0199921 A1 | 8/2013 | McGovern |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0256228 A1 | 10/2013 | Bharwada et al. |
| 2013/0318743 A1 | 12/2013 | Chinta et al. |
| 2014/0008291 A1 | 1/2014 | Tang et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Frank |
| 2014/0069821 A1 | 3/2014 | Marcin et al. |
| 2014/0116956 A1 | 5/2014 | Yuan et al. |
| 2014/0197022 A1 | 7/2014 | Antar et al. |
| 2014/0197029 A1 | 7/2014 | Sparrow et al. |
| 2014/0224716 A1 | 8/2014 | Hancock et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083577 A1 | 3/2015 | Govindan et al. |
| 2015/0083656 A1 | 3/2015 | Williams |
| 2015/0107840 A1 | 4/2015 | Ligthelm et al. |
| 2015/0107841 A1 | 4/2015 | Suijkerbuijk et al. |
| 2015/0114905 A1 | 4/2015 | Subbiah et al. |
| 2015/0129410 A1 | 5/2015 | Govindan et al. |
| 2015/0136699 A1 | 5/2015 | Wohlert |
| 2015/0251930 A1 | 9/2015 | Dufresne et al. |
| 2015/0353397 A1 | 12/2015 | Cath et al. |
| 2015/0367285 A1 | 12/2015 | Chang et al. |
| 2016/0001235 A1 | 1/2016 | Frisk |
| 2016/0009582 A1 | 1/2016 | Heimel et al. |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2016/0339390 A1 | 11/2016 | Abusharkh |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |
| 2017/0216774 A1 | 8/2017 | Warsinger et al. |
| 2017/0349467 A1 | 12/2017 | Blohm et al. |
| 2018/0008919 A1 | 1/2018 | Tierney, III |
| 2018/0036682 A1 | 2/2018 | Nicoll et al. |
| 2018/0104649 A1 | 4/2018 | Govindan et al. |
| 2018/0169583 A1 | 6/2018 | Wohlert |
| 2018/0236372 A1 | 8/2018 | Govindan et al. |
| 2018/0236406 A1 | 8/2018 | St. John et al. |
| 2018/0244545 A1 | 8/2018 | St. John et al. |
| 2019/0054421 A1 | 2/2019 | Wei et al. |
| 2019/0176088 A1 | 6/2019 | Wohlert |
| 2019/0224624 A1 | 7/2019 | Kitamura et al. |
| 2019/0322548 A1 | 10/2019 | Mack et al. |
| 2020/0086274 A1 | 3/2020 | Benton et al. |
| 2020/0147554 A1 | 5/2020 | Choong et al. |
| 2020/0308037 A1 | 10/2020 | Alamoudi et al. |
| 2020/0331777 A1 | 10/2020 | Korpiel et al. |
| 2021/0179452 A1 | 6/2021 | Stover et al. |

FOREIGN PATENT DOCUMENTS

| | | |
|---|---|---|
| CA | 2821453 A1 | 11/2012 |
| CA | 2821458 A1 | 11/2012 |
| CA | 2779732 A1 | 12/2012 |
| CA | 2818055 A1 | 8/2013 |
| CN | 1623936 A | 6/2005 |
| CN | 1835892 A | 9/2006 |
| CN | 1856447 A | 11/2006 |
| CN | 100999364 A | 7/2007 |
| CN | 101056693 A | 10/2007 |
| CN | 101397152 A | 4/2009 |
| CN | 101417208 A | 4/2009 |
| CN | 101636354 A | 1/2010 |
| CN | 101717161 A | 6/2010 |
| CN | 102036739 A | 4/2011 |
| CN | 102143786 A | 8/2011 |
| CN | 102258942 A | 11/2011 |
| CN | 102363101 A | 2/2012 |
| CN | 102438957 A | 5/2012 |
| CN | 102725236 A | 10/2012 |
| CN | 102933507 A | 2/2013 |
| DE | 2145861 C2 | 6/1973 |
| DE | 102012017860 A1 | 5/2014 |
| EP | 0 070 059 A1 | 1/1983 |
| EP | 0 207 390 A1 | 1/1987 |
| EP | 0 253 287 A1 | 1/1988 |
| EP | 0 623 561 A1 | 11/1994 |
| EP | 1 775 267 A2 | 4/2007 |
| EP | 2 216 299 A1 | 8/2010 |
| FR | 1582201 A | 9/1969 |
| FR | 2561637 A1 | 9/1985 |
| GB | 821939 A | 10/1959 |
| GB | 1013767 A | 12/1965 |
| GB | 1036920 A | 7/1966 |
| GB | 1 320 429 A | 6/1973 |
| GB | 1324031 A | 7/1973 |
| GB | 1444241 A | 7/1976 |
| GB | 2395946 A | 6/2004 |
| JP | S53-58974 A | 5/1978 |
| JP | S55-147199 A | 11/1980 |
| JP | H05-208199 A | 8/1993 |
| JP | H06-233 B2 | 1/1994 |
| JP | 2001-046842 A | 2/2001 |
| JP | 2002-001068 A | 1/2002 |
| JP | 2014-133189 A | 7/2014 |
| JP | 2016-016384 A | 2/2016 |
| JP | 2018-001111 A | 1/2018 |
| KR | 101229482 B1 | 2/2013 |
| KR | 20130074104 A | 7/2013 |
| WO | WO 95/27683 A1 | 10/1995 |
| WO | WO 00/00273 A1 | 1/2000 |
| WO | WO 01/14256 A1 | 3/2001 |
| WO | WO 02/32813 A1 | 4/2002 |
| WO | WO 2005/012185 A1 | 2/2005 |
| WO | WO 2007/128062 A1 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2008/137082 A1 | 11/2008 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/148911 A2 | 11/2012 |
| WO | WO 2012/159203 A1 | 11/2012 |
| WO | WO 2013/012548 A1 | 1/2013 |
| WO | WO 2013/037047 A1 | 3/2013 |
| WO | WO 2013/057328 A1 | 4/2013 |
| WO | WO 2013/078124 A1 | 5/2013 |

(56) References Cited

FOREIGN PATENT DOCUMENTS

| | | |
|---|---|---|
| WO | WO 2013/158315 A1 | 10/2013 |
| WO | WO 2013/159220 A1 | 10/2013 |
| WO | WO 2013/172605 A1 | 11/2013 |
| WO | WO 2014/058696 A1 | 4/2014 |
| WO | WO 2014/088826 A1 | 6/2014 |
| WO | WO 2014/121153 A2 | 8/2014 |
| WO | WO 2014/144704 A1 | 9/2014 |
| WO | WO 2014/144778 A1 | 9/2014 |
| WO | WO 2014/150848 A1 | 9/2014 |
| WO | WO 2014/162094 A2 | 10/2014 |
| WO | WO 2014/188450 A1 | 11/2014 |
| WO | WO 2014/200829 A1 | 12/2014 |
| WO | WO 2015/021062 A1 | 2/2015 |
| WO | WO 2015/038983 A2 | 3/2015 |
| WO | WO 2015/042584 A1 | 3/2015 |
| WO | WO 2015/061194 A1 | 4/2015 |
| WO | WO 2016/057764 A1 | 4/2016 |
| WO | WO 2016/189438 A1 | 12/2016 |
| WO | WO 2017/019944 A1 | 2/2017 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |
| WO | WO 2018/045393 A2 | 3/2018 |
| WO | WO 2018/075637 A1 | 4/2018 |
| WO | WO 2018/084246 A1 | 5/2018 |
| WO | WO 2018/136077 A1 | 7/2018 |
| WO | WO 2019/097261 A1 | 5/2019 |
| WO | WO 2020/046569 A1 | 3/2020 |
| WO | WO 2020/251568 A1 | 12/2020 |
| WO | WO 2021/061343 A1 | 4/2021 |

OTHER PUBLICATIONS

[No Author Listed], 13.5 Colligative Properties. Prentice Hall. Accessed Jul. 9, 2019 as available Aug. 23, 2012 from <https://web.archive.org/web/20120823004120/http://wps.prenhall.com/wps/media/objects/3082/3156628/b1b1305.html>. 10 pages.

[No Author Listed], Accepta 4360 Material Safety Data Sheet. Accepta Ltd. Manchester, UK. Jul. 19, 2011. 5 pages.

[No Author Listed], Caustic Soda 50% Material Safety Data Sheet. Univar. Redmond, Washington. Apr. 8, 2013. 10 pages.

[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>. 2 pages.

[No Author Listed], Everything you want to know about Coagulation & Flocculation. Chapter 1: The Electrokinetic Connection. Zeta-Meter, Inc. Staunton, VA. 4th Edition. 1993:1-8.

[No Author Listed], F0 Plant Completes 1-Year of Operation. Water Desalination Report Nov. 15, 2010:2 pages.

[No Author Listed], Forward Osmosis. Wikipedia. Accessed Jul. 9, 2019 as available May 5, 2007 from <https://web.archive.org/web/20080317095053/https://en.wikipedia.org/wiki/Forward_osmosis>. 3 pages.

[No Author Listed], Hi-Cal Hydrate Material Safety Data Sheet. Chemical Lime Co. Fort Worth, Texas. May 1, 2008. 6 pages.

[No Author Listed], Landfill Leachate Treatment. Osmotek, Inc. Corvallis, OR. Accessed Jul. 9, 2019 as available Oct. 9, 2007 from <https://web.archive.org/web/20071009130111/http://www.rimnetics.com/OSMOTEK%20BROCHURE.pdf>. 7 pages.

[No Author Listed], Polyaluminum Chloride Solution Material Safety Data Sheet. GEO Specialty Chemicals, Ltd. Little Rock, Arkansas. Mar. 12, 2015. 11 pages.

[No Author Listed], Servco 1010 Material Safety Data Sheet. Servco Chemicals. Lubbock, Texas. Aug. 7, 2013. 4 pages.

[No Author Listed], Soda Ash Material Safety Data Sheet. Univar. Redmond, Washington. Apr. 7, 2003. 10 pages.

Achilli et al., Selection of inorganic-based draw solutions for forward osmosis applications. Journal of Membrane Science. 2010;364:233-41. Epub Aug. 14, 2010.

Akram et al., Energy Utilization of Brine from an MSF Desalination Plant by Pressure Retarded Osmosis. The International Desalination Association World Congress on Desalination and Water Reuse. Tianjin, China. Oct. 2013. 12 pages.

Al-Hallaj et al., Solar desalination with a humidification-dehumidification cycle: performance of the unit. Desalination. 1998;120:273-80.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>. 2 pages.

Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.

Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.

Banchik et al., Thermodynamic Analysis of a Reverse Osmosis Desalination System Using Forward Osmosis for Energy Recovery. Proceedings of the ASME 2012 International Mechanical Engineering Congress & Exposition. American Society of Mechanical Engineers. Houston, Texas. Nov. 9-15, 2012. 13 pages.

Beasley et al., Analysis of a pressure driven absorption refrigeration cycle. Int J Energy Res. Jan. 1988;12:175-84.

Bruno, A Low-Energy Water Purifier. MIT Technology Review. Jan. 8, 2009:3 pages.

Burk, New Technology Spotlight. CaribDA News. 2012 Fall;2(4):6-7.

Cath et al., A Novel Hybrid Forward Osmosis Process for Drinking Water Augmentation Using Impaired Water and Saline Water Sources. WERC and Water Research Foundation. 2009:84 pages.

Cath et al., Forward osmosis: Principles, applications, and recent developments. J Membr Sci. Sep. 15, 2006;281(1-2):70-87.

Du et al., Module-scale analysis of low-salt-rejection reverse osmosis: Design guidelines and system performance. Water Res. Dec. 7, 2021;209:117936. doi: 10.1016/j.watres.2021.117936. Epub ahead of print.

El-Dessouky et al., Multiple-effect evaporation desalination systems: thermal analysis. Desalination. 1999;125:259-76.

Ge et al., Exploration of polyelectrolytes as draw solutes in forward osmosis processes. Water Research. 2012;46:1318-26. Epub Dec. 27, 2011.

Global Water Intelligence, Water Desalination Report. Tom Pankratz, ed. Dec. 17, 2012;48(48):1-4.

Govindan, Thermal Design of Humidification Dehumidification Systems for Affordable and Small-scale Desalination. Doctoral Thesis. Massachusetts Institute of Technology. Sep. 2012. 286 pages.

Gude, Energy consumption and recovery in reverse osmosis. Desalination and Water Treatment. 2011;36(1-3):239-60.

Huang et al., The bridging force between colloidal particles in a polyelectrolyte solution. Langmuir. Nov. 27, 2012;28(47): 16300-5. doi:10.1021/la303918p.

Jain et al., Desalination of Brines Associated with Geological Storage of Carbon Dioxide. SWMOA Annual Symposium. The Growing Role of Membranes in the Thirsty Southwest. Jun. 13-15, 2016: 20 pages.

Khayet et al., Determination of surface and bulk pore sizes of flat-sheet and hollow-fiber membranes by atomic force microscopy, gas permeation and solute transport methods. Desalination. 2003;158:57-64.

Kim et al., Effect of PEG additive on membrane formation by phase inversion. Journal of Membrane Science. 1998;138:153-63.

Klausner et al., Evaporative heat and mass transfer for the diffusion driven desalination process. Heat Mass Transfer. 2006;42:528-36.

Kwak et al., New Insights on the Role of Multivalent Ions in Water-Carbonate Rock Interactions. Saudi Journal of Technology.

(56) References Cited

OTHER PUBLICATIONS

2014:25-38. Last accessed on Dec. 8, 2016 at <http://www.saudiaramco.com/content/dam/Publications/Journal-of-Technology/Summer2014/New_Insights.pdf>.

Lakerveld et al., Membrane assisted crystallization using reverse osmosis: Influence of solubility characteristics on experimental application and energy saving potential. Chem Eng Sci. Jan. 2010;65:2689-99.

Li, Experimental Analysis of Produced Water Desalination by a Humidification-Dehumidification Process. 2009. 62 pages.

Li, Mineral precipitation and deposition in cooling systems using impaired waters: mechanisms, kinetics, and inhibition. Dissertation defended Jul. 27, 2010. 224 pages.

Loeb et al., Countercurrent flow osmotic processes for the production of solutions having a high osmotic pressure. Desalination. Aug. 1973;13:207-15.

McCutcheon et al., Influence of concentrative and dilutive internal concentration polarization on flux behavior in forward osmosis. Journal of Membrane Science. Nov. 2006;284(1-2):237-47.

McGinnis et al., Pilot demonstration of the NH3/CO2 forward osmosis desalination process on high salinity brines. Desalination. Mar. 2013;312:67-74. Supporting information included.

Michas, Design of an Energy Recovery Concept for a Small-scale Renewable-driven Reverse Osmosis Desalination System. Master of Science Thesis in Sustainable Energy Technology. Delft University of Technology. Oct. 2013:139 pages.

Miller et al., Forward Osmosis: A New Approach to Water Purification and Desalination. Sandia Report. Sandia National Laboratories. Jul. 1, 2006. doi: 10.2172/893156.

Moghadasi et al., Scale deposits in porous media and their removal by EDTA injection. ECI Symposium Series. 2007. Vol. RP5. Article 10. p. 57-70.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Park et al., Cost-based analysis about a newly designed two-staged reverse osmosis process with draw solute. Comput Aided Chem Eng. 2016;38:223-8.

Park et al., Cost-based feasibility study and sensitivity analysis of a new draw solution assisted reverse osmosis (DSARO) process for seawater desalination. Desalination. Aug. 2017;422:182-93.

Park et al., Theoretical Analysis and Economic Evaluation of Draw Solution Assisted Reverse Osmosis Process. 2015 AIChE Annual Meeting. 2015;1:112-20. Abstract only.

Riffat et al., Analysis of using centrifugal reverse osmosis in absorption refrigeration systems. Chartered Institute of Building Services Engineers. 2001 Conference. 5 pages.

Sahin, A Mathematical Model for Explanation of Ion Exchange of the Boric Acid Adsorption. Jour. Chem. Soc. Pak. 1998;20(1):12-8.

Sinex, Edta—A molecule with a complex story. University of Bristol, School of Chemistry. <www.chm.bris.ac.uk/motm/edta/edtah.htm> (accessed Jan. 8, 2013). Aug. 1, 2007.

Stover, Energy Recovery Device Performance Analysis. Water Middle East. Nov. 14, 2005:3 pages.

Thiel et al., Hybridization of Humidification-Dehumidification and Pressure Retarded Osmosis for Brine Concentration Applications. The International Desalination Association World Congress on Desalination and Water Reuse. San Diego, California. Aug.-Sep. 2015. 8 pages.

Tiraferri et al., Relating performance of thin-film composite forward osmosis membranes to support layer formation and structure. Journal of Membrane Science. Nov. 12, 2010;367:340-52.

Zamen et al., Improvement of solar humidification-dehumidification desalination using multi-stage process. 6 pages. Accessed Jun. 6, 2014.

International Search Report and Written Opinion for International Application No. PCT/US2021/059441 dated May 3, 2022.

\* cited by examiner

OSMOTIC METHODS AND SYSTEMS INVOLVING ENERGY RECOVERY

RELATED APPLICATIONS

This application is a continuation of International Patent Application No. PCT/US2021/059441, filed Nov. 16, 2021, and entitled "Osmotic Methods and Systems Involving Energy Recovery," which claims priority under 35 U.S.C. § 119(e) to U.S. Provisional Patent Application No. 63/114,643, filed Nov. 17, 2020, and entitled "Osmotic Methods and Systems Involving Balancing Streams," U.S. Provisional Patent Application No. 63/114,648, filed Nov. 17, 2020, and entitled "Osmotic Methods and Systems Involving Recirculation Streams," U.S. Provisional Patent Application No. 63/114,652, filed Nov. 17, 2020, and entitled "Osmotic Methods and Systems Involving Bypass Stream," and to U.S. Provisional Patent Application No. 63/114,656, filed Nov. 17, 2020, and entitled "Osmotic Methods and Systems Involving Energy Recovery," each of which is incorporated herein by reference in its entirety for all purposes.

TECHNICAL FIELD

Liquid solution concentration methods and related systems are generally described.

BACKGROUND

Membranes which are selectively permeable to solvent and impermeable to solutes have been used to purify feed streams. As one example, membrane-based desalination has been used to desalinate aqueous feed streams. In one such purification process—generally referred to as forward osmosis—solvent (e.g., water) is transported from a feed stream through a semi-permeable membrane by applying a draw solution (also sometimes referred to as a sweep solution) to the permeate side of the membrane that has an osmotic pressure that is higher than the osmotic pressure of the feed stream. The driving force for separation in a forward osmosis process is the osmotic pressure difference across the semi-permeable membrane; because the draw solution on one side of the membrane has a higher osmotic pressure than the feed stream on the other side of the membrane, the solvent is drawn through the semi-permeable membrane from the feed stream to the draw solution to equalize the osmotic pressures.

Another type of membrane-based solution concentration process is reverse osmosis. In contrast to forward osmosis, reverse osmosis processes use an applied hydraulic pressure as the driving force for separation. The applied hydraulic pressure serves to counteract the osmotic pressure difference that would otherwise favor solvent flux from low osmotic pressure to high osmotic pressure. Therefore in reverse osmosis systems, solvent is driven from the high osmotic pressure side to the low osmotic pressure side.

Many membrane-based solution concentration systems have, to date, been limited by, for example, low efficiencies, large expense, and undesired fouling and scaling. Improved systems and methods for performing membrane-based solution concentration are desirable.

SUMMARY

Liquid solution concentration methods and related systems involving osmosis units and energy recovery are generally described. In some embodiments, an osmotic system comprises a pump, a first reverse osmosis unit, a second reverse osmosis unit, and one or more energy recovery devices. Various embodiments are directed to features such as balancing streams, recirculation streams, and/or valving that alone or in combination may afford improved energy efficiency and/or system performance. Some embodiments may improve performance of certain types of energy recovery devices in combination with osmosis units, such as isobaric or turbine energy recovery devices.

The subject matter of the present invention involves, in some cases, interrelated products, alternative solutions to a particular problem, and/or a plurality of different uses of one or more systems and/or articles.

In some embodiments, methods are provided. In some embodiments, a method comprises: increasing a pressure of at least a portion of a feed stream comprising a solvent and a solute to form a pressurized feed stream; transporting a first reverse osmosis unit retentate inlet stream to a retentate side of a first reverse osmosis unit such that a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of at least a portion of the second reverse osmosis unit retentate outlet stream to form a reduced-pressure concentrate stream; and using at least a portion of energy recovered from the reducing of the pressure of the at least a portion of the second reverse osmosis unit retentate outlet stream to increase a pressure of an energy recovery stream to form a pressurized energy recovery stream; wherein: the first reverse osmosis unit retentate inlet stream comprises at least a portion of the pressurized feed stream and at least a portion of the pressurized energy recovery stream; the second reverse osmosis unit retentate inlet stream comprises at least a portion of the first reverse osmosis unit retentate outlet stream; the energy recovery stream comprises at least a portion of the second reverse osmosis unit permeate outlet stream; and (a) the energy recovery stream comprises a balancing stream comprising at least a portion of the feed stream, or (b) the feed stream comprises a balancing stream comprising at least a portion of the second reverse osmosis unit permeate outlet stream. In some embodiments, the method further comprises transporting a second reverse osmosis unit permeate inlet stream to the permeate side of the second reverse osmosis unit, and the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream. In some embodiments, the second reverse osmosis unit permeate inlet stream comprises at least a portion of the reduced pressure concentrate stream.

In some embodiments, osmotic systems are provided. In some embodiments, an osmotic system comprises: a pump comprising a pump inlet and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising a high pressure inlet, a low pressure inlet, a high pressure outlet, and a low pressure outlet; wherein: the retentate side of the first reverse osmosis unit is fluidically connected to the pump outlet; the retentate side of the first reverse osmosis unit is fluidically connected to the retentate side of the second reverse osmosis unit; the retentate side of the second reverse osmosis unit is fluidically connected to the high pressure inlet of the energy recovery device; the retentate side of the first reverse osmosis unit is fluidically connected to the high pressure outlet of the energy recovery device; the permeate side of the second reverse osmosis unit is fluidically connected to the low pressure inlet of the energy recovery device; and the pump inlet is fluidically connected to the low pressure inlet of the energy recovery device. In some embodiments, the permeate side of the second reverse osmosis unit is fluidically connected to the low pressure outlet of the energy recovery device.

In some embodiments, a method comprises: increasing a pressure of at least a portion of a feed stream comprising a solvent and a solute to form a pressurized feed stream; transporting a first reverse osmosis unit retentate inlet stream to a retentate side of a first reverse osmosis unit such that a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of at least a portion of the second reverse osmosis unit retentate outlet stream to form a reduced-pressure concentrate stream; and using at least a portion of energy recovered from the reducing of the pressure of the at least a portion of the second reverse osmosis unit retentate outlet stream to increase a pressure of an energy recovery stream to form a pressurized energy recovery stream; wherein: the first reverse osmosis unit retentate inlet stream comprises at least a portion of the pressurized feed stream, at least a portion of the pressurized energy recovery stream, and a recirculation stream comprising a first portion of the first reverse osmosis unit retentate outlet stream, wherein the recirculation stream is combined with the at least a portion of the pressurized energy recovery stream prior to incorporation into the first reverse osmosis unit retentate inlet stream; the second reverse osmosis unit retentate inlet stream comprises a second portion of the first reverse osmosis unit retentate outlet stream; and the energy recovery stream comprises at least a portion of the second reverse osmosis unit permeate outlet stream. In some embodiments, the method further comprises transporting a second reverse osmosis unit permeate inlet stream to the permeate side of the second reverse osmosis unit, and the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream. In some embodiments, the second reverse osmosis unit permeate inlet stream comprises at least a portion of the reduced pressure concentrate stream.

In some embodiments, an osmotic system comprises: a pump comprising a pump inlet and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising a high pressure inlet, a low pressure inlet, a high pressure outlet, and a low pressure outlet; wherein: the retentate side of the first reverse osmosis unit is fluidically connected to the pump outlet; the retentate side of the first reverse osmosis unit is fluidically connected to the retentate side of the second reverse osmosis unit; the retentate side of the second reverse osmosis unit is fluidically connected to the high pressure inlet of the energy recovery device; the retentate side of the first reverse osmosis unit is fluidically connected to the high pressure outlet of the energy recovery device; the permeate side of the second reverse osmosis unit is fluidically connected to the low pressure inlet of the energy recovery device; and wherein the osmotic system is configured to combine a recirculation stream from a first portion of a first reverse osmosis unit retentate outlet stream exiting the outlet of the retentate side of the first reverse osmosis unit with a pressurized energy recovery stream exiting the high pressure outlet of the energy recovery device. In some embodiments, the permeate side of the second reverse osmosis unit is fluidically connected to the low pressure outlet of the energy recovery device.

In some embodiments, a method comprises: increasing a pressure of at least a portion of a feed stream comprising a solvent and a solute to form a pressurized feed stream; transporting a first reverse osmosis unit retentate inlet stream to a retentate side of a first reverse osmosis unit such that a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of at least a portion of the second reverse osmosis unit retentate outlet stream to form a reduced-pressure concentrate stream; and using at least a portion of energy recovered from the reducing of the pressure of the at least a portion of the second reverse osmosis unit retentate outlet stream to increase a pressure of an energy recovery stream to form a pressurized energy recovery stream; wherein: the first reverse osmosis unit retentate inlet stream comprises at least a portion of the pressurized energy recovery stream; the energy recovery stream comprises at least a portion of the pressurized feed stream and a recirculation stream comprising a first portion of the first reverse osmosis unit retentate outlet stream; the second reverse osmosis unit retentate inlet stream comprises a second portion of the first reverse osmosis unit retentate outlet stream; and the feed stream comprises at least a portion of the second reverse osmosis unit permeate outlet stream. In some embodiments, the method further comprises transporting a second reverse osmosis unit permeate inlet stream to the permeate side of the second reverse osmosis unit, and the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream. In some embodiments, the second reverse osmosis unit permeate inlet stream comprises at least a portion of the reduced pressure concentrate stream.

In some embodiments, an osmotic system comprises: a pump comprising a pump inlet and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising a high pressure inlet, a low pressure inlet, a high pressure outlet, and a low pressure outlet; wherein: the retentate side of the first reverse osmosis unit is fluidically connected to the retentate side of the second reverse osmosis unit; the retentate side of the second reverse osmosis unit is fluidically connected to the high pressure inlet of the energy recovery device; the permeate side of the second reverse osmosis unit is fluidically connected to the pump inlet; the retentate side of the first reverse osmosis unit is fluidically connected to the high pressure outlet of the energy recovery device; and the low pressure inlet of the energy recovery device is fluidically connected to the pump outlet and an outlet of the retentate side of the first reverse osmosis unit. In some embodiments, the permeate side of the second reverse osmosis unit is fluidically connected to the low pressure outlet of the energy recovery device.

In some embodiments, a method comprises: increasing, during a first period of time and a second period of time, a pressure of at least a portion of a feed stream comprising a solvent and a solute to form a pressurized feed stream; transporting, during the first period of time and the second period of time, a first reverse osmosis unit retentate inlet stream to a retentate side of a first reverse osmosis unit such that a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting, during at least the first period of time, a second reverse osmosis unit retentate inlet stream to a retentate side of a second reverse osmosis unit such that a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing, during the first period of time and the second period of time, a pressure of a concentrate stream to form a reduced-pressure concentrate stream; and using, during the first period of time and the second period of time, at least a portion of energy recovered from the reducing of the pressure of the concentrate stream to increase a pressure of an energy recovery stream to form a pressurized energy recovery stream; wherein: during at least the first period of time: the second reverse osmosis unit retentate inlet stream comprises at least a portion of the first reverse osmosis unit retentate outlet stream; the energy recovery stream comprises at least a portion of the second reverse osmosis unit permeate outlet stream; and the concentrate stream comprises at least a portion of the second reverse osmosis unit retentate outlet stream; during at least the second period of time: the retentate side of the second reverse osmosis unit does not receive any portion of the first reverse osmosis unit retentate outlet stream or receives an amount of the first reverse osmosis unit retentate outlet stream that is at least 80 wt % less than an amount of the first reverse osmosis unit retentate outlet stream received by the retentate side of the second reverse osmosis unit during the first period of time, and the permeate side of the second reverse osmosis unit does not receive any portion of the reduced-pressure concentrate stream or receives an amount of the reduced-pressure concentrate stream that is at least 80 wt % less than an amount of the reduced-pressure concentrate stream received by the permeate side of the second reverse osmosis unit during the first period of time; and the concentrate stream comprises at least a portion of a bypass stream comprising at least a portion of the first reverse osmosis unit retentate outlet stream; and during both the first period of time and the second period of time: the first reverse osmosis unit retentate inlet stream comprises at least a portion of the pressurized feed stream and at least a portion of the pressurized energy recovery stream. In some embodiments, the method further comprises transporting a second reverse osmosis unit permeate inlet stream to the permeate side of the second reverse osmosis unit, and the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream. In some embodiments, the second reverse osmosis unit permeate inlet stream comprises at least a portion of the reduced pressure concentrate stream.

In some embodiments, an osmotic system comprises: a pump comprising a pump inlet and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising a high pressure inlet, a low pressure inlet, a high pressure outlet, and a low pressure outlet; and valving; wherein: the retentate side of the first reverse osmosis unit is fluidically connected to the pump outlet; the retentate side of the first reverse osmosis unit is fluidically connected to the high pressure outlet of the energy recovery device; and the valving is configured such that: when the valving is in a first position: the retentate side of the first reverse osmosis unit is in fluidic communication with the retentate side of the second reverse osmosis unit; the retentate side of the second reverse osmosis unit is in fluidic communication with the high pressure inlet of the energy recovery device; and the permeate side of the second reverse osmosis unit is in fluidic communication with the low pressure inlet of the energy recovery device; and when the valving is in a second position: the retentate side of the first reverse osmosis unit is in fluidic communication with the high pressure inlet of the energy recovery device. In some embodiments, the permeate side of the second reverse osmosis unit is fluidically connected to the low pressure outlet of the energy recovery device.

In some embodiments, a method comprises: increasing, during a first period of time and a second period of time, a pressure of at least a portion of a feed stream comprising a solvent and a solute to form a pressurized feed stream; transporting, during the first period of time and the second period of time, a first reverse osmosis unit retentate inlet stream to a retentate side of a first reverse osmosis unit such that a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting, during at least the first period of time, a second reverse osmosis unit retentate inlet stream to a retentate side of a second reverse osmosis unit such that a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing, during the first period of time and the second period of time, a pressure of a concentrate stream to form a reduced-pressure concentrate stream; and using, during the first period of time and the second period of time, at least a portion of energy recovered from the reducing of the pressure of the concentrate stream to increase a pressure of an energy recovery stream to form a pressurized energy recovery stream; wherein: during at least the first period of time: the second reverse osmosis unit retentate inlet stream comprises at least a portion of the first reverse osmosis unit retentate outlet stream; and the concentrate stream comprises at least a portion of the second reverse osmosis unit retentate outlet stream; during at least the second period of time: the retentate side of the second reverse osmosis unit does not receive any portion of the first reverse osmosis unit retentate outlet stream or receives an amount of the first reverse osmosis unit retentate outlet stream that is at least 80 wt % less than an amount of the first reverse osmosis unit retentate outlet stream received by the retentate side of the second reverse osmosis unit during the first period of time, and the permeate side of the second reverse osmosis unit does not receive any portion of the reduced-pressure concentrate stream or receives an amount of the reduced-pressure concentrate stream that is at least 80 wt % less than an amount of the reduced-pressure concentrate stream received by the permeate side of the second reverse osmosis unit during the first period of time; and the concentrate stream comprises at least a portion of a bypass stream comprising at least a portion of the first reverse osmosis unit retentate outlet stream; and during both the first period of time and the second period of time: the energy recovery stream comprises at least a portion of the pressurized feed stream; and the first reverse osmosis unit retentate inlet stream comprises at least a portion of the pressurized energy recovery stream. In some embodiments, the method further comprises transporting a second reverse osmosis unit permeate inlet stream to the permeate side of the second reverse osmosis unit, and the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream. In some embodiments, the second reverse osmosis unit permeate inlet stream comprises at least a portion of the reduced pressure concentrate stream.

In some embodiments, an osmotic system comprises: a pump comprising a pump inlet and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising a high pressure inlet, a low pressure inlet, a high pressure outlet, and a low pressure outlet; and valving; wherein: the low pressure inlet of the energy recovery device is fluidically connected to the pump outlet; the retentate side of the first reverse osmosis unit is fluidically connected to the high pressure outlet of the energy recovery device; and the valving is configured such that when the valving is in a first position: the retentate side of the first reverse osmosis unit is in fluidic communication with the retentate side of the second reverse osmosis unit; and the retentate side of the second reverse osmosis unit is in fluidic communication with the high pressure inlet of the energy recovery device; and when the valving is in a second position: the retentate side of the first reverse osmosis unit is in fluidic communication with the high pressure inlet of the energy recovery device.

In some embodiments, a method comprises: increasing a pressure of at least a portion of a feed stream comprising a solvent and a solute to form a pressurized feed stream; transporting a first reverse osmosis unit retentate inlet stream to a retentate side of a first reverse osmosis unit such that a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of a first concentrate stream comprising a first portion of the second osmosis unit retentate outlet stream to form a reduced-pressure first concentrate stream; using at least a portion of energy recovered from the reducing of the pressure of the first concentrate stream to increase a pressure of a first energy recovery stream to form a pressurized first energy recovery stream; reducing a pressure of a second concentrate stream comprising a second portion of the second osmosis unit retentate outlet stream to form a reduced-pressure second concentrate stream; and using at least a portion of energy recovered from the reducing of the pressure of the second concentrate stream to increase a pressure of a second energy recovery stream to form a pressurized second energy recovery stream; wherein: the first reverse osmosis unit retentate inlet stream comprises at least a portion of the pressurized first energy recovery stream and at least a portion of the pressurized second energy recovery stream; the first energy recovery stream comprises at least a portion of the pressurized feed stream; the second reverse osmosis unit retentate inlet stream comprises at least a portion of the first reverse osmosis unit retentate outlet stream; and the second energy recovery stream comprises at least a portion of the second reverse osmosis unit permeate outlet stream.

In some embodiments, an osmotic system comprises: a pump comprising a pump inlet and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; a first energy recovery device comprising a first high pressure inlet, a first low pressure inlet, a first high pressure outlet, and a first low pressure outlet; a second energy recovery device comprising a second high pressure inlet, a second low pressure inlet, a second high pressure outlet, and a second low pressure outlet; wherein: the retentate side of the first reverse osmosis unit is fluidically connected to the retentate side of the second reverse osmosis unit; the retentate side of the second reverse osmosis unit is fluidically connected to the first high pressure inlet of the first energy recovery device and the second high pressure inlet of the second energy recovery device; the permeate side of the second reverse osmosis unit is fluidically connected to the second low pressure inlet of the second energy recovery device; the retentate side of the first reverse osmosis unit is fluidically connected to the first high pressure outlet of the first energy recovery device and the second high pressure outlet of the second energy recovery device; and the first low pressure inlet of the first energy recovery device is fluidically connected to the pump outlet.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
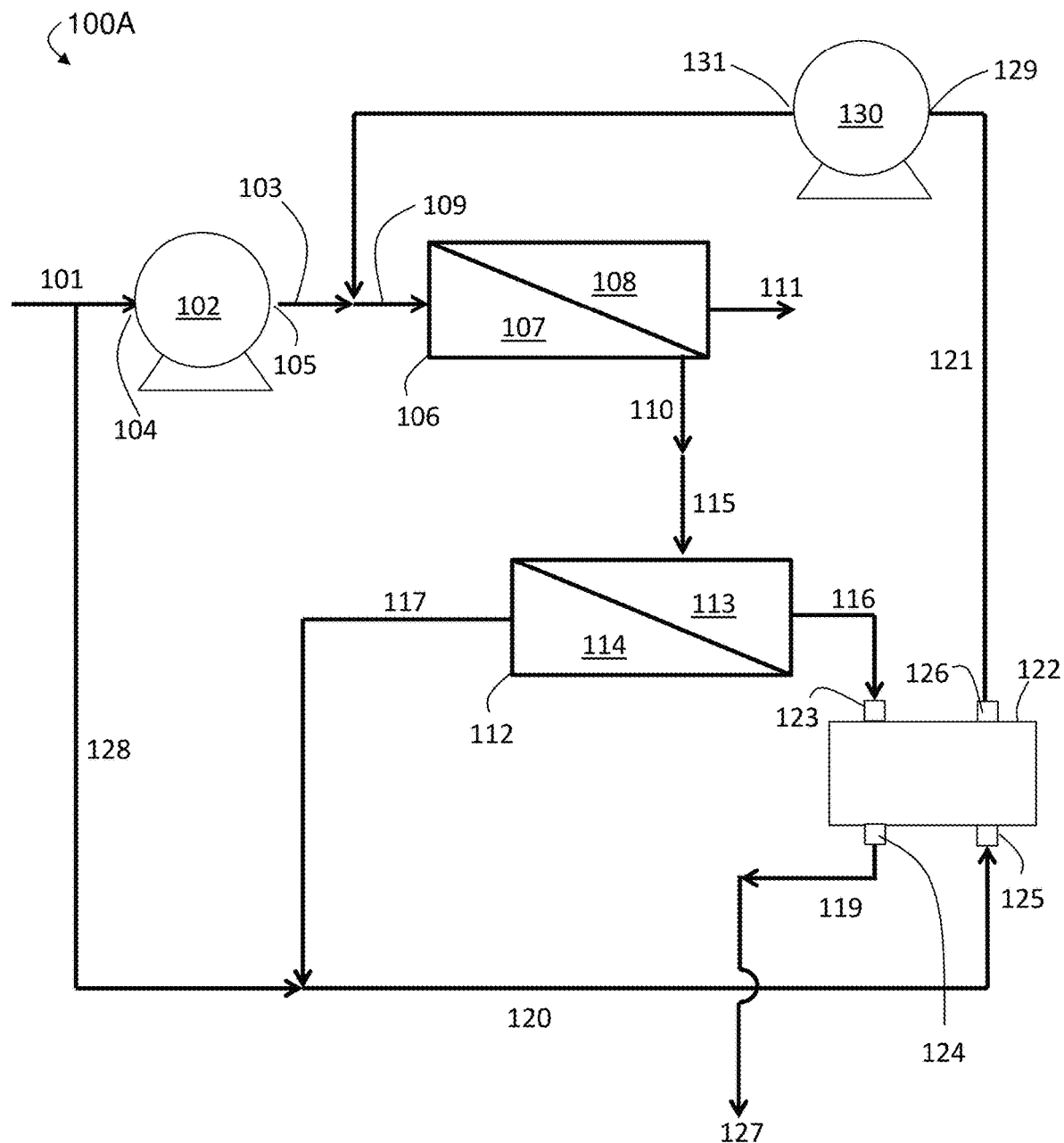
FIG. 1A is a schematic illustration of an exemplary osmotic system comprising reverse osmosis units and an energy recovery device in which a balancing stream is transported from a feed stream to an energy recovery stream, in accordance with certain embodiments.
Figure 1B:
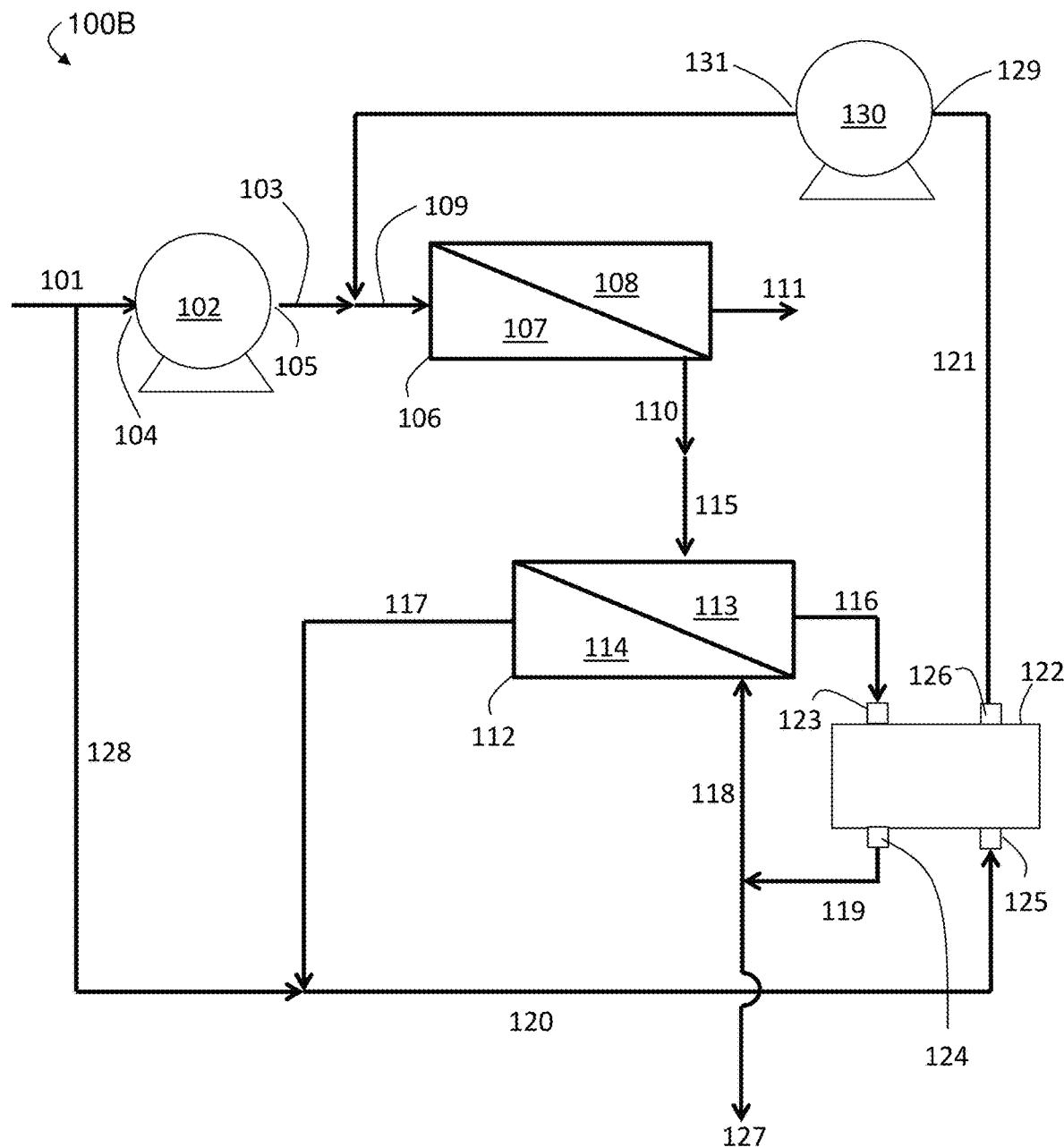
FIG. 1B is a schematic illustration of an exemplary osmotic system comprising reverse osmosis units and an energy recovery device in which a balancing stream is transported from a feed stream to an energy recovery stream, in accordance with certain embodiments.
Figure 1C:
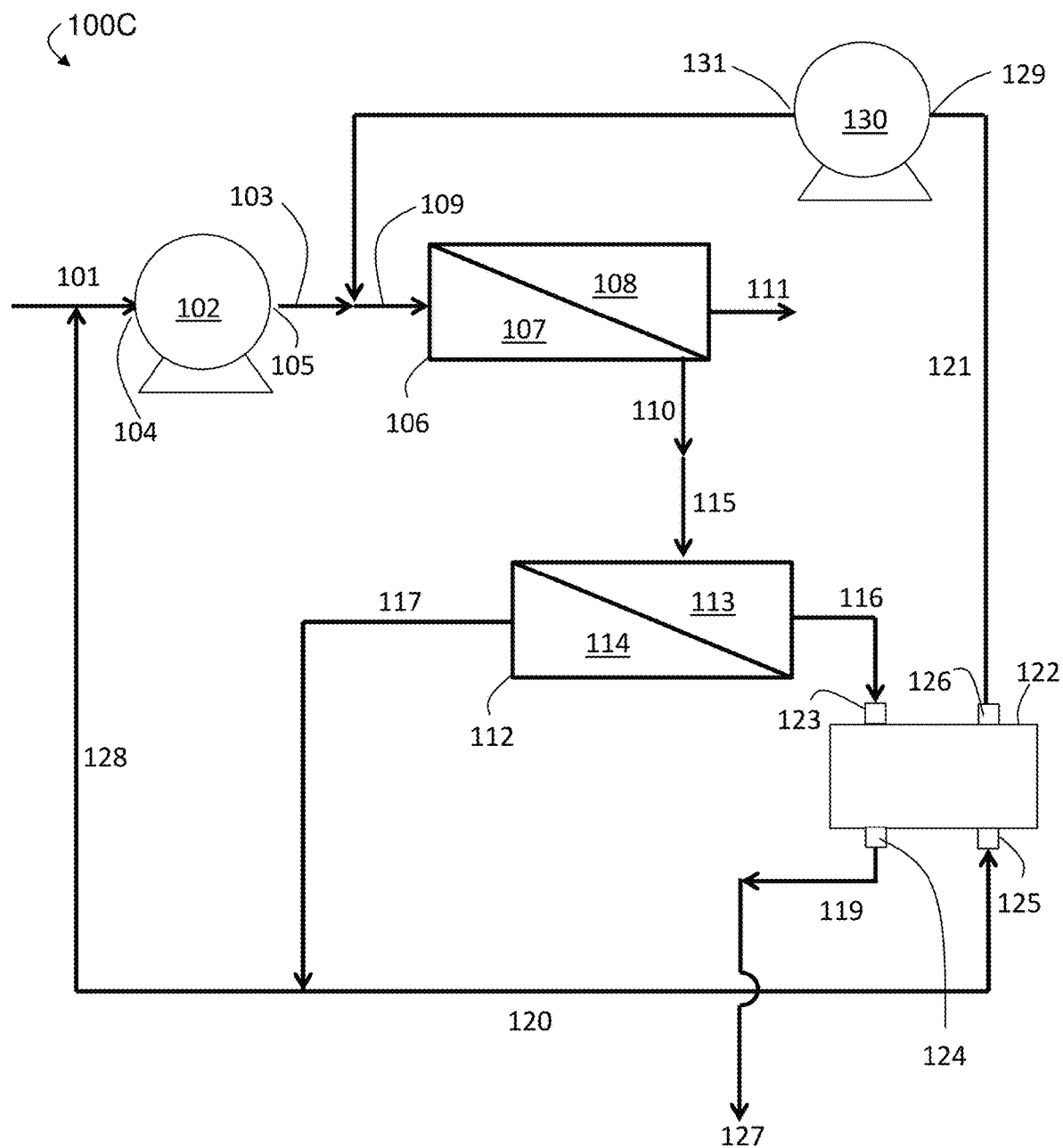
FIG. 1C is a schematic illustration of an exemplary osmotic system comprising reverse osmosis units and an energy recovery device in which a balancing stream is transported from a permeate outlet stream to a feed stream, in accordance with certain embodiments.
Figure 1D:
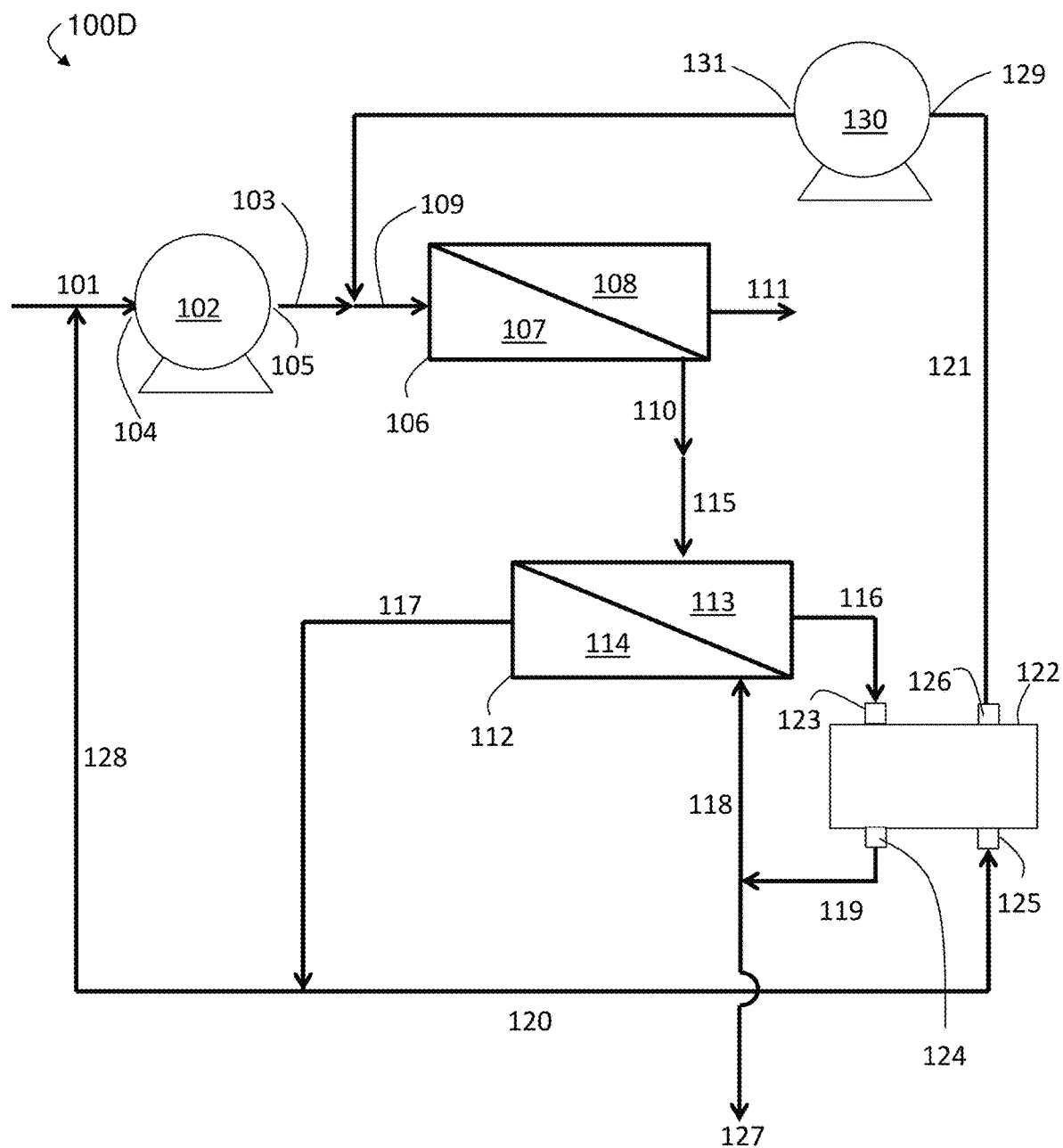
FIG. 1D is a schematic illustration of an exemplary osmotic system comprising reverse osmosis units and an energy recovery device in which a balancing stream is transported from a permeate outlet stream to a feed stream, in accordance with certain embodiments.
Figure 1E:
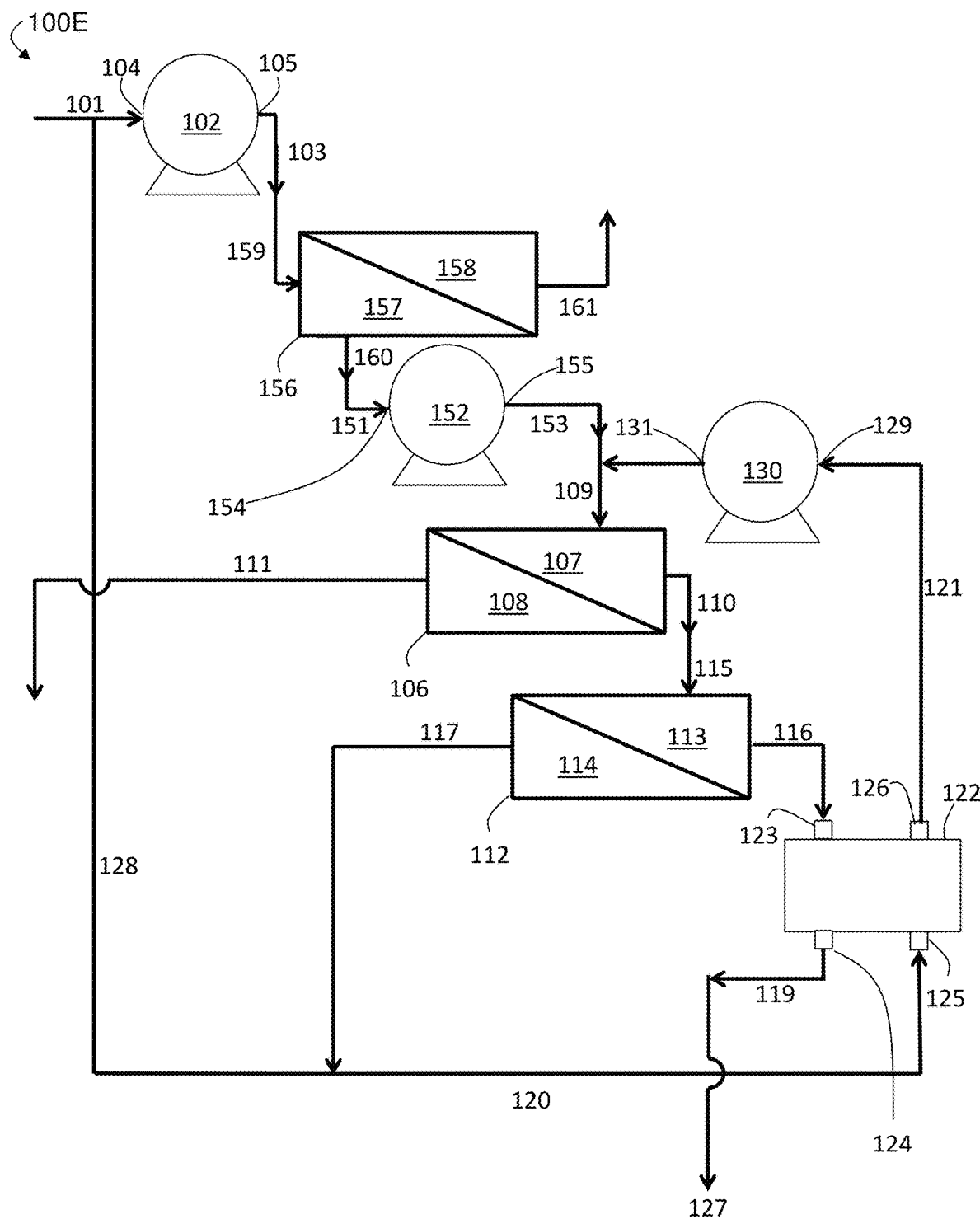
FIG. 1E is a schematic illustration of an exemplary osmotic system comprising reverse osmosis units, including a preliminary reverse osmosis unit, and an energy recovery device in which a balancing stream is transported from a feed stream to an energy recovery stream, in accordance with certain embodiments.
Figure 1F:
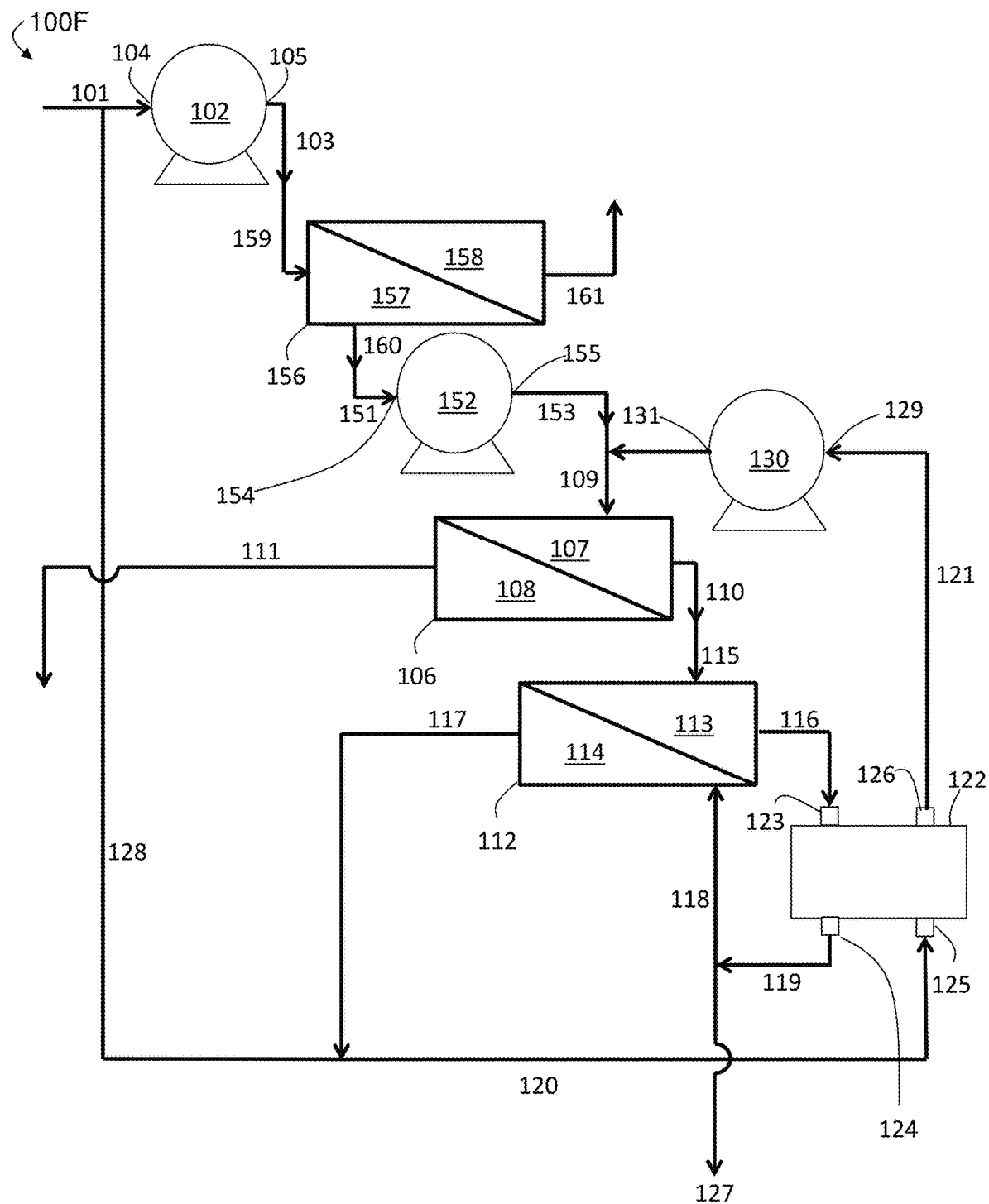
FIG. 1F is a schematic illustration of an exemplary osmotic system comprising reverse osmosis units, including a preliminary reverse osmosis unit, and an energy recovery device in which a balancing stream is transported from a feed stream to an energy recovery stream, in accordance with certain embodiments.
Figure 1G:
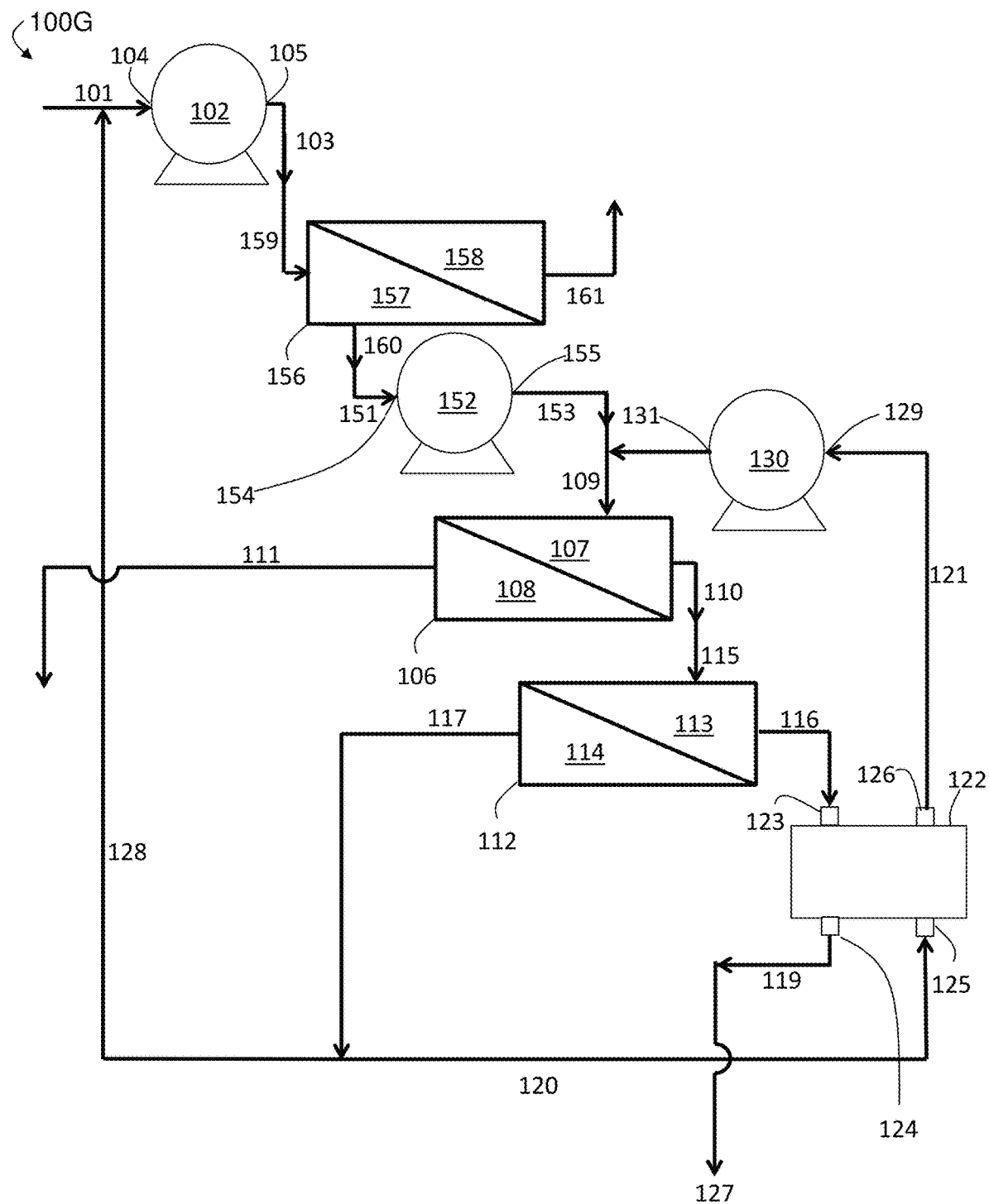
FIG. 1G is a schematic illustration of an exemplary osmotic system comprising reverse osmosis units, including a preliminary reverse osmosis unit, and an energy recovery device in which a balancing stream is transported from a permeate outlet stream to a feed stream, in accordance with certain embodiments.
Figure 1H:
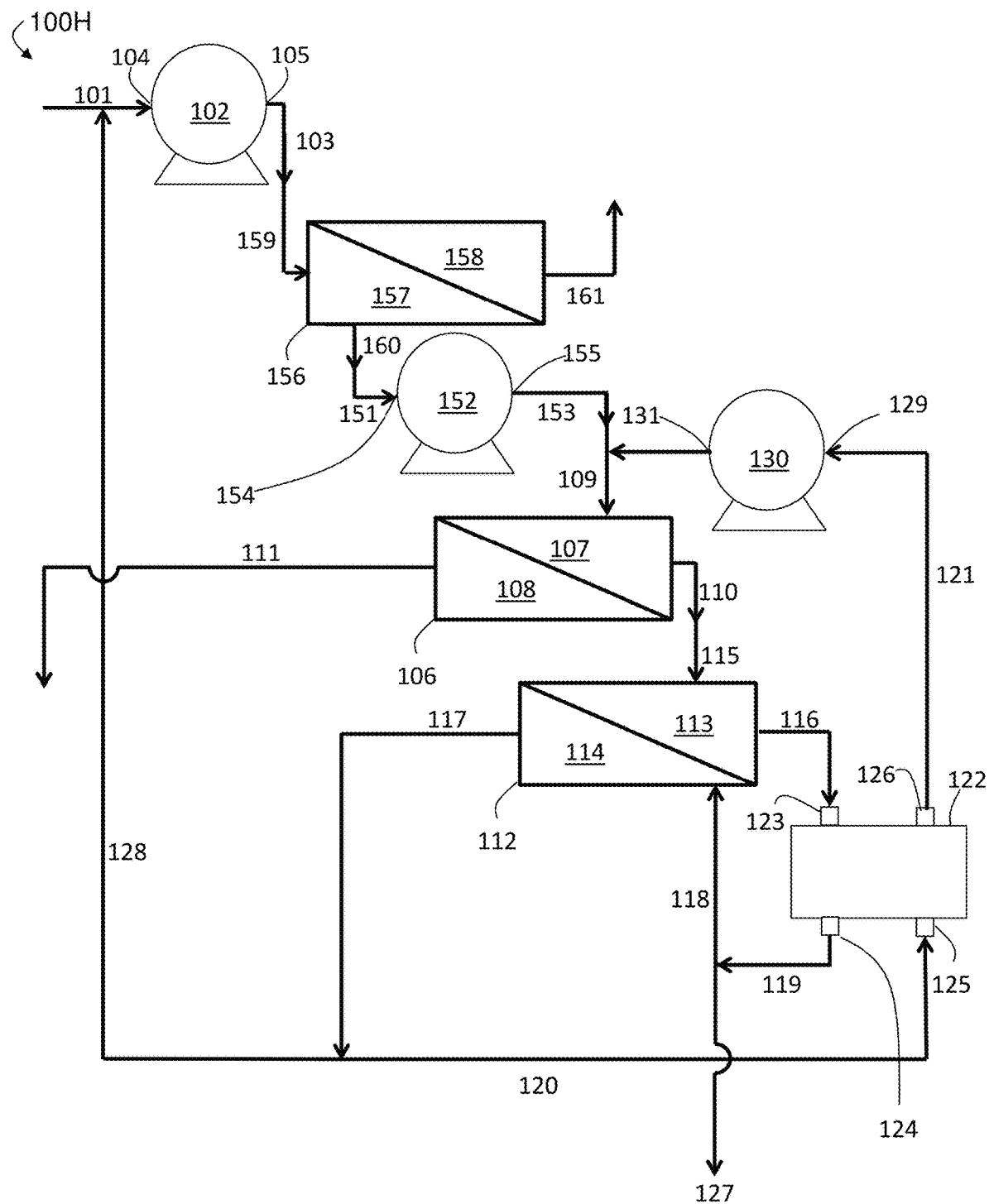
FIG. 1H is a schematic illustration of an exemplary osmotic system comprising reverse osmosis units, including a preliminary reverse osmosis unit, and an energy recovery device in which a balancing stream is transported from a permeate outlet stream to a feed stream, in accordance with certain embodiments.
Figure 2A:
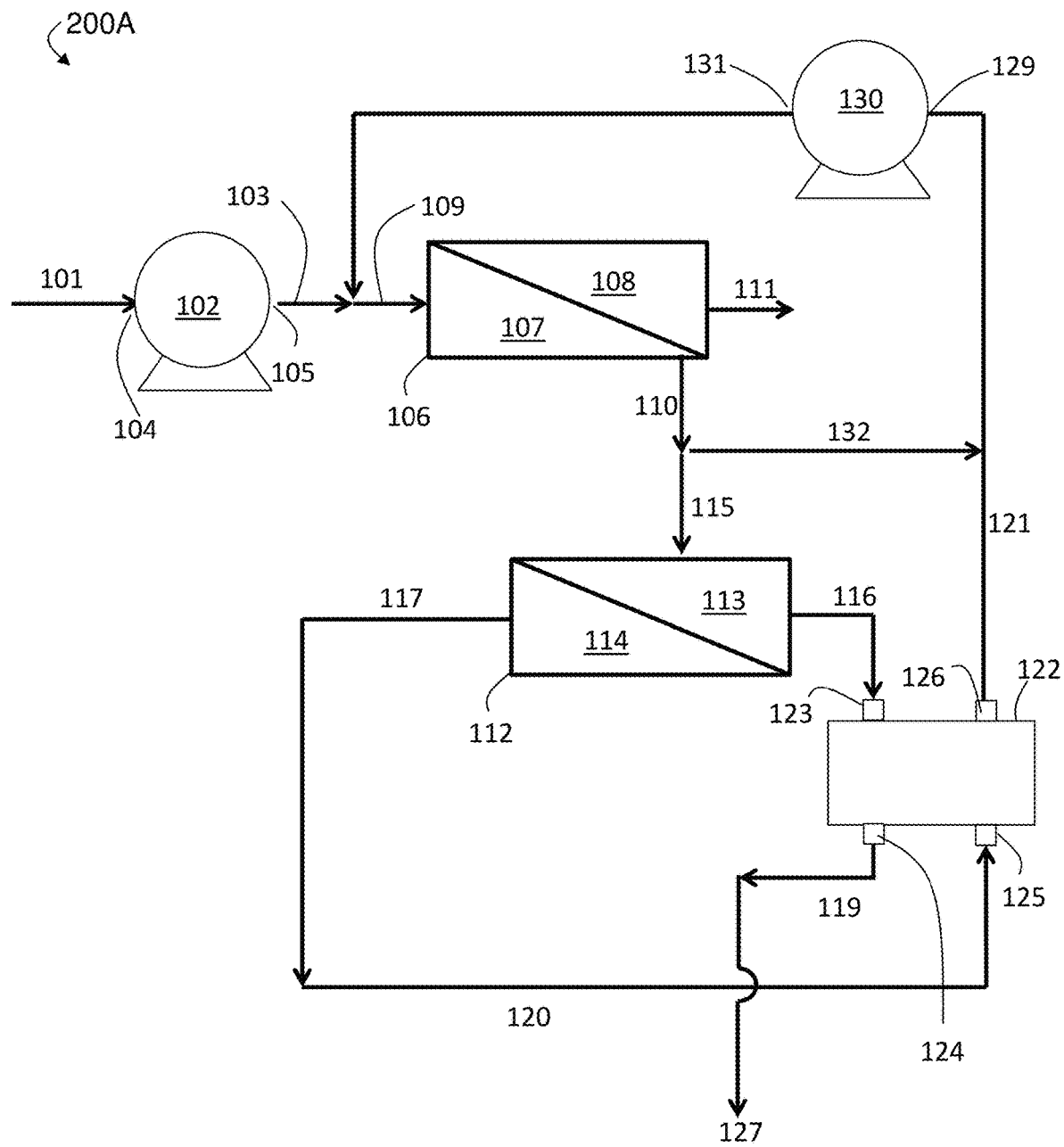
FIG. 2A is a schematic illustration of an exemplary osmotic system comprising reverse osmosis units and an energy recovery device in which a recirculation stream is transported from a retentate outlet stream and combined with a pressurized energy recovery stream, in accordance with certain embodiments.
Figure 2B:
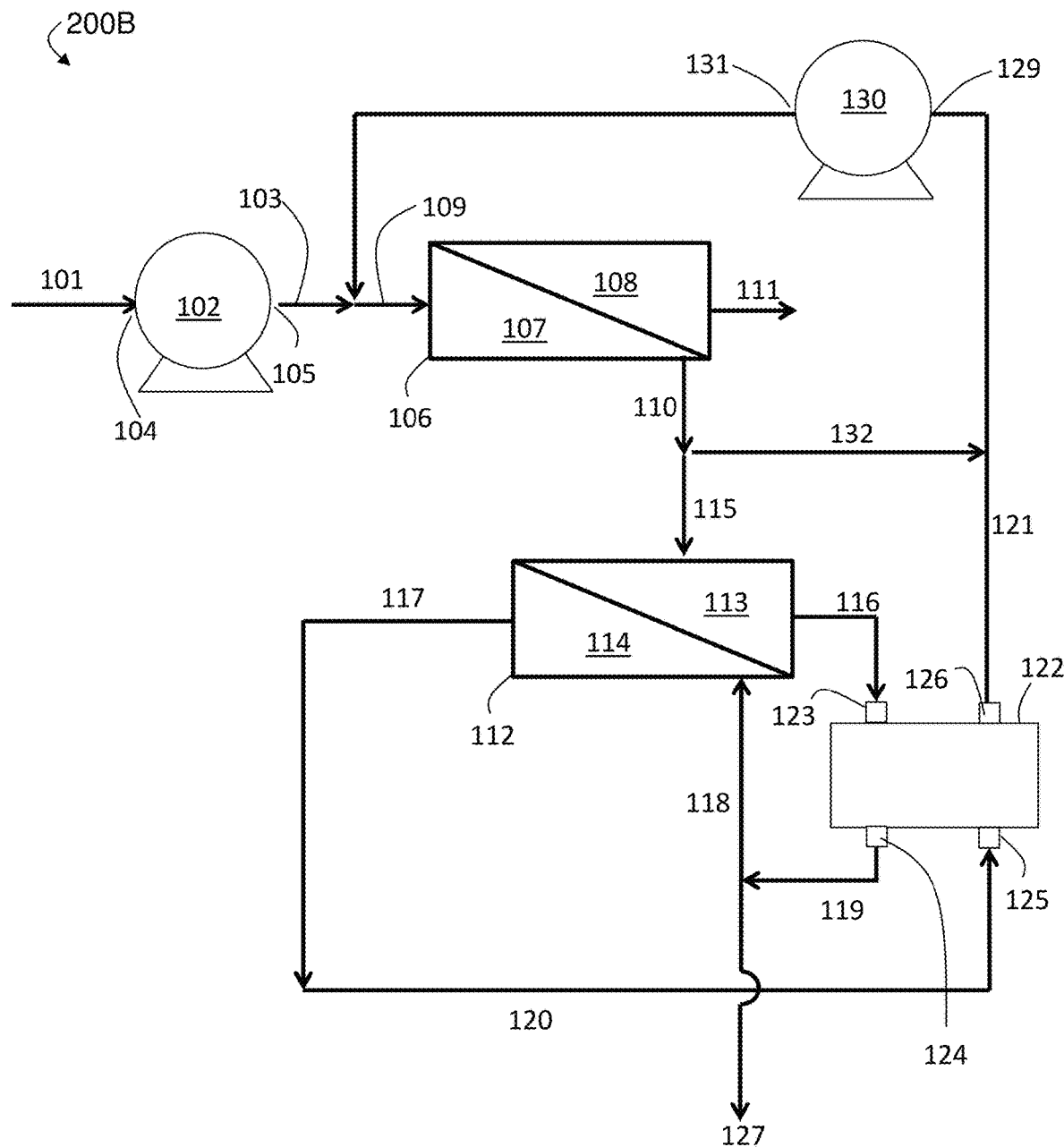
FIG. 2B is a schematic illustration of an exemplary osmotic system comprising reverse osmosis units and an energy recovery device in which a recirculation stream is transported from a retentate outlet stream and combined with a pressurized energy recovery stream, in accordance with certain embodiments.
Figure 3A:
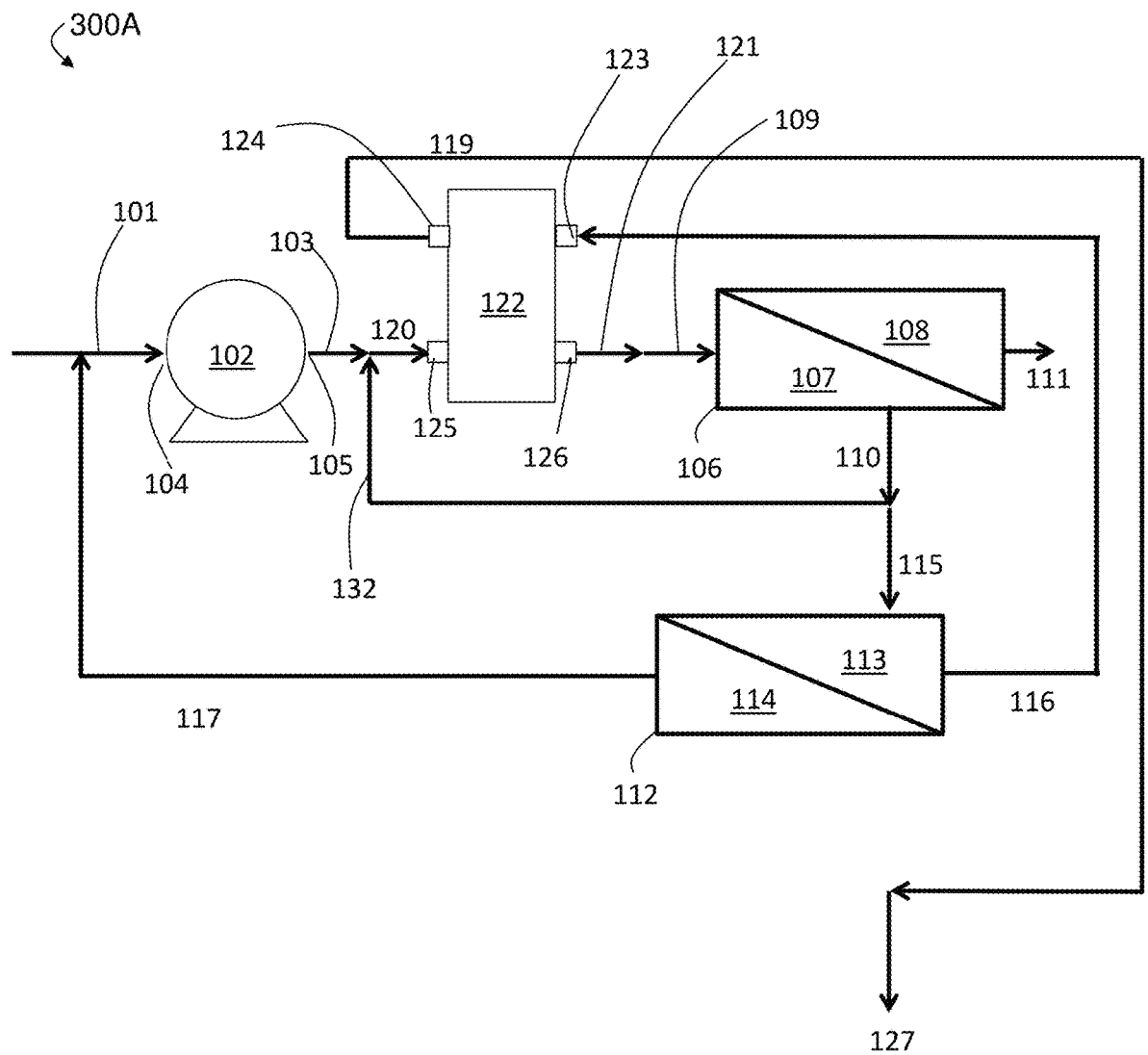
FIG. 3A is a schematic illustration of an exemplary osmotic system comprising reverse osmosis units and an energy recovery device in which a recirculation stream is transported from a retentate outlet stream to an energy recovery stream, in accordance with certain embodiments.
Figure 3B:
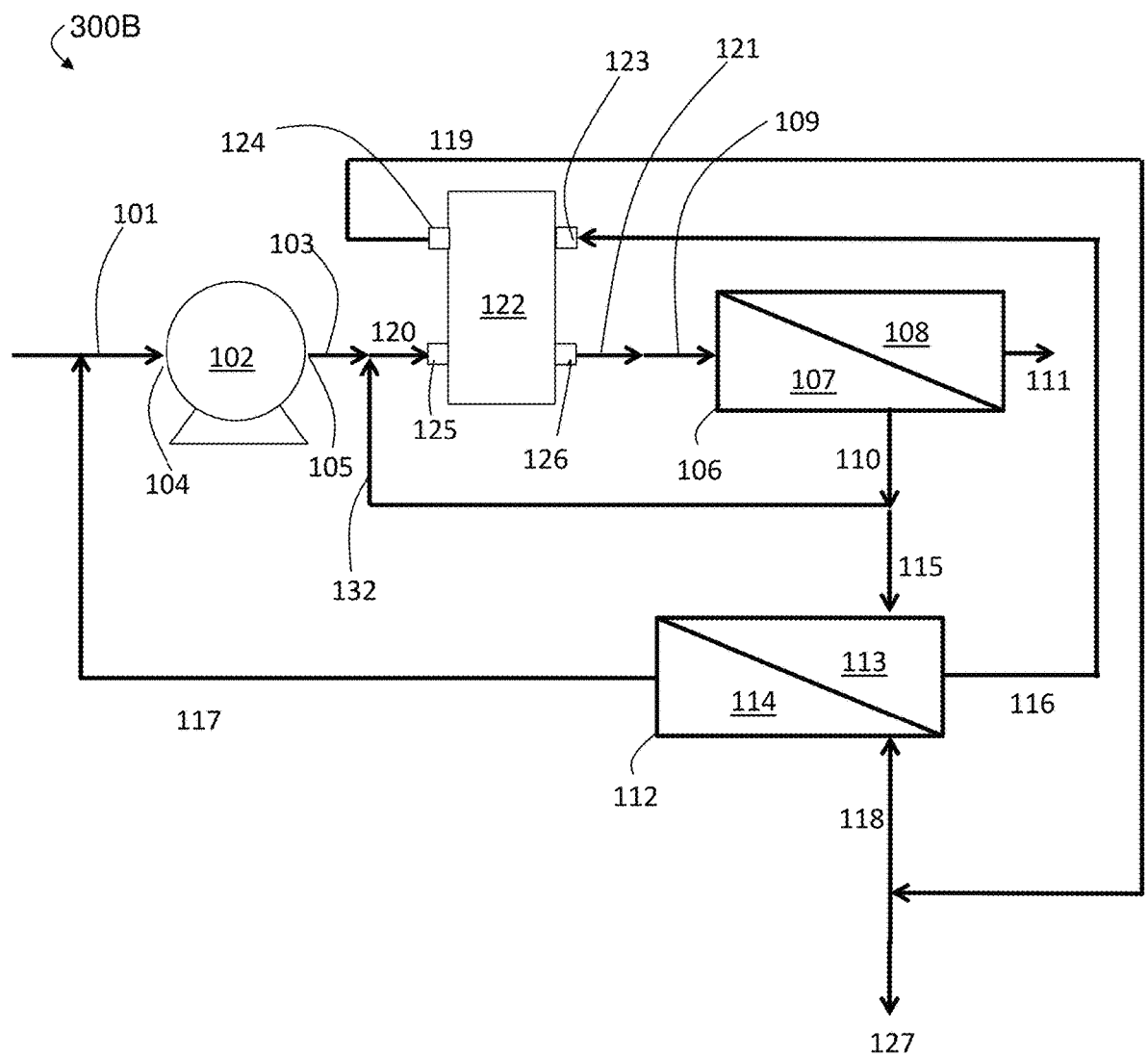
FIG. 3B is a schematic illustration of an exemplary osmotic system comprising reverse osmosis units and an energy recovery device in which a recirculation stream is transported from a retentate outlet stream to an energy recovery stream, in accordance with certain embodiments.
Figure 4A:
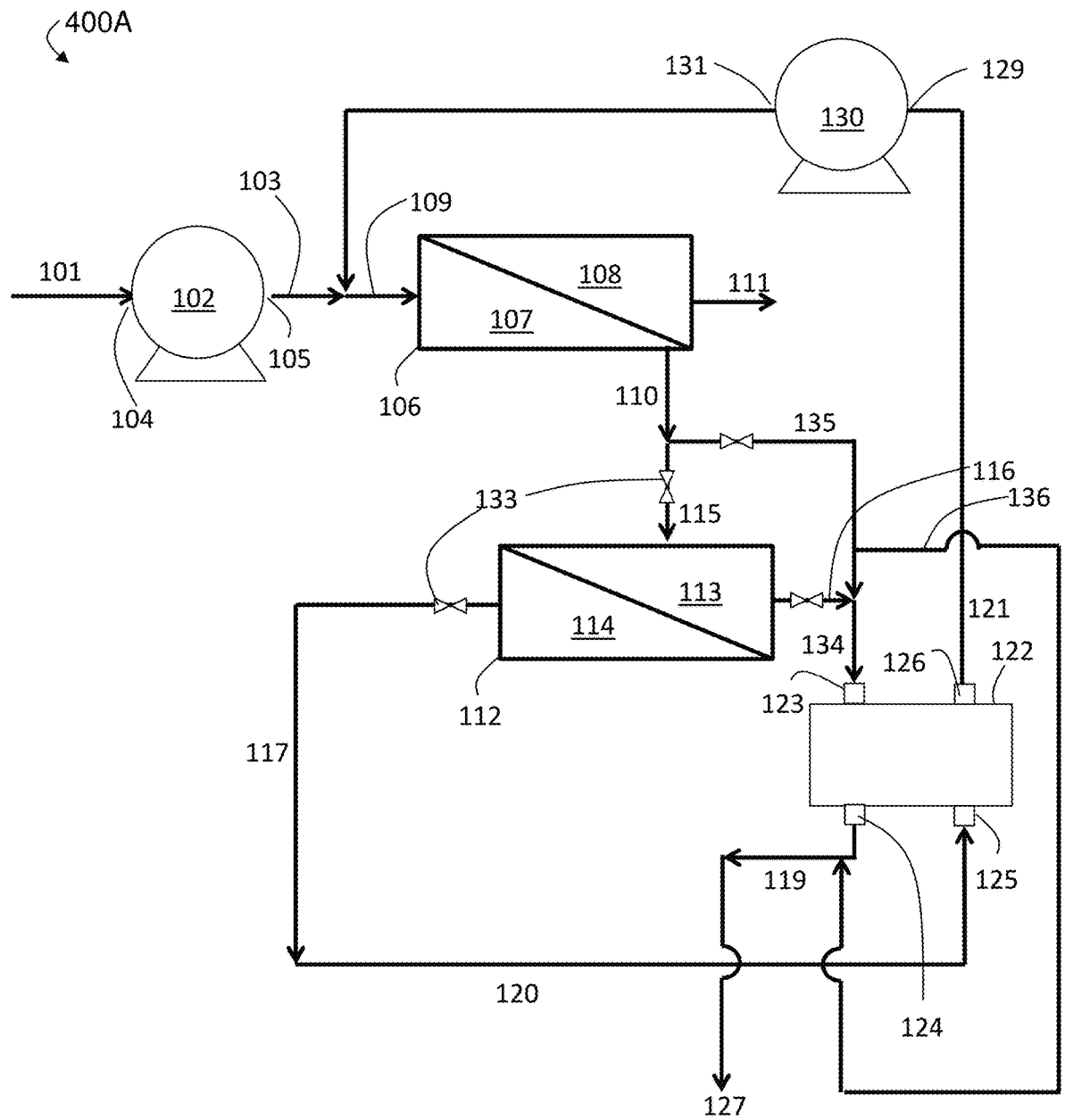
FIG. 4A is a schematic illustration of an exemplary osmotic system comprising reverse osmosis units and an energy recovery device in which valving can change system configurations, in accordance with certain embodiments.
Figure 4B:
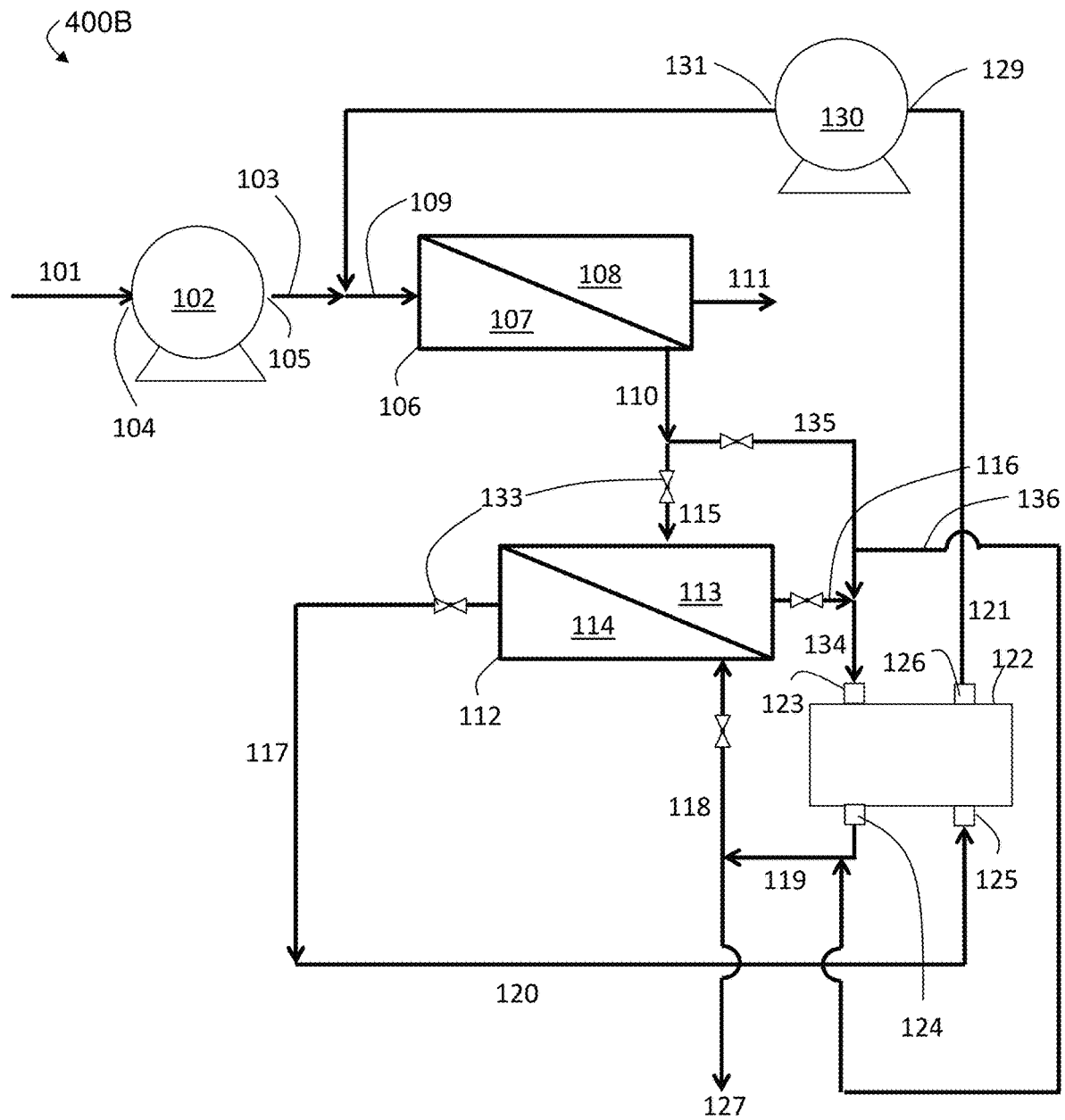
FIG. 4B is a schematic illustration of an exemplary osmotic system comprising reverse osmosis units and an energy recovery device in which valving can change system configurations, in accordance with certain embodiments.
Figure 5A:
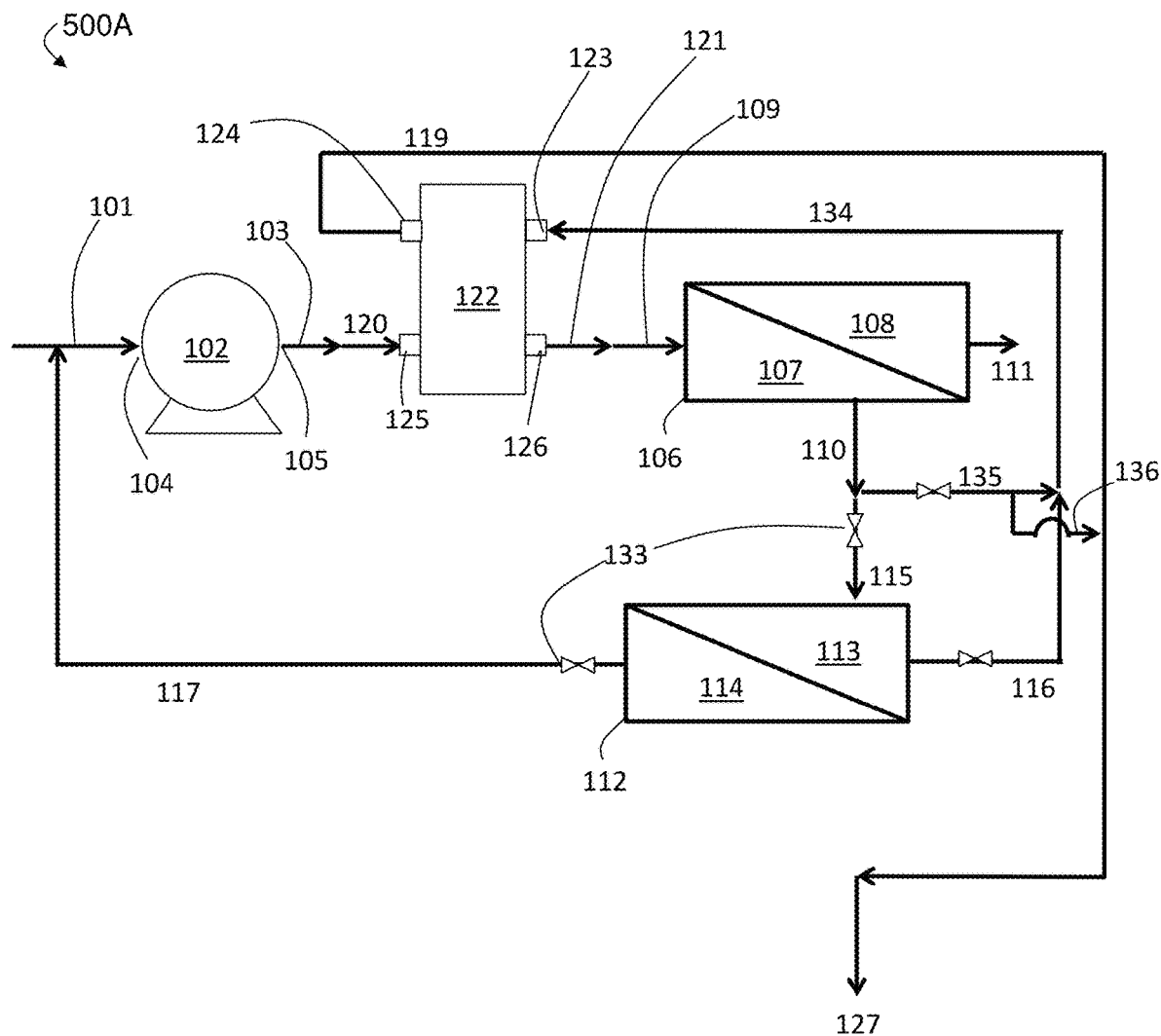
FIG. 5A is a schematic illustration of an exemplary osmotic system comprising reverse osmosis units and an energy recovery device in which valving can change system configurations, in accordance with certain embodiments.
Figure 5B:
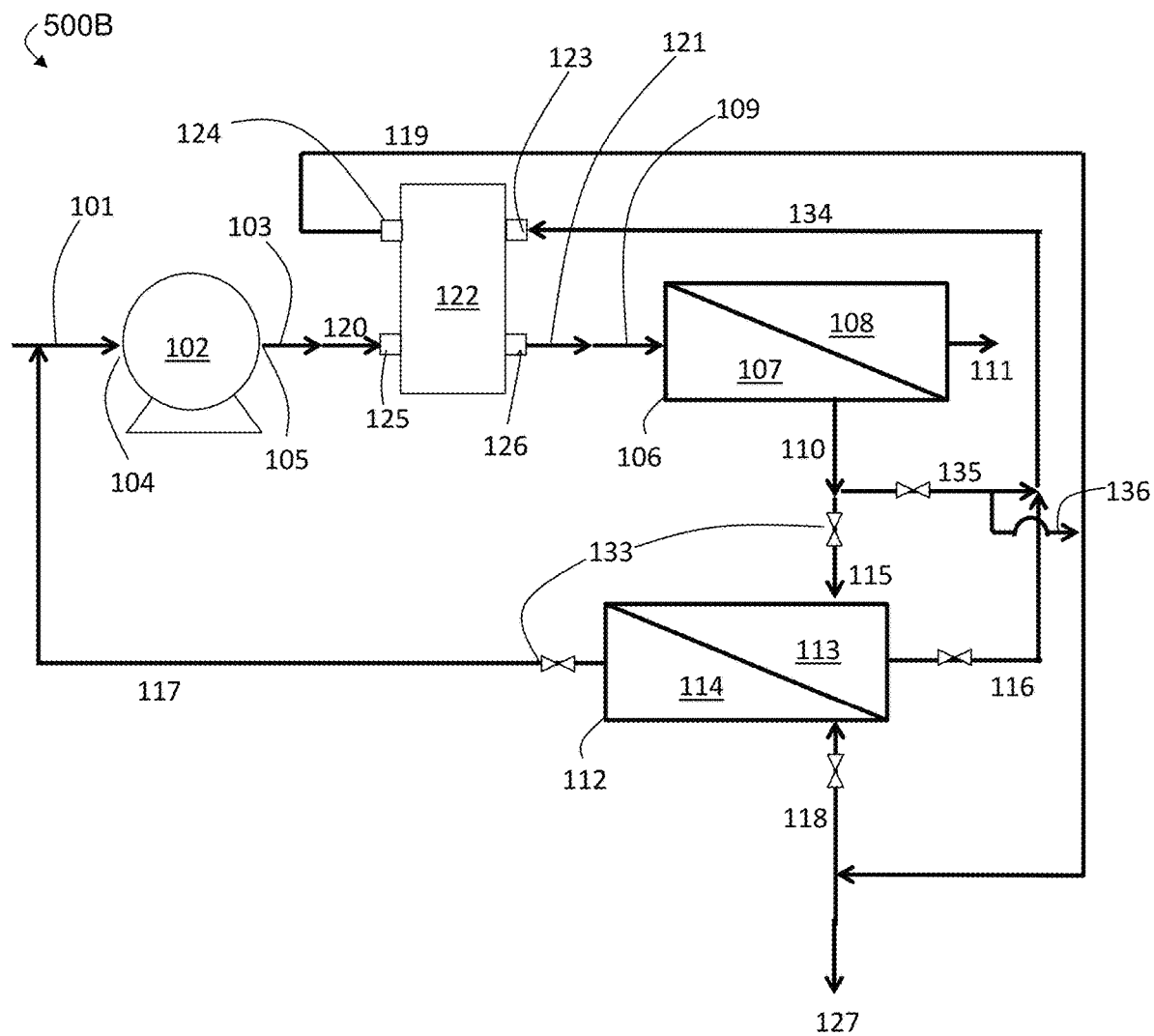
FIG. 5B is a schematic illustration of an exemplary osmotic system comprising reverse osmosis units and an energy recovery device in which valving can change system configurations, in accordance with certain embodiments.

Liquid solution concentration methods and related systems involving osmosis units and energy recovery are generally described. In some embodiments, an osmotic system comprises a pump, a first reverse osmosis unit, a second reverse osmosis unit, and one or more energy recovery devices. Various embodiments are directed to features such as balancing streams, recirculation streams, and/or valving that alone or in combination may afford improved energy efficiency and/or system performance. Some embodiments may improve performance of certain types of energy recovery devices in combination with osmosis units, such as isobaric or turbine energy recovery devices.

In one aspect of this disclosure, methods and systems directed to the use of balancing streams are provided. It has been realized that balancing streams may be employed in osmotic systems comprising first and second reverse osmosis units and an energy recovery device such that flow rates of streams entering the energy recovery device can be controlled and, in some instances, made equal or relatively similar. Further, in some embodiments, a balancing stream (e.g., combined with or diverted from a second reverse osmosis unit permeate outlet stream) can allow for a reduced duty for one or more pumps of the system while contributing to hydraulic pressure for effective separation at the first reverse osmosis unit and/or second reverse osmosis unit.

In another aspect of this disclosure, methods and systems directed to the use of recirculation streams are provided. It has been realized that recirculation streams may be employed in osmotic systems comprising first and second reverse osmosis units and an energy recovery device such that relatively highly pressured fluid is fed into one or more reverse osmosis units for a given amount of feed stream fed to the system and for a given amount of relatively pure permeate stream produced by the system. In such a way, a more energy-efficient system with less solute accumulation near membranes may be achieved, in some instances.

In another aspect of this disclosure, methods and systems directed to the use of bypass streams for operating an osmotic system (even if to a lesser extent) when one or more of the reverse osmosis units are at least partially offline (e.g., for maintenance) are provided. Such a system may comprise, for example, valving configured to modulate fluid flow (e.g., using at least the bypass stream). Some such osmotic systems may be configured to operate in a first way during at least a first period of time (e.g., when valving is in a first configuration) and a second way during at least a second period of time (e.g., when valving is in a second configuration). The first period of time and the second period of time may be non-overlapping periods of time. In some embodiments the first period of time and the second period of time are consecutive periods of time such that the end of the first time period coincides with the beginning of the second period of time. However, in some embodiments the first period of time and the second period of time are non-consecutive.

In some embodiments, more than one energy recovery (e.g., pressure exchange) process is employed. In some embodiments, the osmotic system comprises more than one energy recovery device. For example, the osmotic system may comprise a first energy recovery device and a second energy recovery device. Reject from a reverse osmosis unit (e.g., a relatively concentrated retentate outlet stream from a second reverse osmosis unit) may be partitioned between the first and second energy recovery devices, which may provide for an ability to control flow rates into each energy recovery device.

The first energy recovery device and the second energy recovery device may be of different types (e.g., a first energy recovery device is a turbine energy recovery device, a second energy recovery device is an isobaric energy recovery device), which may in some instances provide performance advantages, such as by allowing for relatively concentrated sweep streams at a reverse osmosis unit.

Various of the features described herein, alone or in combination, may, in accordance with certain embodiments, provide for any of a variety of advantages in osmotic liquid concentration methods. For example, embodiments herein may reduce energy consumption, capital cost, footprint, operating cost, or maintenance cost, and/or increase system productivity, efficiency, flexibility, or reliability relative to an amount of solution treated and/or solvent purified.

Methods (e.g., for concentrating liquids) and related osmotic systems are generally described. FIGS. 1A-6B show schematic illustrations of osmotic systems 100A, 100B, 100C, 100D, 100E, 100F, 100G, 100H, 200A, 200B, 300A, 300B, 400A, 400B, 500A, 500B, 600A, and 600B, respectively, which are examples of systems in which certain methods described herein may be carried out.

Some embodiments comprise treating a feed stream comprising a solvent and a solute (e.g., for liquid concentration, desalination, etc.). Some such embodiments involve steps in which a pressure of a stream affects operation of that step (e.g., such as osmotic separation steps involving application of hydraulic pressure). As such, some embodiments relate to manipulating pressures of liquid streams accordingly. In some embodiments, a pressure of at least a portion (e.g., at least 5 wt %, at least 10 wt %, at least 20 wt %, at least 50 wt %, at least 80 wt %, at least 90 wt %, at least 95 wt %, at least 99 wt %, or more) of a feed stream (e.g., comprising a solvent and a solute) is increased (e.g., by at least 5%, at least 10%, at least 20%, at least 50%, at least 80%, at least 90%, at least 95%, at least 99%, or more) to form a pressurized feed stream. For example, referring again to FIGS. 1A-6B, a pressure of feed stream 101 is increased via pump 102, resulting in pressurized feed stream 103. Some or all of the pressurized feed stream may be treated (e.g., subjected to a separation process) during one or more downstream processes, some of which may involve osmotic separation.

As mentioned above, an osmotic system may comprise a pump (e.g., pump 102). One of ordinary skill in the art, with the benefit of this disclosure, would know of suitable pumps for increasing the pressure of a fluidic stream (e.g., a feed stream). Generally, a pump has a pump inlet, where a stream to be pressurized encounters the pump, and a pump outlet, where a pressurized stream is ejected from the pump outlet. As an illustrative example, pump 102 in FIGS. 1A-6B comprises pump inlet 104 (e.g., into which feed stream 101 is fed) and pump outlet 105 configured to eject pressurized feed stream 103, in accordance with certain embodiments. In some embodiments, the pump (e.g., where a feed stream may be pressurized) is a high-pressure pump. Examples of pumps (e.g., high-pressure pumps) that may be suitable include, but are not limited to, multi-stage centrifugal pumps, piston pumps, and positive displacement pumps. Certain embodiments described herein (e.g., involving balancing streams, recirculation streams, and/or energy recovery) may reduce an amount of energy input needed for pumps of the osmotic system relative to existing systems.

Some embodiments comprise transporting a first reverse osmosis unit retentate inlet stream to a retentate side of a first reverse osmosis unit. A reverse osmosis unit refers to a collection of components including one or more osmotic membranes configured to perform a reverse osmosis process on at least one input stream and produce at least one output stream. The first reverse osmosis unit may comprise at least one osmotic membrane defining a permeate side of the first reverse osmosis unit and a retentate side of the first reverse osmosis unit. Each reverse osmosis unit described herein may include further sub-units such as, for example, individual osmotic membrane cartridges, valving, fluidic conduits, and the like. As described in more detail below, each osmotic "unit" can include a single osmotic membrane or multiple osmotic membranes. In some embodiments, a single reverse osmosis unit can include multiple osmotic sub-units (e.g., multiple osmotic cartridges) that may or may not share a common container.

In some embodiments, the first reverse osmosis unit retentate inlet stream (which may comprise at least a portion (e.g., at least 5 wt %, at least 10 wt %, at least 20 wt %, at least 50 wt %, at least 80 wt %, at least 90 wt %, at least 95 wt %, at least 99 wt %, or more) of liquid from the feed stream, optionally via one or more other streams) is transported to a retentate side of the first reverse osmosis unit such that a first reverse osmosis unit retentate outlet stream exits the retentate side of the first reverse osmosis unit, the first reverse osmosis unit retentate outlet stream having an osmotic pressure that is greater (e.g., by at least 5%, at least 10%, at least 20%, at least 50%, at least 80%, at least 90%, at least 95%, at least 99%, or more) than an osmotic pressure of the first reverse osmosis unit retentate inlet stream. For example, referring again to FIGS. 1A-6B, first reverse osmosis unit 106 may comprise at least one osmotic membrane defining retentate side 107 and permeate side 108, and first reverse osmosis unit retentate inlet stream 109 may be transported to retentate side 107 such that first reverse osmosis unit retentate outlet stream 110 exits retentate side 107. The step may be performed such that first reverse osmosis unit retentate outlet stream 110 has an osmotic pressure that is greater than an osmotic pressure of first reverse osmosis unit retentate inlet stream 109, according to some embodiments. In some embodiments, the osmotic system is operated such that the first reverse osmosis unit retentate inlet stream has a pressure of at least 200 psi (at least $1.38 \times 10^3$ kPa), at least 500 psi (at least $3.45 \times 10^3$ kPa), at least 750 psi (at least $5.17 \times 10^3$ kPa), at least 1000 psi (at least $6.90 \times 10^3$ kPa), and/or up to 1500 psi (at least $1.03 \times 10^4$ kPa), up to 2000 psi (at least $1.38 \times 10^4$ kPa), or more. In some embodiments, the osmotic system is operated such that the first reverse osmosis unit retentate outlet stream has a concentration that is increased with respect to the concentration of the first reverse osmosis unit retentate inlet stream by a factor of at least 1.03, at least 1.035, at least 1.05, at least 1.10, at least 1.25, and/or up to 1.40, up to 1.50, up to 2, up to 3, up to 4, up to 5 or greater.

In some embodiments, at least a portion (e.g., at least 5 wt %, at least 10 wt %, at least 20 wt %, at least 50 wt %, at least 80 wt %, at least 90 wt %, at least 95 wt %, at least 99 wt %, or more) of liquid from the first reverse osmosis unit retentate inlet stream is transported from the retentate side of the first reverse osmosis unit, through an osmotic membrane of the first reverse osmosis unit, to a permeate side of the first reverse osmosis unit. Referring again to FIGS. 1A-6B, for example, at least a portion of liquid from first reverse osmosis unit retentate inlet stream 109 may be transported from retentate side 107, through an osmotic membrane, to permeate side 108. Liquid transported from the retentate side to the permeate side of the first reverse osmosis unit may form some or all of a first reverse osmosis unit permeate outlet stream (e.g., first reverse osmosis unit permeate outlet stream 111 in FIGS. 1A-6B), which may be discharged from the osmotic system (e.g., as relatively pure liquid such as relatively pure water).

Transport of solvent (e.g., water) through osmotic membrane(s) of reverse osmosis units can be achieved via a transmembrane net driving force (i.e., a net driving force through the thickness of the membrane(s)), according to certain embodiments.

Generally, the transmembrane net driving force (Ar) is expressed as:

$$\Delta \chi = \Delta P - \Delta \Pi = (P_1 - P_2) - (\Pi_1 - \Pi H_2) \quad [1]$$

wherein $P_1$ is the hydraulic pressure on the retentate side of the osmotic membrane, $P_2$ is the hydraulic pressure on the permeate side of the osmotic membrane, $\Pi_1$ is the osmotic pressure of the stream on the retentate side of the osmotic membrane, and $\Pi_2$ is the osmotic pressure of the stream on the permeate side of the osmotic membrane. $(P_1-P_2)$ can be referred to as the transmembrane hydraulic pressure difference, and $(\Pi_1-\Pi_2)$ can be referred to as the transmembrane osmotic pressure difference.

Those of ordinary skill in the art are familiar with the concept of osmotic pressure. The osmotic pressure of a particular liquid is an intrinsic property of the liquid. The osmotic pressure can be determined in a number of ways, with the most efficient method depending upon the type of liquid being analyzed. For certain solutions with relatively low molar concentrations of ions, osmotic pressure can be accurately measured using an osmometer. In other cases, the osmotic pressure can simply be determined by comparison with solutions with known osmotic pressures. For example, to determine the osmotic pressure of an uncharacterized solution, one could apply a known amount of the uncharacterized solution on one side of a non-porous, semi-permeable, osmotic membrane and iteratively apply different solutions with known osmotic pressures on the other side of the osmotic membrane until the differential pressure through the thickness of the membrane is zero.

The osmotic pressure ($\Pi$) of a solution containing n solubilized species may be estimated as:

$$\Pi = \Sigma_{j=1}^{n} i_j M_1 RT \quad [2]$$

wherein $i_j$ is the van't Hoff factor of the $j^{th}$ solubilized species, $M_j$, is the molar concentration of the $j^{th}$ solubilized species in the solution, R is the ideal gas constant, and T is the absolute temperature of the solution. Equation 2 generally provides an accurate estimate of osmotic pressure for liquid with low concentrations of solubilized species (e.g., concentrations at or below between about 4 wt % and about 6 wt %). For many liquid comprising solubilized species, at species concentrations above around 4-6 wt %, the increase in osmotic pressure per increase in salt concentration is greater than linear (e.g., slightly exponential).

Reverse osmosis generally occurs when the osmotic pressure on the retentate side of the osmotic membrane is greater than the osmotic pressure on the permeate side of the osmotic membrane, and a pressure is applied to the retentate side of the osmotic membrane such that the hydraulic pressure on the retentate side of the osmotic membrane is sufficiently greater than the hydraulic pressure on the permeate side of the osmotic membrane such that the osmotic pressure difference is overcome and solvent (e.g., water) is transported from the retentate side of the osmotic membrane to the permeate side of the osmotic membrane. Generally, such situations result when the transmembrane hydraulic pressure difference $(P_1-P_2)$ is greater than the transmembrane osmotic pressure difference $(\Pi_1-\Pi_2)$ such that solvent (e.g., water) is transported from the retentate side of the osmotic membrane to the permeate side of the osmotic membrane (rather than having solvent transported from the permeate side of the osmotic membrane to the first side of the osmotic membrane, which would be energetically favored in the absence of the pressure applied to the retentate side of the osmotic membrane).

Some embodiments comprise transporting a second reverse osmosis unit retentate inlet stream to a retentate side of a second reverse osmosis unit. The second reverse osmosis unit may comprise at least one osmotic membrane defining a permeate side of the second reverse osmosis unit and a retentate side of the second reverse osmosis unit.

In some embodiments, the second reverse osmosis unit retentate inlet stream (which may comprise at least a portion (e.g., at least 5 wt %, at least 10 wt %, at least 20 wt %, at least 50 wt %, at least 80 wt %, at least 90 wt %, at least 95 wt %, at least 99 wt %, or more) of liquid from the first reverse osmosis unit retentate outlet stream, optionally via one or more other streams) is transported to a retentate side of the second reverse osmosis unit such that a second reverse osmosis unit retentate outlet stream exits the retentate side of the second reverse osmosis unit, the second reverse osmosis unit retentate outlet stream having an osmotic pressure that is greater (e.g., by at least 5%, at least 10%, at least 20%, at least 50%, at least 80%, at least 90%, at least 95%, at least 99%, or more) than an osmotic pressure of the second reverse osmosis unit retentate inlet stream. For example, referring again to FIGS. 1A-6B, second reverse osmosis unit 112 may comprise at least one osmotic membrane defining retentate side 113 and permeate side 114, and second reverse osmosis unit retentate inlet stream 115 may be transported to retentate side 113 such that second reverse osmosis unit retentate outlet stream 116 exits retentate side 113. The step may be performed such that second reverse osmosis unit retentate outlet stream 116 has an osmotic pressure that is greater than an osmotic pressure of second reverse osmosis unit retentate inlet stream 115, according to some embodiments. In some embodiments, the osmotic system is operated such that the second reverse osmosis unit retentate inlet stream has a hydraulic pressure that is at least 50%, at least 75%, at least 90%, at least 95%, or more of the pressure of the first reverse osmosis unit retentate inlet stream. In some embodiments, the osmotic system is operated such that the second reverse osmosis unit retentate outlet stream has a concentration that is increased with respect to the concentration of the second reverse osmosis unit retentate inlet stream by a factor of at least 1.05, at least 1.10, at least 1.20 at least 1.25, at least 1.40, at least 1.50, and/or up to 1.70, up to 1.80, up to 2, up to 3, up to 4, up to 5, up to 6, or greater.

In some embodiments, at least a portion (e.g., at least 5 wt %, at least 10 wt %, at least 20 wt %, at least 50 wt %, at least 80 wt %, at least 90 wt %, at least 95 wt %, at least 99 wt %, or more) of liquid from the second reverse osmosis unit retentate inlet stream is transported from the retentate side of the second reverse osmosis unit, through an osmotic membrane of the second reverse osmosis unit, to a permeate side of the second reverse osmosis unit. Referring again to FIGS. 1A-6B, for example, at least a portion of liquid from second reverse osmosis unit retentate inlet stream 115 may be transported from retentate side 113 through an osmotic membrane, to permeate side 114. Liquid transported from the retentate side to the permeate side of the second reverse osmosis unit may form some (e.g., at least 5 wt %, at least 10 wt %, at least 20 wt %, at least 50 wt %, at least 80 wt %, at least 90 wt %, at least 95 wt %, at least 99 wt %, or more) or all of a second reverse osmosis unit permeate outlet stream (e.g., second reverse osmosis unit permeate outlet stream 117 in FIGS. 1A-6B).

In some, but not necessarily all embodiments, a second reverse osmosis unit permeate inlet stream is transported to the permeate side of the second reverse osmosis unit. In some embodiments, liquid transported from the retentate side to the permeate side of the second reverse osmosis unit is combined with the second reverse osmosis unit permeate inlet stream to form the second reverse osmosis unit permeate outlet stream. The second reverse osmosis unit permeate outlet stream may be transported out of the permeate side, e.g., for further processing, recycling, discharge, or combinations thereof, as described in more detail below. As an example, the embodiments shown in FIGS. 1A-5 and 6B, second reverse osmosis unit permeate inlet stream 118 is transported to permeate side 114 of second reverse osmosis unit 112, where it can be combined with liquid transported from second reverse osmosis unit retentate inlet stream 115 that has passed through an osmotic membrane, to form second reverse osmosis unit permeate outlet stream 117. In some embodiments, the second reverse osmosis unit permeate inlet stream serves as a draw stream comprising a draw solution, non-limiting examples of compositions of which are described in further detail below. A draw stream (e.g., from second reverse osmosis unit permeate inlet stream 118) may, in accordance with certain embodiments, reduce a hydraulic pressure necessary for a reverse osmosis process to be performed at the second reverse osmosis unit (e.g., when the draw stream has an osmotic pressure such that a lower hydraulic pressure is required to achieve a given transmembrane net driving force relative to operation without the draw stream). In some embodiments, the osmotic system is operated such that the second reverse osmosis unit permeate inlet stream has a hydraulic pressure of less than or equal to 250 psi (less than or equal to $1.72 \times 10^3$ kPa), less than or equal to 200 psi (less than or equal to $1.38 \times 10^3$ kPa), less than or equal to 100 psi (less than or equal to $6.90 \times 10^2$ kPa), and/or as low as 50 psi (as low as $3.45 \times 10^2$ kPa) or less.

In some embodiments, energy may be recovered from one or more processes performed (e.g., in an osmotic system). For example, in some instances, energy may be recovered by transferring energy from a high pressure stream to a low pressure stream. It should be understood that the terms "high pressure", "low pressure", "pressurized", "depressurized" and "reduced-pressure" herein are used for convenience to distinguish relative pressures between two elements (e.g., relative pressures of streams, relative pressures at inlets/outlets, etc.) and are not meant to imply any particular absolute pressure value or range of values. For example, when energy is said to be transferred from a high pressure stream to a low pressure stream, it should be understood that a pressure of the stream from which energy is being transferred is greater than that of the stream receiving the energy. Similarly, when a stream enters a high pressure inlet of a component of an osmotic system and exits a low pressure outlet of an osmotic system, that stream it understood to have undergone depressurization, but no particular absolute pressures of the stream at the high pressure inlet and low pressure outlet should be imputed.

Some embodiments comprise reducing (e.g., by at least 5%, at least 10%, at least 20%, at least 50%, at least 80%, at least 90%, at least 95%, at least 99%, or more) a pressure of at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit retentate outlet stream or a concentrate stream (e.g., comprising at least a portion of the second reverse osmosis unit retentate outlet stream) to form a reduced-pressure concentrate stream. For example, referring again FIGS. 1A-6B, at least a portion of second reverse osmosis unit retentate outlet stream 116 or concentrate stream 134 (e.g., comprising at least a portion of second reverse osmosis unit retentate outlet stream 116) may be reduced to form reduced-pressure concentrate stream 119. Reducing a pressure of a stream, as noted above, may provide energy that can be recovered by transferring that energy to one or more other streams (e.g., by pressurizing the other stream(s)). In some embodiments, at least a portion (e.g., at least 5%, at least 10%, at least 20%, at least 50%, at least 80%, at least 90%, at least 95%, at least 99%, or more) of energy recovered by reducing the pressure of the at least a portion of the second reverse osmosis unit retentate outlet stream/concentrate stream is used to increase (e.g., by at least 5%, at least 10%, at least 20%, at least 50%, at least 80%, at least 90%, at least 95%, at least 99%, or more) a pressure of an energy recovery stream to form a pressurized energy recovery stream. In the embodiments shown in FIGS. 1A-6B, at least a portion of energy recovered upon reducing a pressure of second reverse osmosis unit retentate outlet stream 116 or concentrate stream 134 (e.g., comprising at least a portion of second reverse osmosis unit retentate outlet stream 116) may be used to increase a pressure of energy recovery stream 120 to form pressurized energy recovery stream 121.

In some embodiments, the osmotic system is operated such that the portion of the second reverse osmosis unit retentate outlet stream or concentrate entering the energy recovery device has a pressure that is at least 50%, at least 75%, at least 90%, at least 95%, or more of the pressure of the second reverse osmosis unit retentate inlet stream. In some embodiments, the osmotic system is operated such that at least 50%, at least 75%, at least 80%, at least 90%, at least 95%, at least 98%, or more of the hydraulic pressure of the second reverse osmosis unit retentate outlet stream or concentrate stream (optionally comprising at least a portion of the second reverse osmosis unit retentate outlet stream) is transferred to the energy recovery stream (e.g., in an energy recovery device).

Any of a variety of techniques known in the art, with the benefit of this disclosure, may be used for energy recovery between streams. In some embodiments, the osmotic system comprises an energy recovery device. Those of ordinary skill in the art are familiar with energy recovery devices in the context of liquid treatment (e.g., concentration) systems. For example, energy recovery process described herein may be performed using an energy recovery device in the form of a pressure exchange device configured to transfer pressure energy from a high pressure fluid stream to a low pressure fluid stream. Various forms of energy recovery devices that may be suitable include, but are not limited to, work exchangers, recuperators, double-acting cylinders, reverse-positive-displacement pumps, centrifugal energy recovery devices, and axial-piston motors.

In FIGS. 1A-6B, for example, osmotic systems 100A, 100B, 100C, 100D, 100E, 100F, 100G, 100H, 200A, 200B, 300A, 300B, 400A, 400B, 500A, 500B, 600A and 600B, respectively, comprise energy recovery device 122. The energy recovery device may comprise a high pressure inlet, a low pressure inlet, a high pressure outlet, and a low pressure outlet. For example, energy recovery device 122 may be configured to receive second reverse osmosis unit retentate outlet stream 116 or concentrate stream 134 via high pressure inlet 123 and depressurize second reverse osmosis unit retentate outlet stream 116 or concentrate stream 134 to form reduced-pressure concentrate stream 119, which is ejected via low pressure outlet 124, according to some embodiments. Meanwhile, energy recovery device 122 may be further configured to receive energy recovery stream 120 via low pressure inlet 125 and pressurize energy recovery stream 120 (using energy recovered from the depressurization of second reverse osmosis unit retentate outlet stream 116) to form pressurized energy recovery stream 121, which is ejected via high pressure outlet 126, according to some embodiments.

Various types of energy recovery devices (e.g., pressure exchange devices) are suitable, depending, for example, on a desired configuration. In some embodiments, the energy recovery device is an isobaric energy recovery device. An isobaric energy recovery device generally refers to one that directly transfers pressure from a higher pressure stream to a lower pressure stream via a pressure equalization mechanism (e.g., via positive displacement, piston, and/or rotary action). Examples of isobaric energy recovery devices are described in U.S. Pat. No. 2,675,173 to Jendrassik, entitled "Apparatus Effecting Pressure Exchange" and issued on Apr. 13, 1954, and U.S. Pat. No. 4,887,942 to Hauge, entitled "Pressure Exchanger for Liquids" and issued on Dec. 19, 1989, each of which is incorporated herein by reference in its entirety. Specific types of isobaric energy recovery devices include, but are not limited to, piston isobaric energy recovery devices, double-acting cylinder isobaric energy recovery devices, two-cylinder isobaric energy recovery devices, rotary energy recovery devices, and combinations, thereof. In some embodiments, the energy recovery device is a turbine energy recovery device. A turbine energy recovery device generally refers to one that transfers hydraulic energy from a higher pressure stream to mechanical energy (e.g., to an impeller via a turbine), and the mechanical energy is then transferred to a lower pressure stream (e.g., via the impeller spinning the lower pressure stream to increase the stream's hydraulic pressure). Examples of potentially suitable turbine energy recovery devices include, but are not limited to, turbochargers, Pelton wheels, and Francis turbines.

Figure 6A:
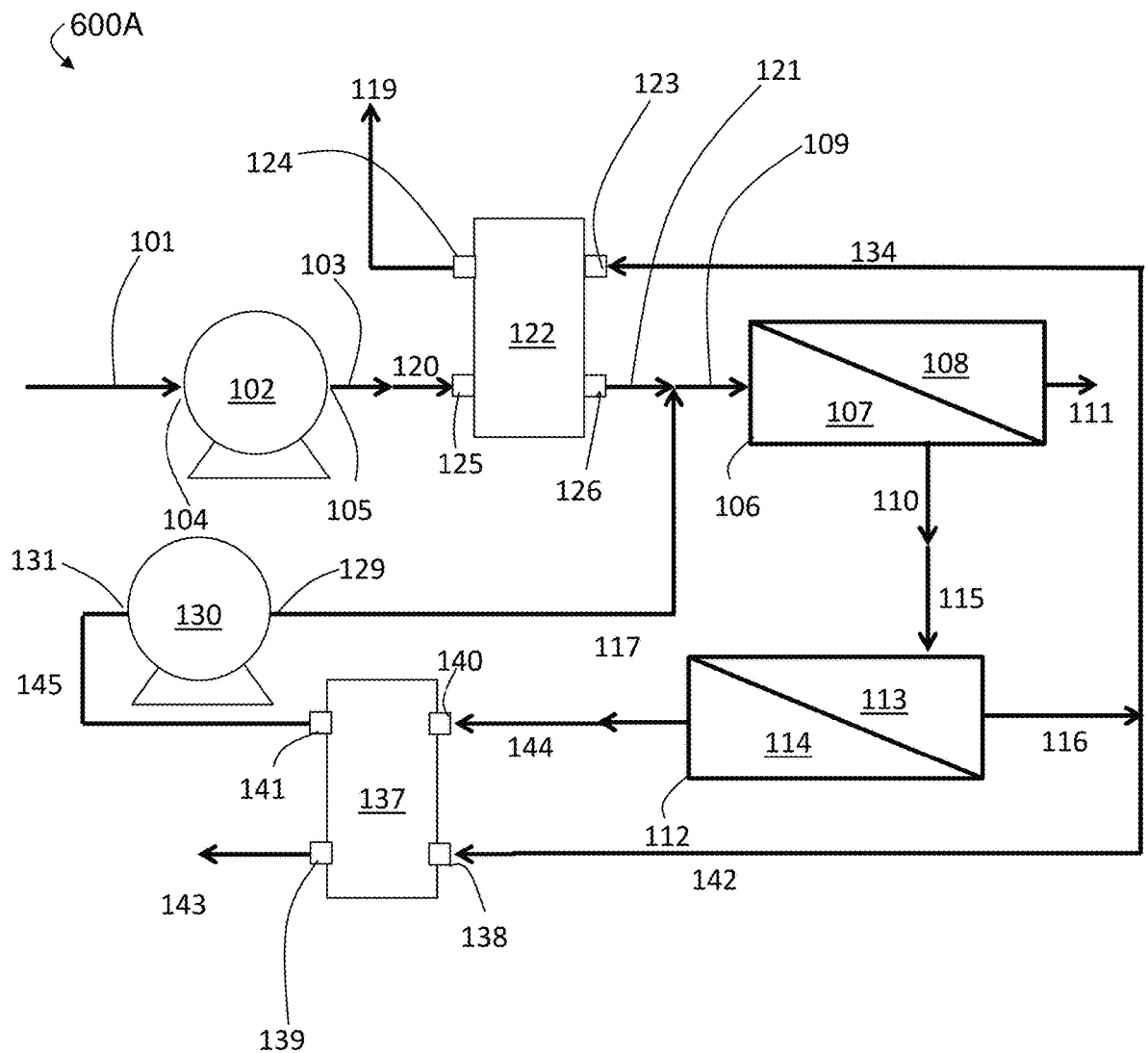
FIG. 6A is a schematic illustration of an exemplary osmotic system comprising reverse osmosis units, a first energy recovery device, and a second energy recovery device, in accordance with certain embodiments.
Figure 6B:
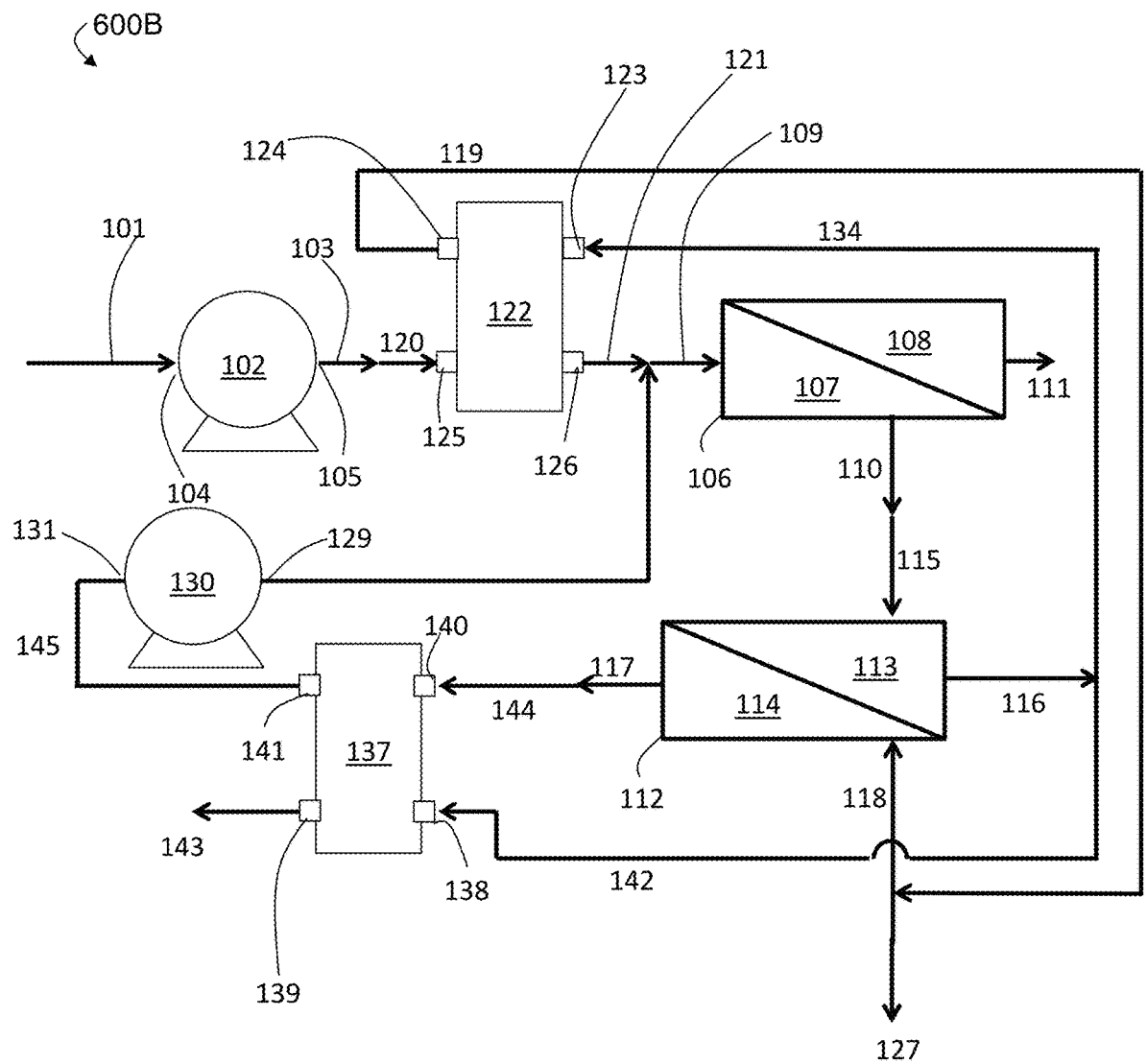
FIG. 6B is a schematic illustration of an exemplary osmotic system comprising reverse osmosis units, a first energy recovery device, and a second energy recovery device, in which a reverse osmosis unit receives a permeate inlet stream, in accordance with certain embodiments.

FIGS. 1A-6B show various configurations of the osmotic systems described herein, any number of features of which may be combined, in accordance with certain embodiments. FIGS. 1A-1H show schematic illustrations of osmotic systems 100A, 100B, 100C, 100D, 100E, 100F, 100G, and 100H, respectively, employing a balancing stream, according to some embodiments. FIGS. 2A-2B and 3A-3B show schematic illustrations of osmotic systems 200A, 200B, 300A, and 300B, respectively, employing a recirculation stream, according to some embodiments. FIGS. 4A-5B shows schematic illustrations of osmotic systems 400A, 400B, 500A, and 500B, respectively, employing a bypass stream, according to some embodiments. FIGS. 6A-6B show schematic illustrations of osmotic systems 600A and 600B, respectively, employing a combination of multiple energy recovery devices, according to some embodiments.

In each of FIGS. 1A-6B, feed stream 101 is fed to pump 102 via pump inlet 104, where feed stream 101 is pressurized and ejected via pump outlet 105 to form pressurized feed stream 103. A first reverse osmosis unit retentate inlet stream may comprise at least a portion of the pressurized feed stream. In some embodiments, the retentate side of the first reverse osmosis unit is fluidically connected to the pump outlet. In such a way, in the embodiments shown in FIGS. 1A-2B and 4A-4B, some (e.g., at least 5 wt %, at least 10 wt %, at least 20 wt %, at least 50 wt %, at least 80 wt %, at least 90 wt %, at least 95 wt %, at least 99 wt %, or more) or all of pressurized feed stream 103 may be transported (e.g., via one or more fluidic conduits) to retentate side 107 of first reverse osmosis unit 106 by forming some or all of first reverse osmosis unit retentate inlet stream 109. In some embodiments in which operation and connectivity is varied during different periods of time, this operation and connectivity may occur during both a first period of time and a second period of time.

As mentioned above, a pressure of an energy recovery stream may be increased (e.g., in an energy recovery device) using energy recovered from depressurization of a second reverse osmosis unit retentate outlet stream or a concentrate stream (optionally comprising at least a portion of a second reverse osmosis unit retentate outlet stream), thereby forming a pressurized energy recovery stream. In some such embodiments, the energy recovery stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the pressurized feed stream. In some embodiments, a low pressure inlet of the energy recovery device is fluidically connected to the pump outlet. In such a way, in FIGS. 3A-3B, 5A-5B, and 6A-6B, some (e.g., at least 5 wt %, at least 10 wt %, at least 20 wt %, at least 50 wt %, at least 80 wt %, at least 90 wt %, at least 95 wt %, at least 99 wt %, or more) or all of pressurized feed stream 103 may be transported (e.g., via one or more fluidic conduits) to low pressure inlet 125 of energy recovery device 122 by forming some of energy recovery stream 120, and a pressure of energy recovery stream 120 may be increased in energy recovery device 122 to form pressurized energy recovery stream 121, which is ejected from energy recovery device 122 via high pressure outlet 126. In some embodiments in which operation and connectivity is varied during different periods of time, this operation and connectivity may occur during both a first period of time and a second period of time.

In some embodiments, energy recovered in the energy recovery device contributes to one or more osmotic separation processes, which may reduce (e.g., by at least 5%, at least 10%, at least 20%, at least 50%, at least 80%, at least 90%, at least 95%, at least 99%, or more) a required energetic input from other components of the system, such as the pump (e.g., high pressure pump). For example, in some embodiments, a first reverse osmosis unit retentate inlet stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the pressurized energy recovery stream. In some embodiments, the retentate side of the first reverse osmosis unit is fluidically connected to the high pressure outlet of the energy recovery device. In FIGS. 3A-3B, 5A-5B, and 6A-6B, some (e.g., at least 5 wt %, at least 10 wt %, at least 20 wt %, at least 50 wt %, at least 80 wt %, at least 90 wt %, at least 95 wt %, at least 99 wt %, or more) or all of pressurized energy recovery stream 121 may be transported (e.g., via one or more fluidic conduits) to retentate side 107 of first reverse osmosis unit 106 by forming some or all of first reverse osmosis unit retentate inlet stream 109. In FIGS. 1A-2B and 4A-4B, pressurized energy recovery stream 121 may be combined with pressurized feed stream 103 to form some or all of first reverse osmosis unit retentate inlet stream 109. Pressure from the pressurized energy recovery stream may contribute to hydraulic pressure used to perform a reverse osmosis process in the first reverse osmosis unit, thereby reducing the amount of hydraulic pressure needed from the pump (e.g., pump 102). In some embodiments in which operation and connectivity is varied during different periods of time, this operation and connectivity may occur during both a first period of time and a second period of time.

In each of FIGS. 1A-6B, a portion of liquid from first reverse osmosis unit retentate inlet stream 109 may be transferred through an osmotic membrane to permeate side 108, resulting in first reverse osmosis unit retentate outlet stream 110 (having a higher osmotic pressure than first reverse osmosis unit retentate inlet stream 109) exiting retentate side 107 and, in some instances, first reverse osmosis unit permeate outlet stream 111 exiting permeate side 108 (e.g., to be discharged from osmotic system 100A, 100B, 100C, 100D, 100E, 100F, 100G, 100H, 200A, 200B, 300A, 300B, 400A, 400B, 500A, 500B, 600A, or 600B). In some embodiments, at least 5%, at least 10%, at least 20%, at least 50%, at least 75%, at least 90%, or more of the feed stream by volume is discharged from the osmotic system (e.g., as purified liquid, such as purified water). A remainder of fluid not discharged may be further processed in the system (e.g., as the first reverse osmosis unit retentate outlet stream).

In some embodiments, the second reverse osmosis unit retentate inlet stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the first reverse osmosis unit retentate outlet stream. In some embodiments, the retentate side of the first reverse osmosis unit is fluidically connected to the retentate side of the second reverse osmosis unit. In such a way, in FIGS. 1A-6B, some (e.g., at least 5 wt %, at least 10 wt %, at least 20 wt %, at least 50 wt %, at least 80 wt %, at least 90 wt %, at least 95 wt %, at least 99 wt %, or more) or all of first reverse osmosis unit retentate outlet stream 110 may be transported (e.g., via one or more fluidic conduits) to retentate side 113 of second reverse osmosis unit 112 by forming some or all of second reverse osmosis unit retentate inlet stream 115. A portion of liquid from second reverse osmosis unit retentate inlet stream 115 may be transferred through an osmotic membrane to permeate side 114, resulting in second reverse osmosis unit retentate outlet stream 116 (having a higher osmotic pressure than that of second reverse osmosis unit retentate inlet stream 115) exiting retentate side 113 and, in some instances second reverse osmosis unit permeate outlet stream 117. Second reverse osmosis unit permeate outlet stream 117 may comprise a combination of liquid transferred through the osmotic membrane and second reverse osmosis unit permeate inlet stream 118 (e.g., a draw stream), a source of which is described in more detail below. As such, second reverse osmosis unit permeate outlet stream 117 may have a lower osmotic pressure than that of second reverse osmosis unit permeate inlet stream 118.

As mentioned above, at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit retentate outlet stream may be depressurized to form a reduced-pressure concentrate stream. Such a process may occur using an energy recovery device (e.g., an isobaric energy recovery device, a turbine energy recovery device). In some embodiments, the retentate side of the second reverse osmosis unit is fluidically connected to the high pressure inlet of the energy recovery device. In such a way, in FIGS. 1A-6B, some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit retentate outlet stream 116 may be transported (e.g., via one or more fluidic conduits) to high pressure inlet 123 of energy recovery device 122, where a pressure of second reverse osmosis unit retentate outlet stream 116 is reduced to form reduced-pressure concentrate stream 119, which is ejected from energy recovery device 122 via low pressure outlet 124.

In some embodiments in which the osmotic system includes a second reverse osmosis unit permeate inlet stream, the second reverse osmosis unit permeate inlet stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the reduced-pressure concentrate stream. Such a configuration may, in some instances, contribute to beneficial performance of the osmotic system by providing a relatively low-hydraulic pressure draw stream with dissolved solute, the presence of which may reduce a required hydraulic pressure at the retentate side for performing a reverse osmosis process (thereby saving energy and/or increasing system durability). In some embodiments, the permeate side of the second reverse osmosis unit is fluidically connected to the low pressure outlet of the energy recovery device. In such a way, in FIGS. 1B, 1D, 1F, 1H, 2B, 3B, 4B, 5B, and 6B, some (e.g., at least 5 wt %, at least 10 wt %, at least 20 wt %, at least 50 wt %, at least 80 wt %, at least 90 wt %, at least 95 wt %, at least 99 wt %, or more) or all of reduced-pressure concentrate stream 119 may be transported (e.g., via one or more fluidic conduits) to permeate side 114 of second reverse osmosis unit 112 by forming some or all of second reverse osmosis unit permeate inlet stream 118 (which can serve as a draw stream).

In some embodiments, at least a portion (e.g., at least 5 wt %, at least 10 wt %, at least 20 wt %, at least 50 wt %, at least 80 wt %, at least 90 wt %, at least 95 wt %, at least 99 wt %, or more) of the reduced-pressure concentrate stream is discharged from the system. For example, referring to FIGS. 1A-5B and 6B, optional discharged portion 127 may be diverted from reduced-pressure concentrate stream 119 and removed from osmotic system 100A, 100B, 100C, 100D, 100E, 100F, 100G, 100H, 200A, 200B, 300A, 300B, 400A, 400B, 500A, 500B, or 600B. In some embodiments, all of the reduced-pressure concentrate stream is discharged from the system. For example, in FIGS. 6A and 6B, all of reduced-pressure first concentrate stream 119 may be discharged from osmotic system 600A. Discharging at least a portion of the reduced-pressure stream may allow for control of a flow rate of the second reverse osmosis unit permeate inlet and outlet streams, which may, along with an optional balancing stream, provide for advantageous control of the energy recovery device and/or pump. Such a discharged portion may also provide for a source of fluid having a relatively high concentration of solute, which may be useful for further downstream processes. In some embodiments in which operation and connectivity is varied during different periods of time, this operation and connectivity may occur during both a first period of time and a second period of time.

As mentioned above, a pressure of an energy recovery stream may be increased (e.g., in the energy recovery device) using energy recovered from depressurization of the second reverse osmosis unit retentate outlet stream, thereby forming a pressurized energy recovery stream. Such a transfer of energy (e.g., in the form of stream pressure) may reduce energy loss in the system and promote high pressures at desired locations (e.g., at retentate sides) and low pressures at desired locations (e.g., at draw streams). The energy recovery stream may comprise at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream. In some embodiments, the permeate side of the second reverse osmosis unit is fluidically connected to the low pressure inlet of the energy recovery device. In such a way, in FIGS. 1A-2B and 4A-4B, some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit permeate outlet stream 117 may be transported (e.g., via one or more fluidic conduits) to low pressure inlet 125 of energy recovery device 122 by forming some or all of energy recovery stream 120, and a pressure of energy recovery stream 120 may be increased in energy recovery device 122 to form pressurized energy recovery stream 121, which is ejected from energy recovery device 122 via high pressure outlet 126.

In some embodiments in which the pressurized energy recovery stream is combined with the pressurized feed stream, a pressure of the pressurized energy recovery stream (e.g., optionally having been combined with a recirculation stream as explained below) is further increased (e.g., by at least 5%, at least 10%, at least 20%, at least 50%, at least 80%, at least 90%, at least 95%, at least 99%, or more) prior to combining the pressurized energy recovery stream and the pressurized feed stream (e.g., to form the first reverse osmosis unit retentate inlet stream). For example, the pump (e.g., high-pressure pump) of the osmotic system mentioned above may be a first pump, and the osmotic system may further comprise a second pump. The second pump may be used to adjust the flow rate of the pressurized energy recovery stream (and/or increase its pressure by at least 5%, at least 10%, at least 20%, at least 50%, at least 80%, at least 90%, at least 95%, at least 99%, or more) and the flow through retentate sides 107 and 113 of the first and second reverse osmosis units 106 and 112, respectively. In such a way, a more energy-efficient system with less solute accumulation near membranes may be achieved, in some instances. In some embodiments, the second pump comprises a second pump inlet and a second pump outlet, wherein the second pump inlet is fluidically connected to the high pressure outlet of the energy recovery device and the second pump outlet is fluidically connected to the retentate side of the first reverse osmosis unit. For example, in FIGS. 1A-2B, and 4A-4B, pressurized energy recovery stream 121 exiting high pressure outlet 126 of energy recovery device 122 (in some instances having been combined with recirculation stream 132 as in FIGS. 2A-2B) may be fed into second pump inlet 129 of optional second pump 130, where it is pressurized and ejected via second pump outlet 131 at a higher pressure, and subsequently is combined with pressurized feed stream 103. In some embodiments in which operation and connectivity is varied during different periods of time, this operation and connectivity may occur during both a first period of time and a second period of time.

As mentioned above, a balancing stream may be employed to manipulate flow rates and/or pressure distribution within the osmotic system. One source of the balancing stream may be a portion of the feed stream (e.g., prior to its pressurization at the pump). For example, in some embodiments, the energy recovery stream comprises a balancing stream comprising at least a portion (e.g., at least 5 wt %, at least 10 wt %, at least 20 wt %, at least 50 wt %, at least 80 wt %, at least 90 wt %, at least 95 wt %, at least 99 wt %, or more) of the feed stream. In some embodiments, the pump inlet is fluidically connected to the low pressure inlet of the energy recovery device. In such a way, in FIGS. 1A-1B, a portion of feed stream 101 being fed to pump inlet 104 is diverted as balancing stream 128 to form part of energy recovery stream 120 (which is subsequently pressurized in energy recovery device 122).

In some embodiments, a source of the balancing stream is a portion of the second reverse osmosis unit permeate outlet stream, and the balancing stream is instead incorporated into the feed stream. For example, in some embodiments, the feed stream comprises a balancing stream comprising at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream. In the embodiments shown in FIGS. 1C-1D, osmotic systems 100C and 100D are configured such that a first portion of second reverse osmosis unit permeate outlet stream 117 forms some (e.g., at least 5 wt %, at least 10 wt %, at least 20 wt %, at least 50 wt %, at least 80 wt %, at least 90 wt %, at least 95 wt %, at least 99 wt %, or more) or all of energy recovery stream 120 (which is subsequently pressurized in energy recovery device 122), and a second portion (e.g., at least 5 wt %, at least 10 wt %, at least 20 wt %, at least 50 wt %, at least 80 wt %, at least 90 wt %, at least 95 wt %, at least 99 wt %, or more) of second reverse osmosis unit permeate outlet stream 117 is diverted to feed stream 101 as balancing stream 128.

Some embodiments comprise comprising adjusting a flow rate of the second reverse osmosis unit permeate outlet stream and/or the balancing stream. Adjusting one or both of these flow rates may, in some instances, improve performance of the energy recovery device and/or the overall osmotic system. In some embodiments, a mass flow rate of the second reverse osmosis unit permeate outlet stream and/or the balancing stream is adjusted such that the energy recovery stream has a similar mass flow rate to that of the portion of the second reverse osmosis unit retentate outlet stream (e.g., the portion being fed to the energy recovery device). Matching the flow rates of the streams entering and/or exiting the energy recovery device may, in some instances be advantageous. For example, as mentioned above, the energy recovery device may be an isobaric energy recovery device. In some embodiments, matching the flow rates of streams entering and/or exiting an isobaric energy recovery device reduces or eliminates mixing of streams within the isobaric energy recovery device. A degree of mixing of the streams within the isobaric energy recovery device may be proportional to an imbalance in flow rates of streams entering and/or exiting the isobaric energy recovery device. Mixing of streams may result in a relatively higher amount of solute in the pressurized energy recovery stream being fed back to the first reverse osmosis unit, which may consequently require a higher amount of hydraulic pressure to be supplied for operation of the first reverse osmosis unit, reducing energy efficiency and increasing duty on the system compared to operation described here with limited to no mixing. It should be understood that adjusting the flow rates described herein may also improve performance of other types of energy recovery devices, such as turbine energy recovery devices.

In some embodiments, a mass flow rate of the second reverse osmosis unit permeate outlet stream and/or the balancing stream is adjusted such that the energy recovery stream has a mass flow rate within 20%, within 10%, within 5%, within 2%, within 1%, within 0.1%, or less of a mass flow rate of the at least a portion of the second reverse osmosis unit retentate outlet stream that enters the energy recovery device. As would be understood by one of ordinary skill in the art, a percentage difference is measured relative to the lower value. For example, if the mass flow rate of the second reverse osmosis unit retentate outlet stream is 20 kg/hr and the mass flow rate of the energy recovery stream is 22 kg/hr, then the mass flow rate of the second reverse osmosis unit retentate outlet stream is within 10% of the mass flow rate of the energy recovery stream (because [22 kg/hr-20 kg/hr]/20 kg/hr×100%=10%). As another example, if the mass flow rate of the second reverse osmosis unit retentate outlet stream is 22 kg/hr and the mass flow rate of the energy recovery stream is 20 kg/hr, then the mass flow rate of the second reverse osmosis unit retentate outlet stream is within 10% of the mass flow rate of the energy recovery stream (because [22 kg/hr-20 kg/hr]/20 kg/hr× 100%=10%).

As mentioned above, in some embodiments, the osmotic system (e.g., comprising a balancing stream) is operated such that a mass flow rate of the energy recovery stream entering the energy recovery device is within 20%, within 10%, within 5%, within 2%, within 1%, within 0.1%, or less of a mass flow rate of the at least a portion of the second reverse osmosis unit retentate outlet stream. The mass flow rate the energy recovery stream may be controlled, in some embodiments, by adjusting a ratio of the amount of reduced-pressure concentrate stream sent to the second reverse osmosis unit permeate inlet stream to the amount of reduced-pressure concentrate stream sent elsewhere (e.g., discharged from the system). Such a ratio may be referred to as a "recycle ratio." In some embodiments, the osmotic system is operated such that the recycle ratio is at least 0.1, at least 0.25, at least 0.5, and/or up to 0.6, up to 0.75, or more by volume. In some embodiments, the osmotic system is operated such that the mass flow rate of the second reverse osmosis unit permeate outlet stream is at least 25%, at least 50%, at least 75%, at least 100%, and/or up to 125%, up to 150%, up to 175%, or more of the mass flow rate of the portion of the feed stream entering the pump. The mass flow rate of the energy recovery stream may also be controlled by adjusting a rate of the balancing stream (either being merged with the energy recovery stream as in FIGS. 1A-1B or diverted from the energy recovery device (e.g., by being diverted from the second reverse osmosis unit permeate outlet stream as in FIG. 1C-1D)). In some embodiments, a mass flow rate of the balancing stream is at least 2%, at least 5%, at least 10%, at least 25%, and/or up to 40%, up to 50%, or more of the portion of the feed stream entering the pump. In some embodiments, the balancing stream mass flow rate may be adjusted to compensate for changes in the recycle ratio mentioned above to maintain flow rate balance in the system (e.g., in the energy recovery device). Flow rates of streams of the osmotic system may be adjusted, for example, using flow control valves and/or pumps (e.g., booster pumps) operatively coupled to the streams.

In some embodiments, the osmotic system (e.g., comprising a balancing stream) is operated such that a salinity of the pressurized energy recovery stream (e.g., exiting an energy recovery device) is relatively close to a salinity of the energy recovery stream (e.g., entering the energy recovery device). In some embodiments, the osmotic system is operated such that a salinity of the pressurized energy recovery stream is within 20%, within 10%, within 5%, within 2%, within 1%, within 0.1%, or less of a salinity of the energy recovery stream. As used herein, the salinity of a liquid stream refers to the weight percent (wt %) of all dissolved salts in the liquid stream. Having relatively little change in the salinity of the pressurized energy recovery stream relative to the energy recovery stream may be advantageous in some instances where lower solute concentrations in streams fed to reverse osmosis units (e.g., for separation processes) are desired. For example, less hydraulic pressure may need to be applied in reverse osmosis units receiving streams having lower solute concentrations (e.g., to accomplish a given amount of desalination). One way in which control of the salinity of the energy recovery stream and pressurized energy recovery stream can be accomplished is by avoiding mixing between the energy recovery stream and other streams it may encounter, for example in an energy recovery device. Mixing may be limited or eliminated, for example, via judicious control of mass flow rates in the energy recovery device (e.g., via control of a balancing stream and/or a system's recycle ratio), as mentioned above. Salinity may be measured according to any method known in the art. For example, a non-limiting example of a suitable method for measuring salinity is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The salinity of the sample may be obtained by dividing the mass of the total dissolved solids by the mass of the original sample and multiplying the resultant number by 100.

As mentioned above, a recirculation stream may be employed (e.g., to manipulate pressure distribution within the osmotic system). In some embodiments (e.g., as shown in osmotic systems 200A and 200B in FIGS. 2A-2B), the first reverse osmosis unit retentate inlet stream comprises a recirculation stream. The recirculation stream may comprise a first portion (e.g., at least 5 wt %, at least 10 wt %, at least 20 wt %, at least 50 wt %, at least 80 wt %, at least 90 wt %, at least 95 wt %, at least 99 wt %, or more) of the first reverse osmosis unit retentate outlet stream. In such a way, a portion (e.g., at least 5 wt %, at least 10 wt %, at least 20 wt %, at least 50 wt %, at least 80 wt %, at least 90 wt %, at least 95 wt %, at least 99 wt %, or more) of retentate outlet stream from the first reverse osmosis unit may be redirected from an outlet of the retentate side of the first reverse osmosis unit back to an inlet of the retentate side of the first reverse osmosis unit (e.g., by being combined with one or more other stream that ultimately form the first reverse osmosis unit retentate inlet stream). In some embodiments where the pressurized energy recovery stream is incorporated into the first reverse osmosis unit retentate inlet stream, the recirculation stream (e.g., comprising a first portion of the first reverse osmosis unit retentate outlet stream) is combined with the pressurized energy recovery stream prior to its incorporation into the first reverse osmosis unit retentate inlet stream. For example, in FIGS. 2A-2B, osmotic systems 200A and 200B may be configured such that a first portion (e.g., at least 5 wt %, at least 10 wt %, at least 20 wt %, at least 50 wt %, at least 80 wt %, at least 90 wt %, at least 95 wt %, at least 99 wt %, or more) of first reverse osmosis unit retentate outlet stream 110 exiting an outlet of retentate side 107 of first reverse osmosis unit 106 may be diverted (e.g., via one or more fluidic conduits) as recirculation stream 132 to pressurized energy recovery stream 121, where it combines with pressurized energy recovery stream 121 exiting from high pressure outlet 126 of energy recovery device 122. Combination of recirculation stream 132 with pressurized energy recovery stream 121 may occur prior to pressurized energy recovery stream 121 being incorporated into first reverse osmosis unit retentate inlet stream 109 (e.g., via combination with pressurized feed stream 103). As mentioned above, use of such a recirculation stream may reduce solute accumulation at the membrane of the first reverse osmosis unit. Further, directing a recirculation stream from an outlet of the retentate side of the second reverse osmosis unit to an inlet of the retentate side of the first reverse osmosis unit may save energy expenditure in the system. For example, typical existing recirculating methods in osmotic systems reduce the hydraulic pressure of recirculated concentrate streams by throttling the stream (e.g., through a valve, orifice, nozzle, fitting, or combinations thereof). The depressurized recirculated stream in such conventional systems is then directed to the low-pressure inlet of a pump for re-pressurization (e.g., prior to being fed to a retentate side of a first reverse osmosis unit). In contrast, the recirculation stream described herein (e.g., combined with a pressurized energy recovery stream exiting an energy recovery stream such as an isobaric energy recovery stream) may be able to impart additional pressure without concomitant energy expenditure via pumping. Such a process may reduce an energy expenditure of an osmotic system by at least 1%, at least 10%, at least 50%, at least 75%, at least 100%, and/up to up 200%, up to 250%, or more (e.g., when an isobaric energy recovery device is employed) relative to otherwise identical systems lacking such a configuration. Recirculation in the manner described herein may allow for an osmotic system to maintain at least partial production (e.g., of concentrated liquid) even in instances where the second reverse osmosis unit is not operational. For example, the recirculation stream may allow for sufficient flow of liquid to the retentate side of the first reverse osmosis unit even when a little to no second reverse osmosis unit permeate outlet stream is produced.

In some embodiments, the energy recovery stream comprises a recirculation stream. The recirculation stream may comprise a first portion (e.g., at least 5 wt %, at least 10 wt %, at least 20 wt %, at least 50 wt %, at least 80 wt %, at least 90 wt %, at least 95 wt %, at least 99 wt %, or more) of the first reverse osmosis unit retentate outlet stream. In some embodiments, the low pressure inlet of the energy recovery device is fluidically connected to an outlet of the retentate side of the first reverse osmosis unit. In such a way, a portion (e.g., at least 5 wt %, at least 10 wt %, at least 20 wt %, at least 50 wt %, at least 80 wt %, at least 90 wt %, at least 95 wt %, at least 99 wt %, or more) of the retentate outlet stream from the first reverse osmosis unit may be redirected from an outlet of the retentate side of the first reverse osmosis unit back to the low pressure inlet of the energy recovery device (e.g., by being combined with one or more other streams that ultimately form the energy recovery stream). In some embodiments where the pressurized feed stream is incorporated into the energy recovery stream, the osmotic system is configured to combine the recirculation stream (e.g., comprising a first portion of the first reverse osmosis unit retentate outlet stream) with the pressurized feed stream exiting the pump outlet, thereby forming at least some (e.g., at least 5 wt %, at least 10 wt %, at least 20 wt %, at least 50 wt %, at least 80 wt %, at least 90 wt %, at least 95 wt %, at least 99 wt %, or more) of the energy recovery stream. For example, in FIGS. 3A-3B, osmotic systems 300A and 300B may be configured such that a first portion (e.g., at least 5 wt %, at least 10 wt %, at least 20 wt %, at least 50 wt %, at least 80 wt %, at least 90 wt %, at least 95 wt %, at least 99 wt %, or more) of first reverse osmosis unit retentate outlet stream 110 exiting an outlet of retentate side 107 of first reverse osmosis unit 106 may be diverted as recirculation stream 132 to pressurized feed stream 103, where it combines with pressurized feed stream 103 exiting from pump outlet 105 of pump 102. As mentioned above, recirculation streams herein may reduce energy expenditure in the system by, for example, reducing solute accumulation at the membrane of the first reverse osmosis unit. Some such embodiments may require less depressurization of recirculated streams than typical existing methods. Such a process may reduce an energy expenditure of an osmotic system by at least 1%, at least 10%, at least 50%, at least 75%, and/or up to 100%, up to 125%, or more (e.g., when a turbine energy recovery device is employed) relative to otherwise identical systems lacking such a configuration. In some embodiments in which the recirculation stream comprises a first portion (e.g., at least 5 wt %, at least 10 wt %, at least 20 wt %, at least 50 wt %, at least 80 wt %, at least 90 wt %, at least 95 wt %, at least 99 wt %, or more) of the first reverse osmosis unit retentate outlet stream, the second reverse osmosis unit retentate inlet stream may comprise a second portion of the first reverse osmosis unit retentate outlet stream (e.g., the balance of the first reverse osmosis unit retentate outlet stream).

In some embodiments, at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream is recycled in the osmotic system. For example, in some embodiments, the feed stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream. This may be accomplished in some instances by having the permeate side of the second reverse osmosis unit be fluidically connected to the pump inlet. As an example, in FIGS. 3A-3B, some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit permeate outlet stream 117 (e.g., a diluted draw stream) may be transported (e.g., via one or more fluidic conduits) from permeate side 114 to pump inlet 104 by being incorporated into feed stream 101.

It should be understood that in some embodiments, transporting a portion of a stream from a first element of the osmotic system to a second element of the osmotic system may involve passing that portion though one or more preliminary and/or intermediate elements. Such a process may be operative when the first element and the second element are indirectly fluidically connected rather than directly fluidically connected, as described in more detail below. As one example, in some embodiments where the first reverse osmosis unit retentate inlet stream comprises at least a portion of the pressurized feed stream, some (e.g., at least 5 wt %, at least 10 wt %, at least 20 wt %, at least 50 wt %, at least 80 wt %, at least 90 wt %, at least 95 wt %, at least 99 wt %, or more) or all of the pressurized feed stream may pass through a preliminary reverse osmosis unit and/or an intermediate pump. FIGS. 1E-1H show a schematic diagram illustrating one such configuration. In FIGS. 1E-H, osmotic systems 100E, 100F, 100G, and 100H further comprise preliminary reverse osmosis unit 156 and intermediate pump 152 (e.g., a booster pump), in accordance with some embodiments. In some embodiments where first reverse osmosis unit retentate inlet stream 109 comprises at least a portion of pressurized feed stream 103 exiting pump outlet 105, that portion of pressurized feed stream 103 is fed to preliminary reverse osmosis unit retentate inlet stream 159 being transported to retentate side 157 of preliminary reverse osmosis unit 156. A portion of liquid from preliminary reverse osmosis unit retentate inlet stream 159 may be transferred through an osmotic membrane to permeate side 158, resulting in preliminary reverse osmosis unit retentate outlet stream 160 (having a higher osmotic pressure than first reverse osmosis unit retentate inlet stream 159 and still comprising at least a portion of pressurized feed stream 103) exiting retentate side 157 and, in some instances, preliminary reverse osmosis unit permeate outlet stream 161 exiting permeate side 158. Some (e.g., at least 5 wt %, at least 10 wt %, at least 20 wt %, at least 50 wt %, at least 80 wt %, at least 90 wt %, at least 95 wt %, at least 99 wt %, or more) or all of preliminary reverse osmosis unit retentate outlet stream 160 (comprising at least a portion of pressurized feed stream 103) may be further pressurized by being fed to intermediate pump inlet stream 151 entering intermediate pump inlet 154 of intermediate pump 152 and exiting as intermediate pump outlet stream 153 from intermediate pump exit 155, in accordance with some embodiments. Subsequently, some or all of intermediate pump outlet stream 153 comprising at least a portion (e.g., at least 5 wt %, at least 10 wt %, at least 20 wt %, at least 50 wt %, at least 80 wt %, at least 90 wt %, at least 95 wt %, at least 99 wt %, or more) of pressurized feed stream 103 may be fed to first reverse osmosis unit retentate inlet stream 109, as shown in FIGS. 1E-1H. In some such systems comprising indirect fluidic connections (e.g., osmotic systems comprising a preliminary reverse osmosis unit and/or an intermediate pump between the pump receiving the feed stream and the first reverse osmosis unit), a remainder of the osmotic system may be operated as described above and below. For example, first reverse osmosis unit retentate inlet stream 109 may also receive at least a portion of pressurized energy recovery stream 121. As another example, in osmotic systems 100E and 100F in FIGS. 1E-1F, energy recovery stream 120 may comprise balancing stream 128 comprising a portion of feed stream 101, like in FIGS. 1A-1B. Similarly, in osmotic systems 100G and 100H in FIGS. 1G-1H, feed stream 101 may comprise balancing stream 128 comprising at least a portion of second reverse osmosis unit permeate outlet stream 117, like in FIGS. 1C-1D.

As mentioned above, bypass streams and/or valving may be employed such that the osmotic system can operate under different configurations during different periods of time (e.g., a first period of time and a second period of time). In FIGS. 4A-5B, osmotic systems 400A, 400B, 500A, and 500B, respectively, employ bypass streams, according to some embodiments. In the osmotic systems comprising valving, the valving may include one or more valves that can be actuated to adjust the flow of fluid through the system. When valving is described as being in a first position or in a second position, these positions are to be understood as referring to actuation statuses of one or more of the valves of the valving of the system, and not necessarily to a physical placement of the valving within the system.

In some embodiments, during at least the first period of time, the second reverse osmosis unit retentate inlet stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the first reverse osmosis unit retentate outlet stream. As mentioned above, in some embodiments, the osmotic system comprises valving. In some embodiments, the valving is configured such that the when the valving is in a first position, a retentate side of the first reverse osmosis unit is in fluidic communication with the retentate side of the second reverse osmosis unit. In such a way, in each of FIGS. 4A-5B, during at least a first period of time (e.g., when the valving is in a first position), valving 133 is in a position such that some (e.g., at least 5 wt %, at least 10 wt %, at least 20 wt %, at least 50 wt %, at least 80 wt %, at least 90 wt %, at least 95 wt %, at least 99 wt %, or more) or all of first reverse osmosis unit retentate outlet stream 110 may be transported (e.g., via one or more fluidic conduits) to retentate side 113 of second reverse osmosis unit 112 by forming some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit retentate inlet stream 115.

In some embodiments, during the first period of time and the second period of time, a concentrate stream may be depressurized (e.g., by at least 5%, at least 10%, at least 20%, at least 50%, at least 80%, at least 90%, at least 95%, at least 99%, or more) to form a reduced-pressure concentrate stream. Such a process may occur using an energy recovery device (e.g., an isobaric energy recovery device, a turbine energy recovery device, etc.). In some embodiments, during at least the first period of time, the concentrate stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit retentate outlet stream. For example, during at least the first period of time, the valving may be configured such that when the valving is in the first position, the retentate side of the second reverse osmosis unit is in fluidic communication with the high pressure inlet of the energy recovery device. In such a way, in FIGS. 4A-5B, valving 133 may be in a position (e.g., during at least the first period of time) such that some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit retentate outlet stream 116 may be transported (e.g., via one or more fluidic conduits) to high pressure inlet 123 of energy recovery device 122 by forming some or all of concentrate stream 134, where a pressure of concentrate stream 134 is reduced to form reduced-pressure concentrate stream 119, which is ejected from energy recovery device 122 via low pressure outlet 124.

In some embodiments, during at least the first period of time, the second reverse osmosis unit permeate inlet stream mentioned above comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the reduced-pressure concentrate stream. In some embodiments, the valving is configured such that when the valving is in the first position, the permeate side of the second reverse osmosis unit is in fluidic communication with the low pressure outlet of the energy recovery device. In such a way, in FIGS. 4A-5B, valving 133 may be in a position (e.g., during at least the first period of time) such that some (e.g., at least 5 wt %, at least 10 wt %, at least 20 wt %, at least 50 wt %, at least 80 wt %, at least 90 wt %, at least 95 wt %, at least 99 wt %, or more) or all of reduced-pressure concentrate stream 119 may be transported (e.g., via one or more fluidic conduits) to permeate side 114 of second reverse osmosis unit 112 by forming some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit permeate inlet stream 118 (which can serve as a draw stream).

As mentioned above, during the first period of time and the second period of time, a pressure of an energy recovery stream may be increased (e.g., in the energy recovery device) using energy recovered from depressurization of the concentrate stream, thereby forming a pressurized energy recovery stream. In some embodiments, during at least the first period of time, the energy recovery stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream. In some embodiments, the valving is configured such that when the valving is in the first position, the permeate side of the second reverse osmosis unit is in fluidic communication with the low pressure inlet of the energy recovery device. In such a way, in FIGS. 4A-4B, valving 133 may be in a position (e.g., during at least the first period of time) such that some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit permeate outlet stream 117 may be transported (e.g., via one or more fluidic conduits) to low pressure inlet 125 of energy recovery device 122 by forming some (e.g., at least 5 wt %, at least 10 wt %, at least 20 wt %, at least 50 wt %, at least 80 wt %, at least 90 wt %, at least 95 wt %, at least 99 wt %, or more) or all of energy recovery stream 120, and a pressure of energy recovery stream 120 may be increased in energy recovery device 122 to form pressurized energy recovery stream 121, which is ejected from energy recovery device 122 via high pressure outlet 126.

As mentioned above, a bypass stream may be employed to provide for operation of the osmotic system even when one or more of the reverse osmosis units (e.g., the second reverse osmosis unit) receives and produces a reduced amount of fluid streams or no fluid streams. For example, a bypass stream from the first reverse osmosis unit may be positioned such that the osmotic system can operate with full use of the second reverse osmosis unit during a first period of time, and the osmotic system can operate even if during a second period of time the second reverse osmosis unit is partially or completely offline.

In some embodiments, during at least the second period of time, the retentate side of the second reverse osmosis unit does not receive any portion of the first reverse osmosis unit retentate outlet stream or receives an amount of the first reverse osmosis unit retentate outlet stream that is at least 80 wt %, at least 90 wt %, at least 95 wt %, at least 98 wt %, at least 99 wt %, or at least 99.9 wt % less than an amount of the first reverse osmosis unit retentate outlet stream received by the retentate side of the second reverse osmosis unit during the first period of time. This may be accomplished for example, by having the valving be configured such that when the valving is in a second position (a position different than the first position), the retentate side of the first reverse osmosis unit is not in fluidic communication with the retentate side of the second reverse osmosis unit. In such a way, in FIGS. 4A-5B, valving 133 may be in a position (e.g., during the second period of time) such that relatively little to none of first reverse osmosis unit retentate outlet stream 110 can be transported to retentate side 113 of second reverse osmosis unit 112, e.g., by cutting off fluidic communication between retentate side 107 and retentate side 113.

In some embodiments, during at least the second period of time, the concentrate stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of a bypass stream. In some such embodiments, the bypass stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the first reverse osmosis unit retentate outlet stream. This may be accomplished, for example, by having valving configured such that when the valving is in the second position, the retentate side of the first reverse osmosis unit is in fluidic communication with the high pressure inlet of the energy recovery device. In such a way, in FIGS. 4A-5B, valving 133 may be in a position (e.g., during the second period of time) such that some (e.g., at least 5 wt %, at least 10 wt %, at least 20 wt %, at least 50 wt %, at least 80 wt %, at least 90 wt %, at least 95 wt %, at least 99 wt %, or more) or all of first reverse osmosis unit retentate outlet stream 110 can be transported (e.g., via one or more fluidic conduits) from retentate side 107 of first reverse osmosis unit 106 to high pressure inlet 123 of energy recovery device 122 by forming some or all of bypass stream 135, which forms some or all of concentrate stream 134. It should be understood that in some embodiments, the valving may be configured such that when the valving is in the second position (e.g., during the second period of time), the retentate side of the first reverse osmosis unit is in fluidic communication with the retentate side of the second reverse osmosis unit (e.g., such that the retentate side of the first reverse osmosis unit is in fluidic communication with both the retentate side of the second reverse osmosis unit and the high pressure inlet of the energy recovery device via a bypass stream). It should also be understood that in some embodiments the valving is configured such that when the valving is in a first position (e.g., during the first period of time), the retentate side of the first reverse osmosis unit is not in fluidic communication with the high pressure inlet of the energy recovery device. Such a configuration is one way in which the concentrate stream being fed to the high pressure inlet of the energy recovery device may not comprise at least a portion of the bypass stream during the first period of time. However, in other embodiments the valving is configured such that when the valving is in a first position (e.g., during the first period of time), the retentate side of the first reverse osmosis unit is in fluidic communication with the high pressure inlet of the energy recovery device. Such a configuration is one way in which the concentrate stream being fed to the high pressure inlet of the energy recovery device may comprise at least a portion of the bypass stream during the first period of time.

Some embodiments may comprise adjusting a flow rate of the bypass stream (e.g., during the first period of time, during the second period of time, or both). Adjusting the flow rate of the bypass stream may promote beneficial performance of the energy recovery device (e.g., by assisting with pressure exchange and/or by limiting or preventing mixing of streams). Some embodiments comprise discharging a portion (e.g., at least 5 wt %, at least 10 wt %, at least 20 wt %, at least 50 wt %, at least 80 wt %, at least 90 wt %, at least 95 wt %, at least 99 wt %, or more) of the bypass stream via a bypass discharge stream. For example, in FIGS. 4A-5B, osmotic systems 400A, 400B, 500A and 500B are configured such that optional bypass discharge stream 136 is diverted from bypass stream 135 and discharged from the osmotic system and/or combined with reduced-pressure concentrate stream 119 and/or optional discharged portion 127 of reduced-pressure concentrate stream 119. Such a bypass discharge stream may provide a way to adjust a mass flow rate of the concentrate stream entering the energy recovery device relative to the energy recovery stream. Some embodiments comprise adjusting a flow rate of the bypass stream and/or a flow rate of the bypass discharge stream such that a mass flow rate of the concentrate stream is within 20%, within 10%, within 5%, within 2%, within 1%, within 0.1%, or less of a mass flow rate of the energy recovery stream. The mass flow rate the energy recovery stream may be controlled, in some embodiments, by adjusting a ratio of the amount of the reduced-pressure concentrate stream sent to the second reverse osmosis unit permeate inlet stream to the amount of reduced-pressure concentrate stream sent elsewhere (e.g., discharged from the system). Such a ratio may be referred to as a "recycle ratio." In some embodiments in which the osmotic system comprises a balancing stream as described above, the mass flow rate of the energy recovery stream may also be controlled by adjusting a rate of the balancing stream (either being merged with the energy recovery stream as in FIGS. 1A-1B or diverted from the second reverse osmosis unit permeate outlet stream in FIGS. 1C-1D). In some embodiments, the balancing stream mass flow rate may be adjusted to compensate for changes in the recycle ratio mentioned above to maintain flow rate balance in the system (e.g., in the energy recovery device).

In some embodiments, during at least the second period of time, the permeate side of the second reverse osmosis unit does not receive any portion of the reduced-pressure concentrate stream or receives an amount of the reduced-pressure concentrate stream that is at least 80 wt %, at least 90 wt %, at least 95 wt %, at least 98 wt %, at least 99 wt %, or at least 99.9 wt % less than an amount of the reduced-pressure concentrate stream received by the permeate side of the second reverse osmosis unit during the first period of time. This may be accomplished, for example, by having the valving be configured such that when the valving is in the second position, the permeate side of the second reverse osmosis unit is not in fluidic communication with the low pressure outlet of the energy recovery device. In such a way, in FIGS. 4A-5B, valving 133 may be in a position (e.g., during the second period of time) such that relatively little to none of reduced-pressure concentrate stream 119 can be transported to permeate side 114 of second reverse osmosis unit 112, e.g., by cutting off fluidic communication between permeate side 114 and low pressure outlet 124. In some such embodiments, during the second period of time, some or all of the reduced-pressure concentrate stream (e.g., reduced-pressure concentrate stream 119) is discharged from the osmotic system rather than being transported to the permeate side of the second reverse osmosis unit (e.g., via optional discharged portion 127 of reduced-pressure concentrate stream 119). It should be understood, however, that in some embodiments, the valving is configured such that when the valving is in the second position (e.g., during the second period of time), the permeate side of the second reverse osmosis unit is in fluidic communication with the low pressure outlet of the energy recovery device.

In some embodiments, during at least the second period of time, the high pressure inlet of the energy recovery device does not receive any portion of a second reverse osmosis unit retentate outlet stream or receives an amount of a second reverse osmosis unit retentate outlet stream that is at least 80 wt %, at least 90 wt %, at least 95 wt %, at least 98 wt %, at least 99 wt %, or at least 99.9 wt % less than an amount of the second reverse osmosis unit retentate outlet stream received by the high pressure inlet during the first period of time. This may be accomplished for example, by having the valving be configured such that when the valving is in the second position, the retentate side of the second reverse osmosis unit is not in fluidic communication with the high pressure inlet of the energy recovery device. In such a way, in FIGS. 4A-5B, valving 133 may be in a position (e.g., during the second period of time) such that relatively little to none of second reverse osmosis unit retentate outlet stream 116 can be transported to high pressure inlet 123, e.g., by cutting off fluidic communication between retentate side 113 and high pressure inlet 123. In some embodiments, the high pressure inlet receives little to none of a second reverse osmosis unit retentate outlet stream because little to no such stream is produced by the second reverse osmosis unit during the second period of time.

In some embodiments, during at least the second period of time, the low pressure inlet of the energy recovery device does not receive any portion of a second reverse osmosis unit permeate outlet stream or receives an amount of a second reverse osmosis unit permeate outlet stream that is at least 80 wt %, at least 90 wt %, at least 95 wt %, at least 98 wt %, at least 99 wt %, or at least 99.9 wt % less than an amount of the second reverse osmosis unit permeate outlet stream received by the low pressure inlet during the first period of time. This may be accomplished for example, by having the valving be configured such that when the valving is in a second position, the permeate side of the second reverse osmosis unit is not in fluidic communication with low pressure inlet of the energy recovery device. In such a way, in FIGS. 4A-4B, valving 133 may be in a position (e.g., during the second period of time) such that relatively little to none of second reverse osmosis unit permeate outlet stream 117 can be transported to low pressure inlet 125, e.g., by cutting off fluidic communication between permeate side 114 and low pressure inlet 125. In some embodiments, the low pressure inlet receives little to none of a second reverse osmosis unit permeate outlet stream because little to no such stream is produced by the second reverse osmosis unit during the second period of time. It should be understood, however, that in some embodiments, the valving may be configured such that when the valving is in the second position (e.g., during the second period of time), the permeate side of the second reverse osmosis unit is in fluidic communication with the low pressure inlet of the energy recovery device.

In some embodiments, at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream is recycled in the osmotic system. For example, in some embodiments, during at least the first period of time, the feed stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream. This may be accomplished in some instances by having the valving configured such that when the valving is in the first position, the permeate side of the second reverse osmosis unit is in fluidic communication with pump inlet. As an example, in FIGS. 5A-5B, when the valving is in the first position (e.g., during at least the first period of time), some (e.g., at least 5 wt %, at least 10 wt %, at least 20 wt %, at least 50 wt %, at least 80 wt %, at least 90 wt %, at least 95 wt %, at least 99 wt %, or more) or all of second reverse osmosis unit permeate outlet stream 117 (e.g., a diluted draw stream) may be transported (e.g., via one or more fluidic conduits) from permeate side 114 to pump inlet 104 by being incorporated into feed stream 101. Such a recycling of the second reverse osmosis unit permeate outlet stream may allow for adjustment of flow rates, solute concentrations, and/or hydraulic pressures of streams being fed to other components of the system (e.g., the energy recovery device, the first reverse osmosis unit, etc.).

In some embodiments, the osmotic system comprising a bypass stream also comprises a balancing stream in accordance with the embodiments described above (e.g., like balancing stream 128 shown in FIGS. 1A-1H). In some embodiments, during at least the second period of time, the energy recovery stream comprises a balancing stream comprising at least a portion (e.g., at least 5 wt %, at least 10 wt %, at least 20 wt %, at least 50 wt %, at least 80 wt %, at least 90 wt %, at least 95 wt %, at least 99 wt %, or more) of the feed stream (e.g., by having valving configured such that when the valving is in the second position, the pump inlet is in fluidic communication with the low pressure inlet of the energy recovery device). In some such embodiments, the energy recovery stream comprises the balancing stream comprising a portion of the feed stream during the first period of time as well, but in other embodiments the energy recovery stream does not comprise the balancing stream during the first period of time (e.g., by having valving configured such that when the valving is in the first position, the pump inlet is not in fluidic communication with the low pressure inlet of the energy recovery device). In some embodiments, during at least the second period of time, the feed stream comprises a balancing stream comprising at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream (e.g., by having valving configured such that when the valving is in the first position, the pump inlet is in fluidic communication with the permeate side of the second reverse osmosis unit). In some such embodiments, the feed stream comprises a balancing stream comprising at least a portion of the second reverse osmosis unit permeate outlet stream during the first period of time as well, but in other embodiments the feed stream does not comprise the balancing stream during the first period of time.

In some embodiments, more than one energy recovery (e.g., pressure exchange) process may be employed. In some embodiments, the osmotic system comprises more than one energy recovery device. For example, the osmotic system may comprise a first energy recovery device and a second energy recovery device. In some embodiments, each of the first energy recovery device and the second energy recovery device are of the same type (e.g., both are isobaric energy recovery devices, both are turbine energy recovery devices, etc.). In some embodiments, however, the first energy recovery device and the second energy recovery device are of different types (e.g., a first energy recovery device is a turbine energy recovery device, a second energy recovery device is an isobaric energy recovery device), which may in some instances provide performance advantages.

FIGS. 6A-6B show osmotic systems 600A and 600B, respectively, each of which comprises first energy recovery device 122 (comprising first high pressure inlet 123, first low pressure outlet 124, first low pressure inlet 125, and first high pressure outlet 126) and second energy recovery device 137 (comprising second high pressure inlet 138, second low pressure outlet 139, second low pressure inlet 140, and second high pressure outlet 141), in accordance with certain embodiments. Like osmotic systems 100A, 100B, 100C, 100D, 100E, 100F, 100G, 100H, 200A, 200B, 300A, 300B, 400A, 400B, 500A, and 500A described above, osmotic systems 600A and 600B also comprise pump 102, first reverse osmosis unit 106, and second reverse osmosis unit 112, in accordance with some embodiments.

In some embodiments, the second reverse osmosis unit retentate outlet stream is partitioned (e.g., for separate downstream processes, such as energy recovery processes). For example, some embodiments comprise reducing (e.g., by at least 5%, at least 10%, at least 20%, at least 50%, at least 80%, at least 90%, at least 95%, at least 99%, or more) a pressure of a first concentrate stream comprising a first portion (e.g., at least 5 wt %, at least 10 wt %, at least 20 wt %, at least 50 wt %, at least 80 wt %, at least 90 wt %, at least 95 wt %, at least 99 wt %, or more) of the second osmosis unit retentate outlet stream to form a reduced-pressure first concentrate stream, and reducing (e.g., by at least 5%, at least 10%, at least 20%, at least 50%, at least 80%, at least 90%, at least 95%, at least 99%, or more) a pressure of a second concentrate stream comprising a second portion (e.g., at least 5 wt %, at least 10 wt %, at least 20 wt %, at least 50 wt %, at least 80 wt %, at least 90 wt %, at least 95 wt %, at least 99 wt %, or more) of the second osmosis unit retentate outlet stream to form a reduced-pressure second concentrate stream. In some embodiments, the retentate side of the second reverse osmosis unit is fluidically connected to the first high pressure inlet of the first energy recovery device and the second high pressure inlet of the second energy recovery device. In such a way, in FIGS. 6A-6B, some (e.g., at least 5 wt %, at least 10 wt %, at least 20 wt %, at least 50 wt %, at least 80 wt %, at least 90 wt %, at least 95 wt %, at least 99 wt %, or more) of second reverse osmosis unit retentate outlet stream 116 may be transported (e.g., via one or more fluidic conduits) to first high pressure inlet 123 of first energy recovery device 122 by forming first concentrate stream 134, where a pressure of that portion of second reverse osmosis unit retentate outlet stream 116 is reduced to form reduced-pressure first concentrate stream 119, which is ejected from first energy recovery device 122 via first low pressure outlet 124. Further, in FIGS. 6A-6B, some (e.g., at least 5 wt %, at least 10 wt %, at least 20 wt %, at least 50 wt %, at least 80 wt %, at least 90 wt %, at least 95 wt %, at least 99 wt %, or more) of second reverse osmosis unit retentate outlet stream 116 may be transported (e.g., via one or more fluidic conduits) to second high pressure inlet 138 of second energy recovery device 137 by forming second concentrate stream 142, where a pressure of that portion of second reverse osmosis unit retentate outlet stream 116 is reduced to form reduced-pressure second concentrate stream 143, which is ejected from second energy recovery device 137 via second low pressure outlet 139. It has been realized that by partitioning portions of a second reverse osmosis unit retentate outlet stream into separate streams, the mass flow rate of one or more of the partitioned streams may be adjusted (e.g., by adjusting the partitioning fraction). For example, in some embodiments, the second energy recovery device is an isobaric energy recovery device, for which it may be beneficial to carefully control a mass flow rate of an incoming concentrate stream sourced from second reverse osmosis unit retentate outlet stream (e.g., to avoid mixing with the second energy recovery stream). By partitioning the second reverse osmosis unit retentate outlet stream into a first portion to be transported to the first energy recovery device (e.g., a turbine energy recovery device) and a second portion to be transported to the second energy recovery device, a mass flow rate of the second concentrate stream can be adjusted, thereby allowing in some instances for mixing in the isobaric energy recovery unit to be limited or avoided.

A pressure of a first energy recovery stream (e.g., first energy recovery stream 120 in FIGS. 6A-6B) may be increased (e.g., by at least 5%, at least 10%, at least 20%, at least 50%, at least 80%, at least 90%, at least 95%, at least 99%, or more) (e.g., in the first energy recovery device) using energy recovered from depressurization of the first concentrate stream, thereby forming a pressurized first energy recovery stream. Such a first energy recovery stream may comprise at least a portion (e.g., at least 5 wt %, at least 10 wt %, at least 20 wt %, at least 50 wt %, at least 80 wt %, at least 90 wt %, at least 95 wt %, at least 99 wt %, or more) of the pressurized feed stream (e.g., by having the first low pressure inlet of the first energy recovery device be fluidically connected to the pump outlet). In some embodiments, a pressure of a second energy recovery stream (e.g., second energy recovery stream 144 in FIGS. 6A-6B) can be increased (e.g., by at least 5%, at least 10%, at least 20%, at least 50%, at least 80%, at least 90%, at least 95%, at least 99%, or more) (e.g., in the second energy recovery device) using energy recovered from depressurization of the second concentrate stream thereby forming a pressurized second energy recovery stream. Such a second energy recovery stream may comprise at least a portion (e.g., at least 5 wt %, at least 10 wt %, at least 20 wt %, at least 50 wt %, at least 80 wt %, at least 90 wt %, at least 95 wt %, at least 99 wt %, or more) of the second reverse osmosis unit permeate outlet stream (e.g., by having the permeate side of the second reverse osmosis unit be fluidically connected to the second low pressure inlet of the second energy recovery device).

In some embodiments, the first reverse osmosis unit retentate inlet stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the pressurized second energy recovery stream. As such, the first reverse osmosis unit retentate inlet stream may comprise at least a portion (e.g., at least 5 wt %, at least 10 wt %, at least 20 wt %, at least 50 wt %, at least 80 wt %, at least 90 wt %, at least 95 wt %, at least 99 wt %, or more) of both the pressurized first energy recovery stream (e.g., from the first energy recovery device) and at least a portion (e.g., at least 5 wt %, at least 10 wt %, at least 20 wt %, at least 50 wt %, at least 80 wt %, at least 90 wt %, at least 95 wt %, at least 99 wt %, or more) of the second energy recovery stream (e.g., from the second energy recovery device). This may be accomplished, for example, by having the retentate side of the first reverse osmosis unit be fluidically connected to the first high pressure outlet of the first energy recovery device and the second high pressure outlet of the second energy recovery device. For example, in FIGS. 6A-6B, some or all of pressurized first energy recovery stream 121 exiting first high pressure outlet 126 of first energy recovery device 122 may be combined with some or all of pressurized second energy recovery stream 145 exiting second energy recovery device 137 to form some or all of first reverse osmosis unit retentate inlet stream 109 fed to first reverse osmosis unit 106. Some such configurations may provide for energy recovered from each energy recovery device to contribute to the osmotic separation processes, even while adjusting flow rates to maintain beneficial performance (e.g., using an isobaric energy recovery device as the second energy recovery device).

In some embodiments involving multiple energy recovery processes, the second reverse osmosis unit is operated without a second reverse osmosis unit permeate inlet stream. FIG. 6A shows one such example, where reduced-pressure first concentrate stream 119 is discharged from osmotic system 600A. However, in some embodiments, a draw stream is used with the second reverse osmosis unit. For example, in FIG. 6B, second reverse osmosis unit permeate inlet stream 118 enters permeate side 114 of second reverse osmosis unit 112, where it may be combined with liquid transported through an osmotic membrane from retentate side 113 to form second reverse osmosis unit permeate outlet stream 117. In some, but not necessarily all embodiments, the second reverse osmosis unit permeate inlet stream comprises at least a portion (e.g., at least 5 wt %, at least 10 wt %, at least 20 wt %, at least 50 wt %, at least 80 wt %, at least 90 wt %, at least 95 wt %, at least 99 wt %, or more) of the reduced-pressure first concentrate stream (e.g., from the first energy recovery device). For example, some (e.g., at least 5 wt %, at least 10 wt %, at least 20 wt %, at least 50 wt %, at least 80 wt %, at least 90 wt %, at least 95 wt %, at least 99 wt %, or more) or all of reduced-pressure first concentrate stream 119 may be transported to permeate side 114 of second reverse osmosis unit 112 by forming some or all of second reverse osmosis unit permeate inlet stream 118. It may be beneficial for sweep streams (e.g., second reverse osmosis unit permeate inlet stream) to have relatively high osmotic pressures (e.g., by having relatively high solute concentrates). It has been unexpectedly realized that by employing a first energy recovery device in the form of a turbine energy recovery device (where no stream mixing occurs), relatively high-concentration streams may be fed to the second reverse osmosis unit permeate inlet stream without undergoing dilution during energy recovery, as opposed to in the case of isobaric energy recovery devices, where mixing may cause such dilution. Therefore, it may be beneficial to employ both a turbine energy recovery device (e.g., for feeding a draw stream of a reverse osmosis unit) and an otherwise more-efficient isobaric energy recovery device (e.g., for feeding a feed stream of a reverse osmosis unit).

In some embodiments, a pressure of any of the streams described herein can be increased via one or more additional components, such as one or more booster pumps. In some embodiments, a pressure of any of the streams described herein can be decreased via one or more additional components, such as one or more additional valves or energy recovery devices. It may be possible to split or blend streams throughout the system. It some embodiments, an osmotic system described herein further comprises one or more heating, cooling, or other concentration or dilution mechanisms or devices.

The reverse osmosis units described herein (e.g., the first reverse osmosis unit, the second reverse osmosis unit) can each include a single osmotic membrane or a plurality of osmotic membranes.

Figure 7A:
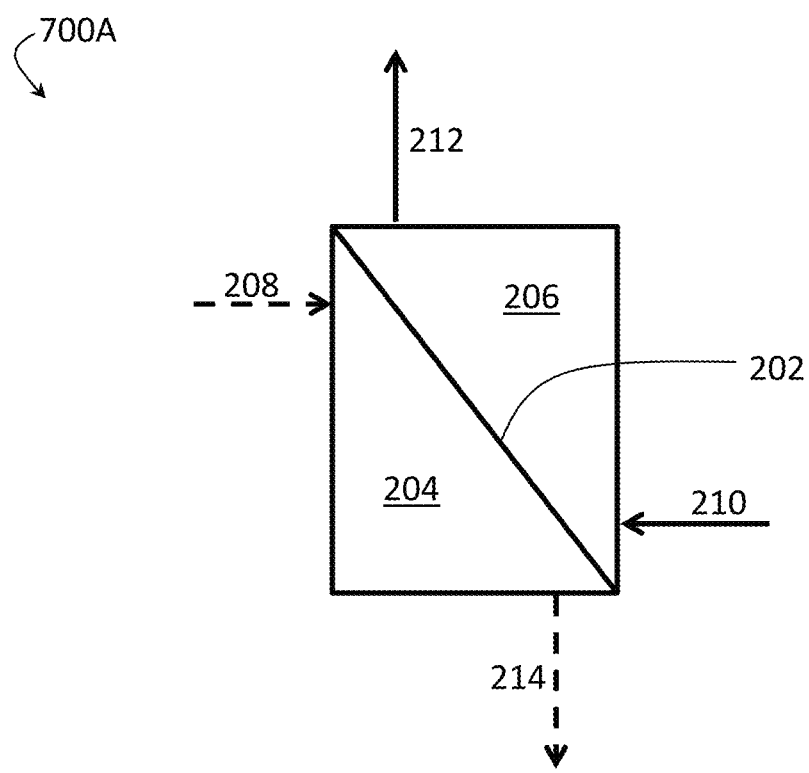
FIG. 7A is a schematic illustration of a single-membrane osmosis unit, in accordance with certain embodiments.

FIG. 7A is a schematic illustration of reverse osmosis unit 700A, in which a single osmotic membrane is used to separate permeate side 204 from retentate side 206. Reverse osmosis unit 700A can be operated by transporting retentate inlet stream 210 across retentate side 206. At least a portion of a liquid (e.g., a solvent) within retentate inlet stream 210 can be transported across osmotic membrane 202 to permeate side 204. This can result in the formation of retentate outlet stream 212, which can include a higher concentration of solute than is contained within retentate inlet stream 210, as well as permeate outlet stream 214. Optionally (e.g., when reverse osmosis unit 700A is used as a counter-flow reverse osmosis unit), permeate inlet stream 208 is also present. When permeate inlet stream 208 is present, it can be combined with the liquid (e.g., solvent) that has been transported to permeate side 204 from retentate side 206 to form permeate outlet stream 214. When permeate inlet stream 208 is not present (e.g., when reverse osmosis unit 700A is used as a cross-flow osmosis unit) permeate outlet stream 214 can correspond to the liquid (e.g., solvent) of retentate inlet stream 210 that was transported from retentate side 206 to permeate side 204.

Figure 7B:
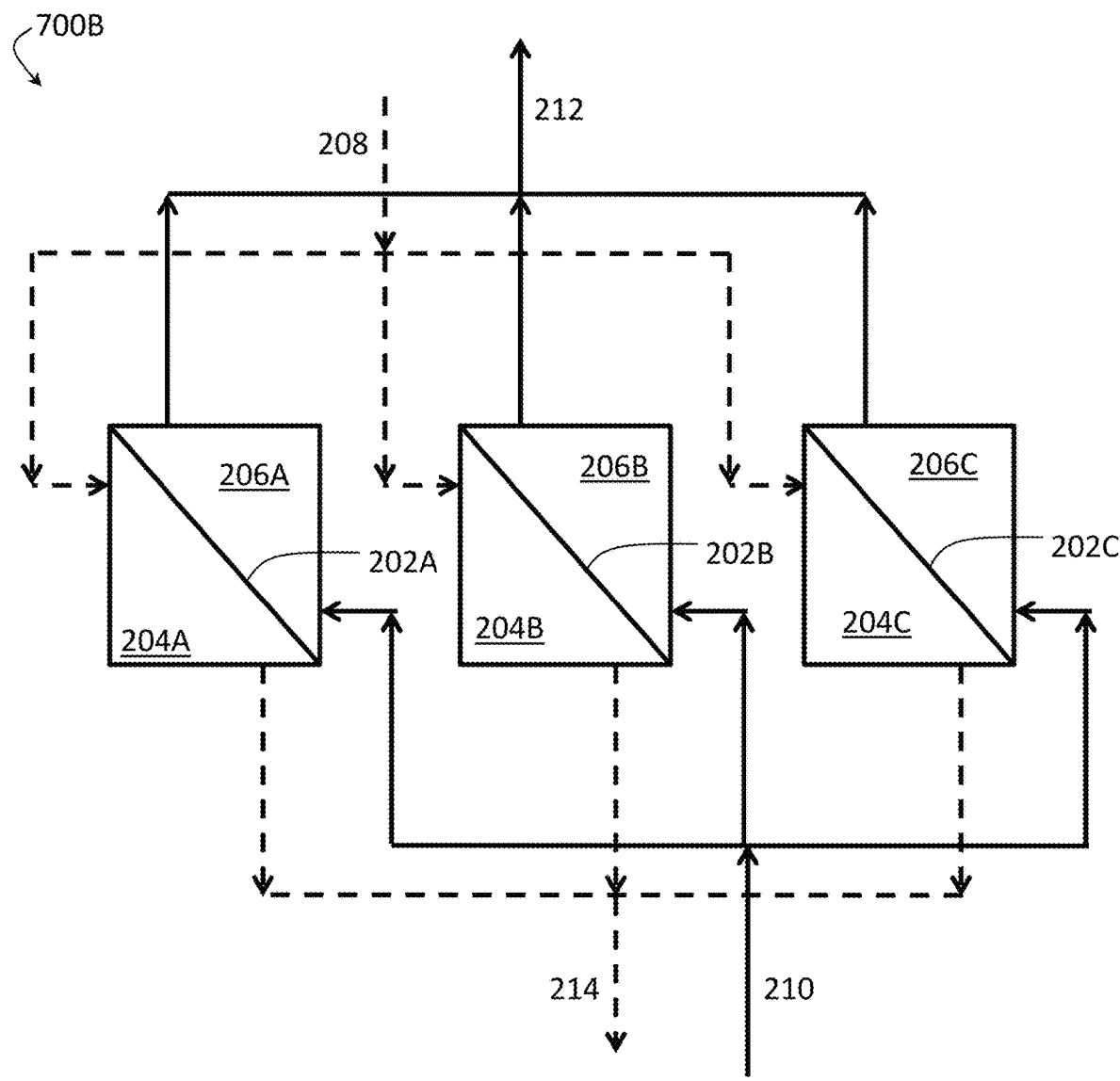
FIG. 7B is a schematic illustration of an osmosis unit comprising multiple osmotic membranes fluidically connected in parallel, in accordance with certain embodiments.

In some embodiments, a reverse osmosis unit (e.g., the first reverse osmosis unit, the second reverse osmosis unit) comprises a plurality of osmotic membranes connected in parallel. One example of such an arrangement is shown in FIG. 7B. In FIG. 7B, reverse osmosis unit 700B comprises three osmotic membranes 202A, 202B, and 202C arranged in parallel. Retentate inlet stream 210 is split into three sub-streams, with one sub-stream fed to retentate side 206A of osmotic membrane 202A, another sub-stream fed to retentate side 206B of osmotic membrane 202B, and yet another sub-stream fed to retentate side 206C of osmotic membrane 202C. Reverse osmosis unit 700B can be operated by transporting the retentate inlet sub-streams across the retentate sides of the osmotic membranes. At least a portion of a liquid (e.g., a solvent) within retentate inlet stream 210 can be transported across each of osmotic membranes 202A, 202B, and 202C to permeate sides 204A, 204B, and 204C, respectively. This can result in the formation of three retentate outlet sub-streams, which can be combined to form retentate outlet stream 212. Retentate outlet stream 212 can include a higher concentration of solute than is contained within retentate inlet stream 210. Permeate outlet stream 214 can also be formed (from three permeate outlet sub-streams). Optionally (e.g., when reverse osmosis unit 700B is used as a counter-flow reverse osmosis unit), permeate inlet stream 208 is also present. When permeate inlet stream 208 is present, it can be divided into three sub-streams and transported to the permeate sides (204A, 204B, and 204C) of the three osmotic membranes (202A, 202B, and 202C) and combined with the liquid (e.g., solvent) that has been transported from the retentate sides (206A-206C) to the permeate sides (204A-204C) of the osmotic membranes (202A-202C) to form permeate outlet stream 214. When permeate inlet stream 208 is not present (e.g., when reverse osmosis unit 700B is used as a cross-flow osmosis unit) permeate outlet stream 214 can correspond to the liquid (e.g., solvent) of retentate inlet stream 210 that was transported from retentate sides 206A-206C to permeate sides 204A-204C.

While FIG. 7B shows three osmotic membranes connected in parallel, other embodiments could include 2, 4, 5, or more osmotic membranes connected in parallel.

Figure 7C:
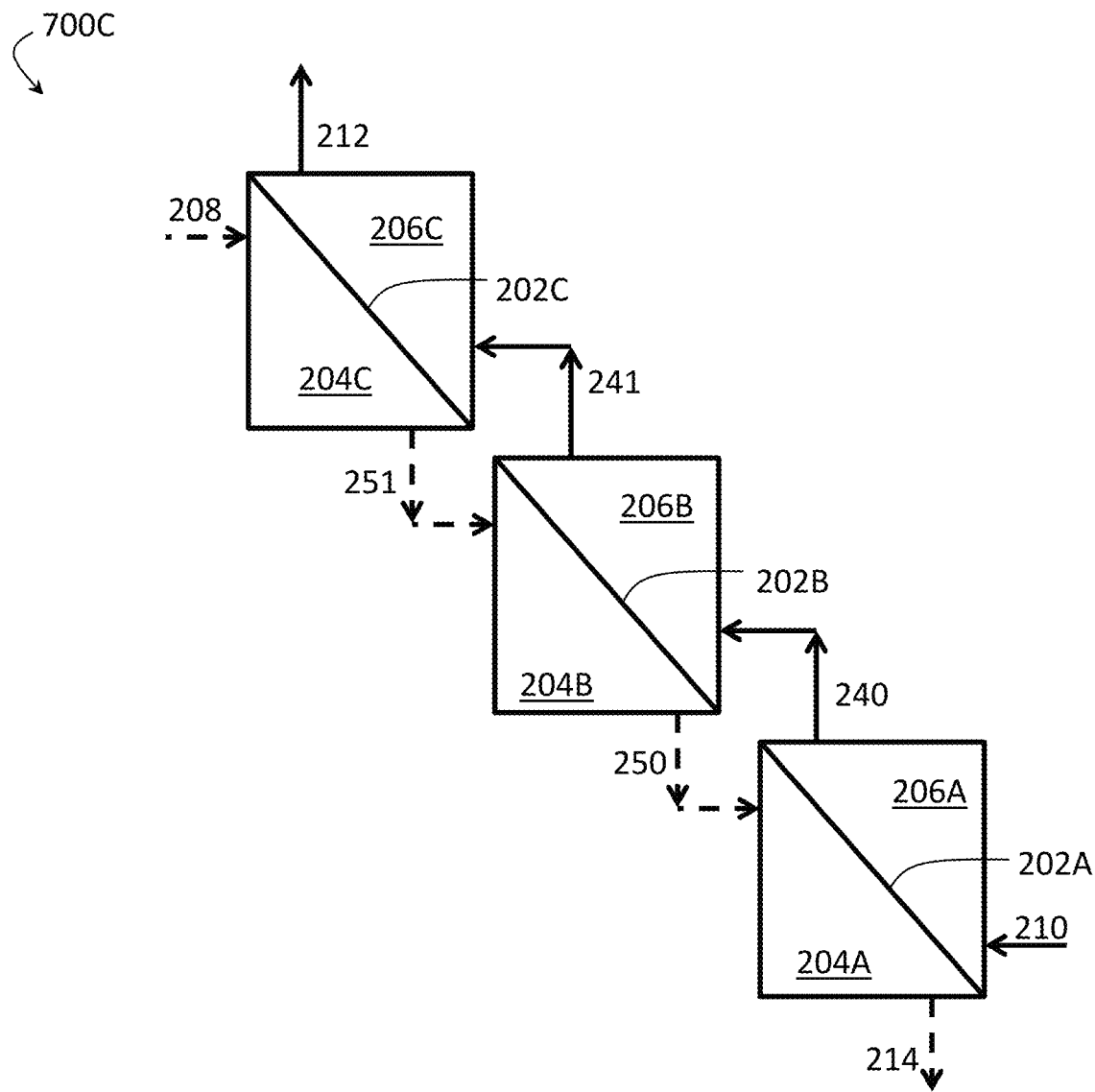
FIG. 7C is a schematic illustration of an osmosis unit comprising multiple osmotic membranes fluidically connected in series, in accordance with certain embodiments.

In some embodiments, a reverse osmosis unit (e.g., the first reverse osmosis unit, the second reverse osmosis unit) comprises a plurality of osmotic membranes connected in series. One example of such an arrangement is shown in FIG. 7C. In FIG. 7C, reverse osmosis unit 700C comprises three osmotic membranes 202A, 202B, and 202C arranged in series. In FIG. 7C, retentate inlet stream 210 is first transported to retentate side 206A of osmotic membrane 202A. At least a portion of a liquid (e.g., a solvent) within retentate inlet stream 210 can be transported across osmotic membrane 202A to permeate side 204A of osmotic membrane 202A. This can result in the formation of permeate outlet stream 214 and first intermediate retentate stream 240 that is transported to retentate side 206B of osmotic membrane 202B. At least a portion of a liquid (e.g., a solvent) within first intermediate retentate stream 240 can be transported across osmotic membrane 202B to permeate side 204B of osmotic membrane 202B. This can result in the formation of intermediate permeate outlet stream 250 and second intermediate retentate stream 241 that is transported to retentate side 206C of osmotic membrane 202C. At least a portion of a liquid (e.g., a solvent) within second intermediate retentate stream 241 can be transported across osmotic membrane 202C to permeate side 204C of osmotic membrane 202C. This can result in the formation of intermediate permeate outlet stream 251 and retentate outlet stream 212. When permeate inlet stream 208 is present, it can be transported to permeate side 204C of osmotic membrane 202C and combined with the liquid (e.g., solvent) that has been transported from retentate side 206C of osmotic membrane 202C to form intermediate permeate outlet stream 251. In some embodiments, as shown in FIG. 7C, intermediate permeate outlet stream 251 can be fed to permeate side 204B of osmotic membrane 202B and used as a sweep stream (i.e., combined with liquid that is transported through osmotic membrane 202B to form intermediate permeate outlet stream 250). In other embodiments, intermediate permeate outlet stream 251 is used directly as part (or all) of permeate outlet stream 214 (with another stream serving as the sweep stream across permeate side 204B of osmotic membrane 202B, or with osmotic membrane 202B being operated in cross-flow mode). In some embodiments, as shown in FIG. 7C, intermediate permeate outlet stream 250 can be fed to permeate side 204A of osmotic membrane 202A and used as a sweep stream (i.e., combined with liquid that is transported through osmotic membrane 202A to form permeate outlet stream 214). In other embodiments, intermediate permeate outlet stream 250 is used directly as part (or all) of permeate outlet stream 214 (with another stream serving as the sweep stream across permeate side 204A of osmotic membrane 202A, or with osmotic membrane 202A being operated in cross-flow mode).

While FIG. 7C shows three osmotic membranes connected in series, other embodiments could include 2, 4, 5, or more osmotic membranes connected in series.

In addition, in some embodiments, a given reverse osmosis unit could include multiple osmotic membranes connected in parallel as well as multiple osmotic membranes connected in series.

In some embodiments, the first reverse osmosis unit comprises a plurality of osmotic membranes. In some such embodiments, the plurality of osmotic membranes within the first reverse osmosis unit are connected in series. In some such embodiments, the plurality of osmotic membranes within the first reverse osmosis unit are connected in parallel. In certain embodiments, the first reverse osmosis unit comprises a plurality of membranes a first portion of which are connected in series and another portion of which are connected in parallel.

In some embodiments, the second reverse osmosis unit comprises a plurality of osmotic membranes. In some such embodiments, the plurality of osmotic membranes within the second reverse osmosis unit are connected in series. In some such embodiments, the plurality of osmotic membranes within the second reverse osmosis unit are connected in parallel. In certain embodiments, the second reverse osmosis unit comprises a plurality of membranes a first portion of which are connected in series and another portion of which are connected in parallel.

As used herein, two elements are in fluidic communication with each other (or, equivalently, in fluid communication with each other) when fluid may be transported from one of the elements to the other of the elements without otherwise altering the configurations of the elements or a configuration of an element between them (such as a valve). Two conduits connected by an open valve (thus allowing for the flow of fluid between the two conduits) are considered to be in fluidic communication with each other. In contrast, two conduits separated by a closed valve (thus preventing the flow of fluid between the conduits) are not considered to be in fluidic communication with each other.

As used herein, two elements are fluidically connected to each other when they are connected such that, under at least one configuration of the elements and any intervening elements, the two elements are in fluidic communication with each other. Two reverse osmosis units connected by a valve and conduits that permit flow between the reverse osmosis units in at least one configuration of the valve would be said to be fluidically connected to each other. To further illustrate, two reverse osmosis units that are connected by a valve and conduits that permit flow between the reverse osmosis units in a first valve configuration but not a second valve configuration are considered to be fluidically connected to each other both when the valve is in the first configuration and when the valve is in the second configuration. In contrast, two reverse osmosis units that are not connected to each other (e.g., by a valve, another conduit, or another component) in a way that would permit fluid to be transported between them under any configuration would not be said to be fluidically connected to each other. Elements that are in fluidic communication with each other are always fluidically connected to each other, but not all elements that are fluidically connected to each other are necessarily in fluidic communication with each other.

Various components are described herein as being fluidically connected. Fluidic connections may be either direct fluidic connections or indirect fluidic connections. Generally, a direct fluidic connection exists between a first region and a second region (and the two regions are said to be directly fluidically connected to each other) when they are fluidically connected to each other and when the composition of the fluid at the second region of the fluidic connection has not substantially changed relative to the composition of the fluid at the first region of the fluidic connection (i.e., no fluid component that was present in the first region of the fluidic connection is present in a weight percentage in the second region of the fluidic connection that is more than 5% different from the weight percentage of that component in the first region of the fluidic connection). As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations. In some embodiments, a direct fluidic connection between a first region and a second region can be configured such that the fluid does not undergo a phase change from the first region to the second region. In some embodiments, the direct fluidic connection can be configured such that at least 50 wt % (or at least 75 wt %, at least 90 wt %, at least 95 wt %, or at least 98 wt %) of the fluid in the first region is transported to the second region via the direct fluidic connection. Any of the fluidic connections described herein may be, in some embodiments, direct fluidic connections. In other cases, the fluidic connections may be indirect fluidic connections.

In some embodiments, the retentate side of the first reverse osmosis unit is directly fluidically connected to the pump outlet of the pump. For example, in FIGS. 1A-2B and 4A-4B, retentate side 107 of first reverse osmosis unit 106 may be directly fluidically connected to pump outlet 105 of pump 102.

In some embodiments, the retentate side of the first reverse osmosis unit is directly fluidically connected to the retentate side of the second reverse osmosis unit. For example, in FIGS. 1A-6B, retentate side 107 of first reverse osmosis unit 106 may be directly fluidically connected to retentate side 113 of second reverse osmosis unit 112.

In some embodiments, the retentate side of the second reverse osmosis unit is directly fluidically connected to the high pressure inlet of the energy recovery device. For example, in FIGS. 1A-2B, retentate side 113 of second reverse osmosis unit 112 may be directly fluidically connected to high pressure inlet 123 of energy recovery device 122.

In some embodiments, the permeate side of the second reverse osmosis unit is directly fluidically connected to the low pressure outlet of the energy recovery device. For example, in FIGS. 1A-3B, permeate side 114 of second reverse osmosis unit 112 may be directly fluidically connected to low pressure outlet 124 of energy recovery device 122.

In some embodiments, the retentate side of the first reverse osmosis unit is directly fluidically connected to the high pressure outlet of the energy recovery device. For example, in FIGS. 3A-3B and 5A-5B, retentate side 107 of first reverse osmosis unit 106 may be directly fluidically connected to high pressure outlet 126 of energy recovery device 122.

In some embodiments, the permeate side of the second reverse osmosis unit is directly fluidically connected to the low pressure inlet of the energy recovery device. For example, in FIGS. 2A-2B, permeate side 114 of second reverse osmosis unit 112 may be directly fluidically connected to low pressure inlet 125 of energy recovery device 122.

The systems and methods described herein can be used to process a variety of feed streams. Generally, the feed stream comprises at least one solvent and at least one solubilized species (also referred to herein as a solute). According to certain embodiments, the feed stream comprises solubilized ions. The solubilized ion(s) may originate, for example, from a salt that has been dissolved in the solvent(s) of the feed stream. A solubilized ion is generally an ion that has been solubilized to such an extent that the ion is no longer ionically bonded to a counter-ion. The feed stream can comprise any of a number of solubilized species including, but not limited to, $Na^+$, $Mg^{2+}$, $Ca^{2+}$, $Sr^{2+}$, $Ba^{2+}$, $Cl^-$, carbonate anions, bicarbonate anions, sulfate anions, bisulfate anions, and/or silica. In some embodiments, an aqueous feed stream comprises at least one solubilized monovalent cation (i.e., a cation with a redox state of +1 when solubilized). For example, in some embodiments, an aqueous feed stream comprises $Na^+$ and/or $K^+$. In certain embodiments, an aqueous feed stream comprises at least one monovalent anion (i.e., an anion having redox state of −1 when solubilized). For example, in some embodiments, an aqueous feed stream comprises $Cl^-$ and/or $Br^-$. In some embodiments, an aqueous feed stream comprises at least one monovalent cation and at least one monovalent anion. In some embodiments, an aqueous feed stream comprises one or more divalent cations (i.e., a cation with a redox state of +2 when solubilized) and/or one or more divalent anions (i.e., an anion with a redox state of −2 when solubilized). Cations and/or anions having other valencies may also be present in feed streams (e.g., an aqueous feed stream), in some embodiments.

In some embodiments, the total concentration of solubilized ions in the feed stream can be relatively high. One advantage associated with certain embodiments is that initial feed streams (e.g., aqueous feed streams) with relatively high solubilized ion concentrations can be desalinated without the use of energy intensive desalination methods. In certain embodiments, the total concentration of solubilized ions in the feed stream transported into the osmotic system is at least 60,000 ppm, at least 80,000 ppm, or at least 100,000 ppm (and/or, in some embodiments, up to 500,000 ppm, or more). Feed streams with solubilized ion concentrations outside these ranges could also be used.

According to certain embodiments, the feed stream that is transported to the osmotic system comprises a suspended and/or emulsified immiscible phase. Generally, a suspended and/or emulsified immiscible phase is a material that is not soluble in water to a level of more than 10% by weight at the temperature and other conditions at which the stream is operated. In some embodiments, the suspended and/or emulsified immiscible phase comprises oil and/or grease. The term "oil" generally refers to a fluid that is more hydrophobic than water and is not miscible or soluble in water, as is known in the art.

Thus, the oil may be a hydrocarbon in some embodiments, but in other embodiments, the oil may comprise other hydrophobic fluids. In some embodiments, at least 0.1 wt %, at least 1 wt %, at least 2 wt %, at least 5 wt %, or at least 10 wt % (and/or, in some embodiments, up to 20 wt %, up to 30 wt %, up to 40 wt %, up to 50 wt %, or more) of a feed stream (e.g., an aqueous feed stream) is made up of a suspended and/or emulsified immiscible phase.

While one or more of the reverse osmosis units (e.g., the first reverse osmosis unit, the second reverse osmosis unit) can be used to separate a suspended and/or emulsified immiscible phase from an incoming feed stream, such separation is optional. For example, in some embodiments, the feed stream transported to the osmotic system is substantially free of a suspended and/or emulsified immiscible phase. In certain embodiments, one or more separation units upstream of the osmotic system can be used to at least partially remove a suspended and/or emulsified immiscible phase from an aqueous feed stream before the aqueous feed stream is transported to a reverse osmosis unit. Non-limiting examples of such systems are described, for example, in International Patent Publication No. WO 2015/021062, published on Feb. 12, 2015, which is incorporated herein by reference in its entirety for all purposes.

In some embodiments, the feed stream can be derived from seawater, ground water, brackish water, and/or the effluent of a chemical process. In the oil and gas industry, for example, one type of aqueous feed stream that may be encountered is produced water (e.g., water that emerges from oil or gas wells along with the oil or gas). Due to the length of time produced water has spent in the ground, and due to high subterranean pressures and temperatures that may increase the solubility of certain salts and minerals, produced water often comprises relatively high concentrations of dissolved salts and minerals. For example, some produced water streams may comprise a supersaturated solution of dissolved strontium sulfate ($SrSO_4$). In contrast, another type of aqueous feed stream that may be encountered in the oil and gas industry is flowback water (e.g., water that is injected as a fracking fluid during hydraulic fracturing operations and subsequently recovered). Flowback water often comprises a variety of constituents used in fracking, including surfactants, proppants, and viscosity reducing agents, but often has a lower salinity than produced water. In some cases, the systems and methods described herein can be used to at least partially desalinate aqueous feed streams derived from such process streams.

A variety of types of solvents could also be used. In some embodiments, the feed stream comprises water as a solvent. Other examples of solvents include, but are not limited to alcohols and/or hydrocarbons.

The embodiments described herein are not limited to processing aqueous feed streams containing solubilized ions, and in other embodiments, other feed streams could be used. Non-limiting examples of such feed streams include milk, beer, fruit juice, maple syrup, and/or oil feed stocks.

The draw solutions described herein (e.g., the second reverse osmosis unit permeate inlet stream in some embodiments) can include any of a variety of solutes and solvents. The solute(s) in the draw streams can be the same as or different from the solute(s) in the feed stream. The solvent(s) in the draw streams are generally the same as the solvent(s) in the feed stream, although variations in solvent compositions can be present at various points in the osmotic system.

The draw solutions described herein can generally include any component(s) suitable for imparting an appropriate osmotic pressure to perform the functions described herein. In some embodiments, the draw stream(s) are aqueous solution(s) comprising one or more solubilized species, such as one or more dissolved ions and/or one or more dissociated molecules in water. For example, in some embodiments, the draw solution(s) (e.g., the second reverse osmosis unit permeate inlet stream in some embodiments) comprise $Na^+$, $Mg^{2+}$, $Ca^{2+}$, $Sr^{2+}$, $Ba^{2+}$, and/or $Cl^-$. In some embodiments, the draw solution(s) (e.g., the second reverse osmosis unit permeate inlet stream in some embodiments) comprises at least one solubilized monovalent cation, such as Na and/or $K^+$. In certain embodiments, the draw solution(s) (e.g., the second reverse osmosis unit permeate inlet stream in some embodiments) comprises at least one monovalent anion, such as $Cl^-$ and/or $Br^-$. Cations and/or anions having other valencies may also be present in the draw solution(s) (e.g., the second reverse osmosis unit permeate inlet stream in some embodiments). Other species could also be used in the draw solutions. For example, in some embodiments, the draw solution(s) (e.g., the second reverse osmosis unit permeate inlet stream in some embodiments) can be an aqueous stream comprising a solubilized non-ionic species, such as ammonia ($NH_3$).

Those of ordinary skill in the art, given the insight provided by the present disclosure, would be capable of selecting appropriate components for use in the various draw streams described herein.

The draw streams may be prepared, according to certain embodiments, by suspending and/or dissolving one or more species in a solvent (such as an aqueous solvent) to solubilize the species in the solvent. For example, in some embodiments, one or more draw inlet streams can be made by dissolving one or more solid salts in an aqueous solvent. Non-limiting examples of salts that may be dissolved in water include NaCl, LiCl, $CaCl_2$, $MgCl_2$, NaOH, other inorganic salts, and the like. In some embodiments, the draw stream can be prepared by mixing ammonia with water. In certain embodiments, the draw stream can be prepared by dissolving one or more ammonia salts (e.g., ammonium bicarbonate, ammonium carbonate, and/or ammonium carbamate) in water. In some embodiments, the draw stream can be prepared by dissolving ammonia and carbon dioxide gasses in water.

In some embodiments, the systems described herein can be used to achieve a relatively high level of purification. In some embodiments, the solute concentration in the first reverse osmosis unit and/or the second reverse osmosis unit retentate outlet streams is at least at least 1%, at least 2%, at least 5%, at least 10%, at least 25%, at least 50%, at least 100%, at least 200% higher, on a mass basis, than the concentration of the solute in the feed stream. As would be understood by one of ordinary skill in the art, an increase in concentration is measured relative to the lower concentration. For example, if the solute concentration in the first reverse osmosis unit retentate inlet stream is 35 grams/L, and the solute concentration in the first reverse osmosis unit retentate outlet stream is 38.5 grams/L, then the solute concentration in the first reverse osmosis unit retentate outlet stream is 10% higher, on a mass basis, than the solute concentration in first reverse osmosis unit retentate inlet stream (because the difference, 3.5 grams/L, is 10% of the lower value (i.e., 10% of 35 grams/L)).

According to certain embodiments, the streams on either side of an osmotic membrane(s) within the osmosis units can be operated in counter-current configuration. Operation of the osmotic system in this manner can, according to certain but not necessarily all embodiments, allow one to more easily ensure that the transmembrane net driving force is spatially uniform across the facial area of the osmotic membrane, for example, as described in International Patent Publication No. WO 2017/019944, filed Jul. 29, 2016 as International Patent Application No. PCT/US2016/044663, and entitled "Osmotic Desalination Methods and Associated Systems," which is incorporated herein by reference in its entirety. It should be understood that two streams do not have to be transported in perfectly parallel and opposite directions to be considered to be in counter-current configuration, and in some embodiments, the primary flow directions of two streams that are in a counter-current flow configuration can form an angle of up to 10° (or, in some cases, up to 5°, up to 2°, or up to 1°). In some embodiments, the second reverse osmosis unit is operated in a counter-current configuration.

Those of ordinary skill in the art are familiar with osmotic membranes. The membrane medium can comprise, for example, a metal, a ceramic, a polymer (e.g., polyamides, polyethylenes, polyesters, poly(tetrafluoroethylene), polysulfones, polycarbonates, polypropylenes, poly(acrylates)), and/or composites or other combinations of these. Osmotic membranes generally allow for the selective transport of solvent (e.g., water) through the membrane, where solvent is capable of being transmitted through the membrane while solute (e.g., solubilized species such as solubilized ions) are inhibited from being transported through the membrane. As would be understood by a person of ordinary skill in the art, some osmotic membranes can allow for some amount of solute to be transported through the membrane (e.g., from a retentate side to a permeate side) during operation. In other words, it is generally known that osmotic membranes can have a rejection rate of less than 100%, where rejection rate in this context refers to a percentage of a solute from an incoming solution that is not transported through the membrane. For example, an osmotic membrane may have a rejection rate for at least one solute under at least one set of conditions (e.g., temperature, pressure, pH) that is less than 100%, less than or equal to 99%, less than or equal to 98%, less than or equal to 95%, or less by mass. Examples of commercially available osmotic membranes that can be used in association with certain of the embodiments described herein include, but are not limited to, those commercially available from Dow Water and Process Solutions (e.g., FilmTec™ membranes), Hydranautics, GE Osmonics, and Toray Membrane, among others known to those of ordinary skill in the art.

It should be understood that, in the present disclosure, the word "purified" (and, similarly, "pure" and "purify") is used to describe any liquid that contains the component of interest in a higher percentage than is contained within a reference stream, and does not necessarily require that the liquid be 100% pure. That is to say, a "purified" stream can be partially or completely purified. As a non-limiting example, a water stream may be made up of 80 wt % water but could still be considered "purified" relative to a feed stream that is made up of 50 wt % water. Of course, it should also be understood that, in some embodiments, the "purified" stream could be made up of only (or substantially only) the component of interest. For example, a "purified" water stream could be made up of substantially only water (e.g., water in an amount of at least 98 wt %, at least 99 wt %, or more, or at least 99.9 wt %) and/or could be made up of only water (i.e., 100 wt % water).

The following are examples of embodiments disclosed herein.

In one embodiment (Embodiment #1), a method comprises increasing a pressure of at least a portion of a feed stream comprising a solvent and a solute to form a pressurized feed stream; transporting a first reverse osmosis unit retentate inlet stream to a retentate side of a first reverse osmosis unit such that: a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that: a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of at least a portion of the second reverse osmosis unit retentate outlet stream to form a reduced-pressure concentrate stream; and using at least a portion of energy recovered from the reducing of the pressure of the at least a portion of the second reverse osmosis unit retentate outlet stream to increase a pressure of an energy recovery stream to form a pressurized energy recovery stream; wherein: the first reverse osmosis unit retentate inlet stream comprises at least a portion of the pressurized feed stream and at least a portion of the pressurized energy recovery stream; the second reverse osmosis unit retentate inlet stream comprises at least a portion of the first reverse osmosis unit retentate outlet stream; the energy recovery stream comprises at least a portion of the second reverse osmosis unit permeate outlet stream; and (a) the energy recovery stream comprises a balancing stream comprising at least a portion of the feed stream, or (b) the feed stream comprises a balancing stream comprising at least a portion of the second reverse osmosis unit permeate outlet stream.

In some instances of Embodiment #1, the energy recovery stream comprises a balancing stream comprising at least a portion of the feed stream (Embodiment #2).

In some instances of Embodiment #1, the feed stream comprises a balancing stream comprising at least a portion of the second reverse osmosis unit permeate outlet stream (Embodiment #3).

In some instances of any one of Embodiments #1-#3, the method further comprises transporting a second reverse osmosis unit permeate inlet stream to the permeate side of the second reverse osmosis unit, and wherein the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream (Embodiment #4).

In some instances of Embodiment #4, the second reverse osmosis unit permeate inlet stream comprises at least a portion of the reduced pressure concentrate stream (Embodiment #5).

In some instances of any one of Embodiments #1-#5, the method further comprises discharging at least a portion of the reduced-pressure concentrate stream (Embodiment #6).

In some instances of any one of Embodiments #1-#6, the method further comprises adjusting a mass flow rate of the second reverse osmosis unit permeate outlet stream and/or the balancing stream such that the energy recovery stream has a mass flow rate within 20% of a mass flow rate of the at least a portion of the second reverse osmosis unit retentate outlet stream (Embodiment #7).

In some instances of any one of Embodiments #1-#7, a salinity of the pressurized energy recovery stream is within 20% of a salinity of the energy recovery stream (Embodiment #8).

In some instances of any one of Embodiments #1-#8, the first reverse osmosis unit retentate inlet stream comprises a recirculation stream comprising a first portion of the first reverse osmosis unit retentate outlet stream (Embodiment #9).

In some instances of Embodiment #9, the recirculation stream is combined with the at least a portion of the pressurized energy recovery stream prior to incorporation into the first reverse osmosis unit retentate inlet stream (Embodiment #10).

In some instances of any one of Embodiments #1-#10, the method further comprises increasing a pressure of the pressurized energy recovery stream with a second pump (Embodiment #11).

In some instances of any one of Embodiments #1-#11, the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device (Embodiment #12).

In some instances of Embodiment #12, the energy recovery device is an isobaric energy recovery device (Embodiment #13).

In some instances of Embodiment #12, the energy recovery device is a turbine energy recovery device (Embodiment #14).

In one embodiment (Embodiment #15), an osmotic system comprises: a pump comprising: a pump inlet, and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising: a high pressure inlet, a low pressure inlet, a high pressure outlet, and a low pressure outlet; wherein: the retentate side of the first reverse osmosis unit is fluidically connected to the pump outlet; the retentate side of the first reverse osmosis unit is fluidically connected to the retentate side of the second reverse osmosis unit; the retentate side of the second reverse osmosis unit is fluidically connected to the high pressure inlet of the energy recovery device; the retentate side of the first reverse osmosis unit is fluidically connected to the high pressure outlet of the energy recovery device; the permeate side of the second reverse osmosis unit is fluidically connected to the low pressure inlet of the energy recovery device; and the pump inlet is fluidically connected to the low pressure inlet of the energy recovery device.

In some instances of Embodiment #15, the energy recovery device is an isobaric energy recovery device (Embodiment #16).

In some instances of Embodiment #15, the energy recovery device is a turbine energy recovery device (Embodiment #17).

In some instances of any one of Embodiments #15-#17, the permeate side of the second reverse osmosis unit is fluidically connected to the low pressure outlet of the energy recovery device (Embodiment #18).

In some instances of any one of Embodiments #15-#18, the pump is a first pump, and the system further comprises a second pump comprising a second pump inlet and a second pump outlet, wherein the second pump inlet is fluidically connected to the high pressure outlet of the energy recovery device and the second pump outlet is fluidically connected to the retentate side of the first reverse osmosis unit (Embodiment #19).

In some instances of any one of Embodiments #15-#19, the osmotic system is configured to combine a recirculation stream from a first portion of a first reverse osmosis unit retentate outlet stream exiting the outlet of the retentate side of the first reverse osmosis unit with a pressurized energy recovery stream exiting the high pressure outlet of the energy recovery device (Embodiment #20).

In some instances of any one of Embodiments #15-#20, the first reverse osmosis unit comprises a plurality of osmotic membranes (Embodiment #21).

In some instances of Embodiment #21, the plurality of osmotic membranes are connected in series (Embodiment #22).

In some instances of Embodiment #21, the plurality of osmotic membranes are connected in parallel (Embodiment #23).

In some instances of any one of Embodiments #15-#23, the second reverse osmosis unit comprises a plurality of osmotic membranes (Embodiment #24).

In some instances of Embodiment #24, the plurality of osmotic membranes are connected in series (Embodiment #25).

In some instances of Embodiment #24, the plurality of osmotic membranes are connected in parallel (Embodiment #26).

In one embodiment (Embodiment #27), a method comprises: increasing a pressure of at least a portion of a feed stream comprising a solvent and a solute to form a pressurized feed stream; transporting a first reverse osmosis unit retentate inlet stream to a retentate side of a first reverse osmosis unit such that: a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that: a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of at least a portion of the second reverse osmosis unit retentate outlet stream to form a reduced-pressure concentrate stream; and using at least a portion of energy recovered from the reducing of the pressure of the at least a portion of the second reverse osmosis unit retentate outlet stream to increase a pressure of an energy recovery stream to form a pressurized energy recovery stream; wherein: the first reverse osmosis unit retentate inlet stream comprises at least a portion of the pressurized feed stream, at least a portion of the pressurized energy recovery stream, and a recirculation stream comprising a first portion of the first reverse osmosis unit retentate outlet stream, wherein the recirculation stream is combined with the at least a portion of the pressurized energy recovery stream prior to incorporation into the first reverse osmosis unit retentate inlet stream; the second reverse osmosis unit retentate inlet stream comprises a second portion of the first reverse osmosis unit retentate outlet stream; and the energy recovery stream comprises at least a portion of the second reverse osmosis unit permeate outlet stream.

In some instances of Embodiment #27, the method further comprises transporting a second reverse osmosis unit permeate inlet stream to the permeate side of the second reverse osmosis unit, and wherein the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream (Embodiment #28).

In some instances of Embodiment #28, the second reverse osmosis unit permeate inlet stream comprises at least a portion of the reduced pressure concentrate stream (Embodiment #29).

In some instances of any one of Embodiments #27-#29, the method further comprises discharging at least a portion of the reduced-pressure concentrate stream (Embodiment #30).

In some instances of any one of Embodiments #27-#30, the method further comprises increasing a pressure of the pressurized energy recovery stream with a pump (Embodiment #31).

In some instances of any one of Embodiments #27-#31, the method further comprises increasing a pressure of the combination of the recirculation stream and the at least a portion of the pressurized energy recovery stream (Embodiment #32).

In some instances of any one of Embodiments #27-#32, the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device (Embodiment #33).

In some instances of Embodiment #33, the energy recovery device is an isobaric energy recovery device (Embodiment #34).

In some instances of Embodiment #33, the energy recovery device is a turbine energy recovery device (Embodiment #35).

In some instances of any one of Embodiments #27-#35, the energy recovery stream comprises a balancing stream comprising at least a portion of the feed stream (Embodiment #36).

In some instances of any one of Embodiments #27-#35, the feed stream comprises a balancing stream comprising at least a portion of the second reverse osmosis unit permeate outlet stream (Embodiment #37).

In some instances of any one of Embodiments #27-#37, the method further comprises adjusting a mass flow rate of the second reverse osmosis unit permeate outlet stream and/or the balancing stream such that the energy recovery stream has a mass flow rate within 20% of a mass flow rate of the at least a portion of the second reverse osmosis unit retentate outlet stream (Embodiment #38).

In some instances of any one of Embodiments #27-#38, a salinity of the pressurized energy recovery stream is within 20% of a salinity of the energy recovery stream (Embodiment #39).

In one embodiment (Embodiment #40), an osmotic system comprises: a pump comprising: a pump inlet, and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising: a high pressure inlet, a low pressure inlet, a high pressure outlet, and a low pressure outlet; wherein: the retentate side of the first reverse osmosis unit is fluidically connected to the pump outlet; the retentate side of the first reverse osmosis unit is fluidically connected to the retentate side of the second reverse osmosis unit; the retentate side of the second reverse osmosis unit is fluidically connected to the high pressure inlet of the energy recovery device; the retentate side of the first reverse osmosis unit is fluidically connected to the high pressure outlet of the energy recovery device; the permeate side of the second reverse osmosis unit is fluidically connected to the low pressure inlet of the energy recovery device; and wherein the osmotic system is configured to combine a recirculation stream from a first portion of a first reverse osmosis unit retentate outlet stream exiting the outlet of the retentate side of the first reverse osmosis unit with a pressurized energy recovery stream exiting the high pressure outlet of the energy recovery device.

In some instances of Embodiment #40, the energy recovery device is an isobaric energy recovery device (Embodiment #41).

In some instances of Embodiment #40, the energy recovery device is a turbine energy recovery device (Embodiment #42).

In some instances of any one of Embodiments #40-#42, the permeate side of the second reverse osmosis unit is fluidically connected to the low pressure outlet of the energy recovery device (Embodiment #43).

In some instances of any one of Embodiments #40-#43, the pump is a first pump, and the system further comprises a second pump comprising a second pump inlet and a second pump outlet, wherein the second pump inlet is fluidically connected to the high pressure outlet of the energy recovery device and the second pump outlet is fluidically connected to the retentate side of the first reverse osmosis unit (Embodiment #44).

In some instances of any one of Embodiments #40-#44, the pump inlet is fluidically connected to the low pressure inlet of the energy recovery device (Embodiment #45).

In some instances of any one of Embodiments #40-#45, the pump inlet is fluidically connected to the permeate side of the second reverse osmosis unit (Embodiment #46).

In some instances of any one of Embodiments #40-#46, the first reverse osmosis unit comprises a plurality of osmotic membranes (Embodiment #47).

In some instances of Embodiment #47, the plurality of osmotic membranes are connected in series (Embodiment #48).

In some instances of Embodiment #47, the plurality of osmotic membranes are connected in parallel (Embodiment #49).

In some instances of any one of Embodiments #40-#49, the second reverse osmosis unit comprises a plurality of osmotic membranes (Embodiment #50).

In some instances of Embodiment #50, the plurality of osmotic membranes are connected in series (Embodiment #51).

In some instances of any one of Embodiments #40-#50, the plurality of osmotic membranes are connected in parallel (Embodiment #52).

In one embodiment (Embodiment #53), a method comprises: increasing a pressure of at least a portion of a feed stream comprising a solvent and a solute to form a pressurized feed stream; transporting a first reverse osmosis unit retentate inlet stream to a retentate side of a first reverse osmosis unit such that: a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that: a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of at least a portion of the second reverse osmosis unit retentate outlet stream to form a reduced-pressure concentrate stream; and using at least a portion of energy recovered from the reducing of the pressure of the at least a portion of the second reverse osmosis unit retentate outlet stream to increase a pressure of an energy recovery stream to form a pressurized energy recovery stream; wherein: the first reverse osmosis unit retentate inlet stream comprises at least a portion of the pressurized energy recovery stream; the energy recovery stream comprises at least a portion of the pressurized feed stream and a recirculation stream comprising a first portion of the first reverse osmosis unit retentate outlet stream; the second reverse osmosis unit retentate inlet stream comprises a second portion of the first reverse osmosis unit retentate outlet stream; and the feed stream comprises at least a portion of the second reverse osmosis unit permeate outlet stream.

In some instances of Embodiment #53, the method further comprises transporting a second reverse osmosis unit permeate inlet stream to the permeate side of the second reverse osmosis unit, and wherein the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream (Embodiment #54).

In some instances of Embodiment #54, the second reverse osmosis unit permeate inlet stream comprises at least a portion of the reduced pressure concentrate stream (Embodiment #55).

In some instances of any one of Embodiments #53-#55, the method further comprises discharging at least a portion of the reduced-pressure concentrate stream (Embodiment #56).

In some instances of any one of Embodiments #53-#56, the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device (Embodiment #57).

In some instances of Embodiment #57, the energy recovery device is an isobaric energy recovery device (Embodiment #58).

In some instances of Embodiment #57, the energy recovery device is a turbine energy recovery device (Embodiment #59).

In some instances of any one of Embodiments #53-#59, the method further comprises adjusting a mass flow rate of the second reverse osmosis unit permeate outlet stream such that the energy recovery stream has a mass flow rate within 20% of a mass flow rate of the at least a portion of the second reverse osmosis unit retentate outlet stream (Embodiment #60).

In some instances of any one of Embodiments #53-#60, a salinity of the pressurized energy recovery stream is within 20% of a salinity of the energy recovery stream (Embodiment #61).

In one embodiment (Embodiment #62), an osmotic system comprises: a pump comprising: a pump inlet, and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising: a high pressure inlet, a low pressure inlet, a high pressure outlet, and a low pressure outlet; wherein: the retentate side of the first reverse osmosis unit is fluidically connected to the retentate side of the second reverse osmosis unit; the retentate side of the second reverse osmosis unit is fluidically connected to the high pressure inlet of the energy recovery device; the permeate side of the second reverse osmosis unit is fluidically connected to the pump inlet; the retentate side of the first reverse osmosis unit is fluidically connected to the high pressure outlet of the energy recovery device; and the low pressure inlet of the energy recovery device is fluidically connected to the pump outlet and an outlet of the retentate side of the first reverse osmosis unit.

In some instances of Embodiment #62, the osmotic system is configured to combine a recirculation stream from a first portion of a first reverse osmosis unit retentate outlet stream exiting the outlet of the retentate side of the first reverse osmosis unit with a pressurized feed stream exiting the pump outlet (Embodiment #63).

In some instances of any one of Embodiments #62-#63, the permeate side of the second reverse osmosis unit is fluidically connected to the low pressure outlet of the energy recover device (Embodiment #64).

In some instances of any one of Embodiments #62-#64, the energy recovery device is an isobaric energy recovery device (Embodiment #65).

In some instances of any one of Embodiments #62-#64, the energy recovery device is a turbine energy recovery device (Embodiment #66).

In some instances of any one of Embodiments #62-#66, the first reverse osmosis unit comprises a plurality of osmotic membranes (Embodiment #67).

In some instances of Embodiment #67, the plurality of osmotic membranes are connected in series (Embodiment #68).

In some instances of Embodiment #67, the plurality of osmotic membranes are connected in parallel (Embodiment #69).

In some instances of any one of Embodiments #62-#69, the second reverse osmosis unit comprises a plurality of osmotic membranes (Embodiment #70).

In some instances of Embodiment #70, the plurality of osmotic membranes are connected in series (Embodiment #71).

In one embodiment (Embodiment #72), a method comprises: increasing, during a first period of time and a second period of time, a pressure of at least a portion of a feed stream comprising a solvent and a solute to form a pressurized feed stream; transporting, during the first period of time and the second period of time, a first reverse osmosis unit retentate inlet stream to a retentate side of a first reverse osmosis unit such that: a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting, during at least the first period of time, a second reverse osmosis unit retentate inlet stream to a retentate side of a second reverse osmosis unit such that: a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing, during the first period of time and the second period of time, a pressure of a concentrate stream to form a reduced-pressure concentrate stream; and using, during the first period of time and the second period of time, at least a portion of energy recovered from the reducing of the pressure of the concentrate stream to increase a pressure of an energy recovery stream to form a pressurized energy recovery stream; wherein: during at least the first period of time: the second reverse osmosis unit retentate inlet stream comprises at least a portion of the first reverse osmosis unit retentate outlet stream; the energy recovery stream comprises at least a portion of the second reverse osmosis unit permeate outlet stream; and the concentrate stream comprises at least a portion of the second reverse osmosis unit retentate outlet stream; during at least the second period of time: the retentate side of the second reverse osmosis unit does not receive any portion of the first reverse osmosis unit retentate outlet stream or receives an amount of the first reverse osmosis unit retentate outlet stream that is at least 80 wt % less than an amount of the first reverse osmosis unit retentate outlet stream received by the retentate side of the second reverse osmosis unit during the first period of time, and the permeate side of the second reverse osmosis unit does not receive any portion of the reduced-pressure concentrate stream or receives an amount of the reduced-pressure concentrate stream that is at least 80 wt % less than an amount of the reduced-pressure concentrate stream received by the permeate side of the second reverse osmosis unit during the first period of time; and the concentrate stream comprises at least a portion of a bypass stream comprising at least a portion of the first reverse osmosis unit retentate outlet stream; and during both the first period of time and the second period of time: the first reverse osmosis unit retentate inlet stream comprises at least a portion of the pressurized feed stream and at least a portion of the pressurized energy recovery stream.

In some instances of Embodiment #72, the concentrate stream comprises the at least a portion of the bypass stream during the first period of time (Embodiment #73).

In some instances of Embodiment #72, the concentrate stream does not comprise the at least a portion of the bypass stream during the first period of time (Embodiment #74).

In some instances of any one of Embodiments #72–#74, during at least the second period of time, the energy recovery stream comprises a balancing stream comprising at least a portion of the feed stream (Embodiment #75).

In some instances of Embodiment #74, the energy recovery stream comprises the balancing stream comprising a portion of the feed stream during the first period of time (Embodiment #76).

In some instances of Embodiment #74, the energy recovery stream does not comprise the balancing stream comprising a portion of the feed stream during the first period of time (Embodiment #77).

In some instances of any one of Embodiments #72–#74, during at least the second period of time, the feed stream comprises a balancing stream comprising at least a portion of the second reverse osmosis unit permeate outlet stream (Embodiment #78).

In some instances of Embodiment #78, the feed stream comprises a balancing stream comprising at least a portion of the second reverse osmosis unit permeate outlet stream during the first period of time (Embodiment #79).

In some instances of Embodiment #78, the feed stream does not comprise the balancing stream comprising at least a portion of the second reverse osmosis unit permeate outlet stream during the first period of time (Embodiment #80).

In some instances of any one of Embodiments #72–#80, the method further comprises transporting, during at least the first period of time, a second reverse osmosis unit permeate inlet stream to the permeate side of the second reverse osmosis unit, and wherein the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream (Embodiment #81).

In some instances of Embodiment #81, during at least the first period of time, the second reverse osmosis unit permeate inlet stream comprises at least a portion of the reduced pressure concentrate stream (Embodiment #82).

In some instances of any one of Embodiments #72–#82, the method further comprises discharging at least a portion of the reduced-pressure concentrate stream (Embodiment #83).

In some instances of any one of Embodiments #72–#83, the method further comprises discharging a portion of the bypass stream via a bypass discharge stream (Embodiment #84).

In some instances of any one of Embodiments #72–#84, the method further comprises combining a portion of the bypass stream with the reduced-pressure concentrate stream via a bypass discharge stream (Embodiment #85).

In some instances of any one of Embodiments #72–#85, the method further comprises adjusting a mass flow rate of the bypass stream and/or a mass flow rate of the bypass discharge stream such that a mass flow rate of the concentrate stream is within 20% of a mass flow rate of the energy recovery stream (Embodiment #86).

In some instances of any one of Embodiments #72–#86, the method further comprises adjusting a mass flow rate of the second reverse osmosis unit permeate outlet stream and/or the balancing stream such that the energy recovery stream has a mass flow rate within 20% of a mass flow rate of the at least a portion of the second reverse osmosis unit retentate outlet stream (Embodiment #87).

In some instances of any one of Embodiments #72–#87, a salinity of the pressurized energy recovery stream is within 20% of a salinity of the energy recovery stream (Embodiment #88).

In some instances of any one of Embodiments #72–#88, the first reverse osmosis unit retentate inlet stream comprises a recirculation stream comprising a first portion of the first reverse osmosis unit retentate outlet stream (Embodiment #89).

In some instances of Embodiment #89, the recirculation stream is combined with the at least a portion of the pressurized energy recovery stream prior to incorporation into the first reverse osmosis unit retentate inlet stream (Embodiment #90).

In some instances of any one of Embodiments #72–#90, the method further comprises increasing a pressure of the pressurized energy recovery stream with a pump (Embodiment #91).

In some instances of any one of Embodiments #72–#91, the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device (Embodiment #92).

In some instances of Embodiment #92, the energy recovery device is an isobaric energy recovery device (Embodiment #93).

In some instances of Embodiment #92, the energy recovery device is a turbine energy recovery device (Embodiment #94).

In one embodiment (Embodiment #95), an osmotic system comprises: a pump comprising: a pump inlet, and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising: a high pressure inlet, a low pressure inlet, a high pressure outlet, and a low pressure outlet; and valving; wherein: the retentate side of the first reverse osmosis unit is fluidically connected to the pump outlet; the retentate side of the first reverse osmosis unit is fluidically connected to the high pressure outlet of the energy recovery device; and the valving is configured such that: when the valving is in a first position: the retentate side of the first reverse osmosis unit is in fluidic communication with the retentate side of the second reverse osmosis unit; the retentate side of the second reverse osmosis unit is in fluidic communication with the high pressure inlet of the energy recovery device; and the permeate side of the second reverse osmosis unit is in fluidic communication with the low pressure inlet of the energy recovery device; and when the valving is in a second position: the retentate side of the first reverse osmosis unit is in fluidic communication with the high pressure inlet of the energy recovery device.

In some instances of Embodiment #95, when the valving is in the second position, the retentate side of the first reverse osmosis unit is not in fluidic communication with the retentate side of the second reverse osmosis unit (Embodiment #96).

In some instances of any one of Embodiments #95-#96, when the valving is in the second position, the retentate side of the second reverse osmosis unit is not in fluidic communication with the high pressure inlet of the energy recovery device (Embodiment #97).

In some instances of any one of Embodiments #95-#97, when the valving is in the first position, the permeate side of the second reverse osmosis unit is in fluidic communication with the low pressure outlet of the energy recovery device (Embodiment #98).

In some instances of any one of Embodiments #95-#98, when the valving is in the second position, the permeate side of the second reverse osmosis unit is not in fluidic communication with the low pressure outlet of the energy recovery device (Embodiment #99).

In some instances of any one of Embodiments #95-#99, when the valving is in the second position, the permeate side of the second reverse osmosis unit is in fluidic communication with the low pressure inlet of the energy recovery device (Embodiment #100).

In some instances of any one of Embodiments #95-#100, when the valving is in the first position, the retentate side of the first reverse osmosis unit is in fluidic communication with the high pressure inlet of the energy recovery device (Embodiment #101).

In some instances of any one of Embodiments #95-#100, when the valving is in the first position, the retentate side of the first reverse osmosis unit is not in fluidic communication with the high pressure inlet of the energy recovery device (Embodiment #102).

In some instances of any one of Embodiments #95-#102, when the valving is in the second position, the pump inlet is in fluidic communication with the low pressure inlet of the energy recovery device (Embodiment #103).

In some instances of any one of Embodiments #95-#103, when the valving is in the first position, the pump inlet is in fluidic communication with the low pressure inlet of the energy recovery device (Embodiment #104).

In some instances of any one of Embodiments #95-#103, when the valving is in the first position, the pump inlet is not in fluidic communication with the low pressure inlet of the energy recovery device (Embodiment #105).

In some instances of any one of Embodiments #95-#105, when the valving is in the first position and/or the second position, the osmotic system is configured to combine a recirculation stream from a first portion of a first reverse osmosis unit retentate outlet stream exiting the outlet of the retentate side of the first reverse osmosis unit with a pressurized energy recovery stream exiting the high pressure outlet of the energy recovery device (Embodiment #106).

In some instances of any one of Embodiments #95-#106, the energy recovery device is an isobaric energy recovery device (Embodiment #107).

In some instances of any one of Embodiments #95-#106, the energy recovery device is a turbine energy recovery device (Embodiment #108).

In some instances of any one of Embodiments #95-#108, the pump is a first pump, and the system further comprises a second pump comprising a second pump inlet and a second pump outlet, wherein the second pump inlet is fluidically connected to the high pressure outlet of the energy recovery device and the second pump outlet is fluidically connected to the retentate side of the first reverse osmosis unit (Embodiment #109).

In some instances of any one of Embodiments #95-#109, the first reverse osmosis unit comprises a plurality of osmotic membranes (Embodiment #110).

In some instances of Embodiment #109, the plurality of osmotic membranes are connected in series (Embodiment #111).

In some instances of Embodiment #109, the plurality of osmotic membranes are connected in parallel (Embodiment #112).

In some instances of any one of Embodiments #95-#112, the second reverse osmosis unit comprises a plurality of osmotic membranes (Embodiment #113).

In some instances of Embodiment #113, the plurality of osmotic membranes are connected in series (Embodiment #114).

In some instances of Embodiment #113, the plurality of osmotic membranes are connected in parallel (Embodiment #115).

In one embodiment (Embodiment #116), a method comprises: increasing, during a first period of time and a second period of time, a pressure of at least a portion of a feed stream comprising a solvent and a solute to form a pressurized feed stream; transporting, during the first period of time and the second period of time, a first reverse osmosis unit retentate inlet stream to a retentate side of a first reverse osmosis unit such that: a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting, during at least the first period of time, a second reverse osmosis unit retentate inlet stream to a retentate side of a second reverse osmosis unit such that: a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing, during the first period of time and the second period of time, a pressure of a concentrate stream to form a reduced-pressure concentrate stream; and using, during the first period of time and the second period of time, at least a portion of energy recovered from the reducing of the pressure of the concentrate stream to increase a pressure of an energy recovery stream to form a pressurized energy recovery stream; wherein: during at least the first period of time: the second reverse osmosis unit retentate inlet stream comprises at least a portion of the first reverse osmosis unit retentate outlet stream; and the concentrate stream comprises at least a portion of the second reverse osmosis unit retentate outlet stream; during at least the second period of time: the retentate side of the second reverse osmosis unit does not receive any portion of the first reverse osmosis unit retentate outlet stream or receives an amount of the first reverse osmosis unit retentate outlet stream that is at least 80 wt % less than an amount of the first reverse osmosis unit retentate outlet stream received by the retentate side of the second reverse osmosis unit during the first period of time, and the permeate side of the second reverse osmosis unit does not receive any portion of the reduced-pressure concentrate stream or receives an amount of the reduced-pressure concentrate stream that is at least 80 wt % less than an amount of the reduced-pressure concentrate stream received by the permeate side of the second reverse osmosis unit during the first period of time; and the concentrate stream comprises at least a portion of a bypass stream comprising at least a portion of the first reverse osmosis unit retentate outlet stream; and during both the first period of time and the second period of time: the energy recovery stream comprises at least a portion of the pressurized feed stream; and the first reverse osmosis unit retentate inlet stream comprises at least a portion of the pressurized energy recovery stream.

In some instances of Embodiment #116, the concentrate stream comprises the at least a portion of the bypass stream during the first period of time (Embodiment #117).

In some instances of Embodiment #116, the concentrate stream does not comprise the at least a portion of the bypass stream during the first period of time (Embodiment #118).

In some instances of any one of Embodiments #116-#118, the method further comprises transporting, during at least the first period of time, a second reverse osmosis unit permeate inlet stream to the permeate side of the second reverse osmosis unit, and wherein the portion of liquid transported from the retentate side of the second reverse osmosis unit, through the osmotic membrane of the second reverse osmosis unit, to the permeate side of the second reverse osmosis unit is combined with the second reverse osmosis unit permeate inlet stream at the permeate side of the second reverse osmosis unit to form the second reverse osmosis unit permeate outlet stream (Embodiment #119).

In some instances of Embodiment #119, wherein, during at least the first period of time, the second reverse osmosis unit permeate inlet stream comprises at least a portion of the reduced pressure concentrate stream (Embodiment #120).

In some instances of any one of Embodiments #116-#120, the feed stream comprises at least a portion of the second reverse osmosis unit permeate outlet stream (Embodiment #121).

In some instances of any one of Embodiments #116-#121, the method further comprises discharging at least a portion of the reduced-pressure concentrate stream (Embodiment #122).

In some instances of any one of Embodiments #116-#122, the method further comprises increasing a pressure of the pressurized energy recovery stream with a pump (Embodiment #123).

In some instances of any one of Embodiments #116-#123, the method further comprises discharging a portion of the bypass stream via a bypass discharge stream (Embodiment #124).

In some instances of any one of Embodiments #116-#124, the method further comprises combining a portion of the bypass stream with the reduced-pressure concentrate stream via a bypass discharge stream (Embodiment #125).

In some instances of any one of Embodiments #116-#125, the method further comprises adjusting a mass flow rate of the bypass stream and/or a mass flow rate of the bypass discharge stream such that a mass flow rate of the concentrate stream is within 20% of a mass flow rate of the energy recovery stream (Embodiment #126).

In some instances of any one of Embodiments #116-#126, the energy recovery stream comprises a recirculation stream comprising a first portion of the first reverse osmosis unit retentate outlet stream (Embodiment #127).

In some instances of any one of Embodiments #116-#127, the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device (Embodiment #128).

In some instances of Embodiment #128, the energy recovery device is an isobaric energy recovery device (Embodiment #129).

In some instances of Embodiment #128, the energy recovery device is a turbine energy recovery device (Embodiment #130).

In one embodiment (Embodiment #131), an osmotic system comprises: a pump comprising: a pump inlet, and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; and an energy recovery device comprising: a high pressure inlet, a low pressure inlet, a high pressure outlet, and a low pressure outlet; and valving; wherein: the low pressure inlet of the energy recovery device is fluidically connected to the pump outlet; the retentate side of the first reverse osmosis unit is fluidically connected to the high pressure outlet of the energy recovery device; and the valving is configured such that: when the valving is in a first position: the retentate side of the first reverse osmosis unit is in fluidic communication with the retentate side of the second reverse osmosis unit; and the retentate side of the second reverse osmosis unit is in fluidic communication with the high pressure inlet of the energy recovery device; and when the valving is in a second position: the retentate side of the first reverse osmosis unit is in fluidic communication with the high pressure inlet of the energy recovery device.

In some instances of Embodiment #131, when the valving is in the first position, the permeate side of the second reverse osmosis unit is in fluidic communication with the low pressure outlet of the energy recovery device (Embodiment #132).

In some instances of any one of Embodiments #131-#132, when the valving is in the first position, the permeate side of the second reverse osmosis unit is in fluidic communication with the pump inlet (Embodiment #133).

In some instances of any one of Embodiments #131-#133, when the valving is in the second position, the retentate side of the first reverse osmosis unit is not in fluidic communication with the retentate side of the second reverse osmosis unit (Embodiment #134).

In some instances of any one of Embodiments #131-#134, when the valving is in the second position, the retentate side of the second reverse osmosis unit is not in fluidic communication with the high pressure inlet of the energy recovery device (Embodiment #135).

In some instances of any one of Embodiments #131-#135, when the valving is in the second position, the permeate side of the second reverse osmosis unit is not in fluidic communication with the low pressure outlet of the energy recovery device (Embodiment #136).

In some instances of any one of Embodiments #131-#136, when the valving is in the second position, the permeate side of the second reverse osmosis unit is not in fluidic communication with the pump inlet (Embodiment #137).

In some instances of any one of Embodiments #131-#137, when the valving is in the first position, the retentate side of the first reverse osmosis unit is in fluidic communication with the high pressure inlet of the energy recovery device (Embodiment #138).

In some instances of any one of Embodiments #131-#137, when the valving is in the first position, the retentate side of the first reverse osmosis unit is not in fluidic communication with the high pressure inlet of the energy recovery device (Embodiment #139).

In some instances of any one of Embodiments #131-#139, when the valving is in the first position and/or the second position, the low pressure inlet of the energy recovery device is fluidically connected to an outlet of the retentate side of the first reverse osmosis unit (Embodiment #140).

In some instances of any one of Embodiments #131-#140, the energy recovery device is an isobaric energy recovery device (Embodiment #141).

In some instances of any one of Embodiments #131-#140, the energy recovery device is a turbine energy recovery device (Embodiment #142).

In some instances of any one of Embodiments #131-#142, the pump is a first pump, and the system further comprises a second pump comprising a second pump inlet and a second pump outlet, wherein the second pump inlet is fluidically connected to the high pressure outlet of the energy recovery device and the second pump outlet is fluidically connected to the retentate side of the first reverse osmosis unit (Embodiment #143).

In some instances of any one of Embodiments #131-#143, the first reverse osmosis unit comprises a plurality of osmotic membranes (Embodiment #144).

In some instances of Embodiment #144, the plurality of osmotic membranes are connected in series (Embodiment #145).

In some instances of Embodiment #144, the plurality of osmotic membranes are connected in parallel (Embodiment #146).

In some instances of any one of Embodiments #131-#146, the second reverse osmosis unit comprises a plurality of osmotic membranes (Embodiment #147).

In some instances of Embodiment #147, the plurality of osmotic membranes are connected in series (Embodiment #148).

In some instances of Embodiment #147, the plurality of osmotic membranes are connected in parallel (Embodiment #149).

In one embodiment (Embodiment #150), a method comprises: increasing a pressure of at least a portion of a feed stream comprising a solvent and a solute to form a pressurized feed stream; transporting a first reverse osmosis unit retentate inlet stream to a retentate side of a first reverse osmosis unit such that: a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit; transporting a second reverse osmosis unit retentate inlet stream to a retentate side of a second reverse osmosis unit such that: a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit; reducing a pressure of a first concentrate stream comprising a first portion of the second osmosis unit retentate outlet stream to form a reduced-pressure first concentrate stream; using at least a portion of energy recovered from the reducing of the pressure of the first concentrate stream to increase a pressure of a first energy recovery stream to form a pressurized first energy recovery stream; reducing a pressure of a second concentrate stream comprising a second portion of the second osmosis unit retentate outlet stream to form a reduced-pressure second concentrate stream; and using at least a portion of energy recovered from the reducing of the pressure of the second concentrate stream to increase a pressure of a second energy recovery stream to form a pressurized second energy recovery stream; wherein: the first reverse osmosis unit retentate inlet stream comprises at least a portion of the pressurized first energy recovery stream and at least a portion of the pressurized second energy recovery stream; the first energy recovery stream comprises at least a portion of the pressurized feed stream; the second reverse osmosis unit retentate inlet stream comprises at least a portion of the first reverse osmosis unit retentate outlet stream; and the second energy recovery stream comprises at least a portion of the second reverse osmosis unit permeate outlet stream.

In some instances of Embodiment #150, the method further comprises discharging at least a portion of the reduced-pressure first concentrate stream and/or at least a portion of the reduced-pressure second concentrate stream (Embodiment #151).

In some instances of any one of Embodiments #150-#151, the step of using at least a portion of energy recovered from the reducing of the pressure of the first concentrate stream to increase a pressure of the first energy recovery stream to form a pressurized first energy recovery stream is performed using a first energy recovery device (Embodiment #152).

In some instances of Embodiment #152, the first energy recovery device is an isobaric energy recovery device (Embodiment #153).

In some instances of Embodiment #152, the first energy recovery device is a turbine energy recovery device (Embodiment #154).

In some instances of any one of Embodiments #150-#154, the step of using at least a portion of energy recovered from the reducing of the pressure of the second concentrate stream to increase a pressure of the second energy recovery stream to form a pressurized second energy recovery stream is performed using a second energy recovery device (Embodiment #155).

In some instances of Embodiment #155, the second energy recovery device is an isobaric energy recovery device (Embodiment #156).

In some instances of Embodiment #155, the second energy recovery device is a turbine energy recovery device (Embodiment #157).

In some instances of any one of Embodiments #150-#157, the first reverse osmosis unit retentate inlet stream comprises a recirculation stream comprising a first portion of the first reverse osmosis unit retentate outlet stream (Embodiment #158).

In some instances of Embodiment #158, the recirculation stream is combined with the at least a portion of the pressurized second energy recovery stream prior to incorporation into the first reverse osmosis unit retentate inlet stream (Embodiment #159).

In some instances of any one of Embodiments #150-#159, the first energy recovery stream comprises a recirculation stream comprising a first portion of the first reverse osmosis unit retentate outlet stream (Embodiment #160).

In some instances of any one of Embodiments #150-#160, the method further comprises transporting a second reverse osmosis unit permeate inlet stream to the permeate side of the second reverse osmosis unit such that the portion of the liquid transported from the retentate side of the second reverse osmosis unit, through the osmotic membrane of the second reverse osmosis unit, to the permeate side of the second reverse osmosis unit is combined with the second reverse osmosis unit permeate inlet stream to form the second reverse osmosis unit permeate outlet stream (Embodiment #161).

In some instances of Embodiment #161, the second reverse osmosis unit permeate inlet stream comprises at least a portion of the reduced-pressure first concentrate stream (Embodiment #162).

In one embodiment (Embodiment #163), an osmotic system comprises: a pump comprising: a pump inlet, and a pump outlet, wherein the pump is configured to eject a pressurized stream from the pump outlet; a first reverse osmosis unit comprising at least one osmotic membrane defining a permeate side of the first reverse osmosis unit and a retentate side of the first reverse osmosis unit; a second reverse osmosis unit comprising at least one osmotic membrane defining a permeate side of the second reverse osmosis unit and a retentate side of the second reverse osmosis unit; a first energy recovery device comprising: a first high pressure inlet, a first low pressure inlet, a first high pressure outlet, and a first low pressure outlet; a second energy recovery device comprising: a second high pressure inlet, a second low pressure inlet, a second high pressure outlet, and a second low pressure outlet; wherein: the retentate side of the first reverse osmosis unit is fluidically connected to the retentate side of the second reverse osmosis unit; the retentate side of the second reverse osmosis unit is fluidically connected to the first high pressure inlet of the first energy recovery device and the second high pressure inlet of the second energy recovery device; the permeate side of the second reverse osmosis unit is fluidically connected to the second low pressure inlet of the second energy recovery device; the retentate side of the first reverse osmosis unit is fluidically connected to the first high pressure outlet of the first energy recovery device and the second high pressure outlet of the second energy recovery device; and the first low pressure inlet of the first energy recovery device is fluidically connected to the pump outlet.

In some instances of Embodiment #163, the first energy recovery device is a turbine energy recovery device (Embodiment #164).

In some instances of Embodiment #163, the first energy recovery device is an isobaric energy recovery device (Embodiment #165).

In some instances of any one of Embodiments #163-#165, the second energy recovery device is an isobaric energy recovery device (Embodiment #166).

In some instances of any one of Embodiments #163-#166, the second energy recovery device is a turbine energy recovery device (Embodiment #167).

In some instances of any one of Embodiments #163-#167, the permeate side of the second reverse osmosis unit is fluidically connected to the first low pressure outlet of the first energy recovery device (Embodiment #168).

In some instances of any one of Embodiments #163-#168, the osmotic system is configured to combine a recirculation stream from a first portion of a first reverse osmosis unit retentate outlet stream exiting the outlet of the retentate side of the first reverse osmosis unit with the pressurized second energy recovery stream exiting the second high pressure outlet of the second energy recovery device (Embodiment #169).

In some instances of any one of Embodiments #163-#169, the pump inlet is fluidically connected to the second low pressure inlet of the second energy recovery device (Embodiment #170).

In some instances of any one of Embodiments #163-#170, the first low pressure inlet of the first energy recovery device is fluidically connected to an outlet of the retentate side of the first reverse osmosis unit (Embodiment #171).

In some instances of any one of Embodiments #163-#171, the pump is a first pump, and the system further comprises a second pump comprising a second pump inlet and a second pump outlet, wherein the second pump inlet is fluidically connected to the second high pressure outlet of the second energy recovery device and the second pump outlet is fluidically connected to the retentate side of the first reverse osmosis unit (Embodiment #172).

In some instances of any one of Embodiments #163-#172, the first reverse osmosis unit comprises a plurality of osmotic membranes (Embodiment #173).

In some instances of Embodiment #173, the plurality of osmotic membranes are connected in series (Embodiment #174).

In some instances of Embodiment #173, the plurality of osmotic membranes are connected in parallel (Embodiment #175).

In some instances of any one of Embodiments #163-#175, the second reverse osmosis unit comprises a plurality of osmotic membranes (Embodiment #176).

In some instances of Embodiment #176, the plurality of osmotic membranes are connected in series (Embodiment #177).

In some instances of Embodiment #176, the plurality of osmotic membranes are connected in parallel (Embodiment #178).

International Patent Application No. PCT/US2021/059441, filed Nov. 16, 2021, and entitled "Osmotic Methods and Systems Involving Energy Recovery," is incorporated herein by reference in its entirety for all purposes. U.S. Provisional Patent Application No. 63/114,643, filed Nov. 17, 2020, and entitled "Osmotic Methods and Systems Involving Balancing Streams," U.S. Provisional Patent Application No. 63/114,648, filed Nov. 17, 2020, and entitled "Osmotic Methods and Systems Involving Recirculation Streams," U.S. Provisional Patent Application No. 63/114,652, filed Nov. 17, 2020, and entitled "Osmotic Methods and Systems Involving Bypass Stream," and U.S. Provisional Patent Application No. 63/114,656, filed Nov. 17, 2020, and entitled "Osmotic Methods and Systems Involving Energy Recovery," are each incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

As used herein in the specification and in the claims, the phrase "at least a portion" means some or all. "At least a portion" may mean, in accordance with certain embodiments, at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, or more, and/or, in certain embodiments, up to 100 wt %.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    increasing a pressure of at least a portion of a feed stream comprising a solvent and a solute to form a pressurized feed stream;
    transporting a first reverse osmosis unit retentate inlet stream to a retentate side of a first reverse osmosis unit such that:
        a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and
        at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit;
    transporting a second reverse osmosis unit retentate inlet stream to a retentate side of a second reverse osmosis unit such that:
        a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and
        at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit;
    reducing a pressure of at least a portion of the second reverse osmosis unit retentate outlet stream to form a reduced-pressure concentrate stream; and
    using at least a portion of energy recovered from the reducing of the pressure of the at least a portion of the second reverse osmosis unit retentate outlet stream to increase a pressure of an energy recovery stream to form a pressurized energy recovery stream;
    wherein:
        the first reverse osmosis unit retentate inlet stream comprises at least a portion of the pressurized feed stream and at least a portion of the pressurized energy recovery stream;
        the second reverse osmosis unit retentate inlet stream comprises at least a portion of the first reverse osmosis unit retentate outlet stream;
        the energy recovery stream comprises at least a portion of the second reverse osmosis unit permeate outlet stream; and
        (a) the energy recovery stream comprises a balancing stream comprising at least a portion of the feed stream, or
        (b) the feed stream comprises a balancing stream comprising at least a portion of the second reverse osmosis unit permeate outlet stream.

2. The method of claim 1, wherein the energy recovery stream comprises a balancing stream comprising at least a portion of the feed stream.

3. The method of claim 1, further comprising discharging at least a portion of the reduced-pressure concentrate stream.

4. The method of claim 1, further comprising adjusting a mass flow rate of the second reverse osmosis unit permeate outlet stream and/or the balancing stream such that the energy recovery stream has a mass flow rate within 20% of a mass flow rate of the at least a portion of the second reverse osmosis unit retentate outlet stream.

5. The method of claim 1, wherein the first reverse osmosis unit retentate inlet stream comprises a recirculation stream comprising a first portion of the first reverse osmosis unit retentate outlet stream.

6. The method of claim 1, wherein the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device.

7. The method of claim 6, wherein the energy recovery device is an isobaric energy recovery device.

8. The method of claim 6, wherein the energy recovery device is a turbine energy recovery device.

9. A method, comprising:
    increasing a pressure of at least a portion of a feed stream comprising a solvent and a solute to form a pressurized feed stream;
    transporting a first reverse osmosis unit retentate inlet stream to a retentate side of a first reverse osmosis unit such that:
        a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and
        at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit;
    transporting a second reverse osmosis unit retentate inlet stream to a retentate side of a second reverse osmosis unit such that:
        a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and
        at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit;

reducing a pressure of at least a portion of the second reverse osmosis unit retentate outlet stream to form a reduced-pressure concentrate stream; and using at least a portion of energy recovered from the reducing of the pressure of the at least a portion of the second reverse osmosis unit retentate outlet stream to increase a pressure of an energy recovery stream to form a pressurized energy recovery stream;

wherein:
the first reverse osmosis unit retentate inlet stream comprises at least a portion of the pressurized feed stream, at least a portion of the pressurized energy recovery stream, and a recirculation stream comprising a first portion of the first reverse osmosis unit retentate outlet stream, wherein the recirculation stream is combined with the at least a portion of the pressurized energy recovery stream prior to incorporation into the first reverse osmosis unit retentate inlet stream;
the second reverse osmosis unit retentate inlet stream comprises a second portion of the first reverse osmosis unit retentate outlet stream; and
the energy recovery stream comprises at least a portion of the second reverse osmosis unit permeate outlet stream.

10. The method of claim 9, further comprising discharging at least a portion of the reduced-pressure concentrate stream.

11. The method of claim 9, further comprising increasing a pressure of the combination of the recirculation stream and the at least a portion of the pressurized energy recovery stream.

12. The method of claim 9, wherein the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device.

13. The method of claim 12, wherein the energy recovery device is an isobaric energy recovery device.

14. The method of claim 12, wherein the energy recovery device is a turbine energy recovery device.

15. The method of claim 9, wherein the energy recovery stream comprises a balancing stream comprising at least a portion of the feed stream.

16. The method of claim 15, further comprising adjusting a mass flow rate of the second reverse osmosis unit permeate outlet stream and/or the balancing stream such that the energy recovery stream has a mass flow rate within 20% of a mass flow rate of the at least a portion of the second reverse osmosis unit retentate outlet stream.

17. An osmotic system, comprising:
a pump comprising:
 a pump inlet, and
 a pump outlet, wherein the pump is configured to eject a pressurized stream from the pump outlet;
a first reverse osmosis unit comprising at least one osmotic membrane defining a permeate side of the first reverse osmosis unit and a retentate side of the first reverse osmosis unit;
a second reverse osmosis unit comprising at least one osmotic membrane defining a permeate side of the second reverse osmosis unit and a retentate side of the second reverse osmosis unit; and
an energy recovery device comprising:
 a high pressure inlet,
 a low pressure inlet,
 a high pressure outlet, and
 a low pressure outlet;
wherein:
the retentate side of the first reverse osmosis unit is fluidically connected to the pump outlet;
the retentate side of the first reverse osmosis unit is fluidically connected to the retentate side of the second reverse osmosis unit;
the retentate side of the second reverse osmosis unit is fluidically connected to the high pressure inlet of the energy recovery device;
the retentate side of the first reverse osmosis unit is fluidically connected to the high pressure outlet of the energy recovery device;
the permeate side of the second reverse osmosis unit is fluidically connected to the low pressure inlet of the energy recovery device; and
wherein the osmotic system is configured to combine a recirculation stream from a first portion of a first reverse osmosis unit retentate outlet stream exiting an outlet of the retentate side of the first reverse osmosis unit with a pressurized energy recovery stream exiting the high pressure outlet of the energy recovery device.

18. The osmotic system of claim 17, wherein the energy recovery device is an isobaric energy recovery device.

19. The osmotic system of claim 17, wherein the pump is a first pump, and the system further comprises a second pump comprising a second pump inlet and a second pump outlet, wherein the second pump inlet is fluidically connected to the high pressure outlet of the energy recovery device and the second pump outlet is fluidically connected to the retentate side of the first reverse osmosis unit.

20. The osmotic system of claim 17, wherein the first reverse osmosis unit comprises a plurality of osmotic membranes.

21. The osmotic system of claim 17, wherein the second reverse osmosis unit comprises a plurality of osmotic membranes.

22. A method, comprising:
increasing a pressure of at least a portion of a feed stream comprising a solvent and a solute to form a pressurized feed stream;
transporting a first reverse osmosis unit retentate inlet stream to a retentate side of a first reverse osmosis unit such that:
a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and
at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit;

transporting a second reverse osmosis unit retentate inlet stream to a retentate side of a second reverse osmosis unit such that:
   a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and
   at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit;
reducing a pressure of at least a portion of the second reverse osmosis unit retentate outlet stream to form a reduced-pressure concentrate stream; and
using at least a portion of energy recovered from the reducing of the pressure of the at least a portion of the second reverse osmosis unit retentate outlet stream to increase a pressure of an energy recovery stream to form a pressurized energy recovery stream;
wherein:
   the first reverse osmosis unit retentate inlet stream comprises at least a portion of the pressurized energy recovery stream;
   the energy recovery stream comprises at least a portion of the pressurized feed stream and a recirculation stream comprising a first portion of the first reverse osmosis unit retentate outlet stream;
   the second reverse osmosis unit retentate inlet stream comprises a second portion of the first reverse osmosis unit retentate outlet stream; and
   the feed stream comprises at least a portion of the second reverse osmosis unit permeate outlet stream.

23. The method of claim 22, further comprising discharging at least a portion of the reduced-pressure concentrate stream.

24. The method of claim 22, wherein the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device.

25. The method of claim 24, wherein the energy recovery device is a turbine energy recovery device.

26. The method of claim 22, further comprising adjusting a mass flow rate of the second reverse osmosis unit permeate outlet stream such that the energy recovery stream has a mass flow rate within 20% of a mass flow rate of the at least a portion of the second reverse osmosis unit retentate outlet stream.

27. A method, comprising:
increasing, during a first period of time and a second period of time, a pressure of at least a portion of a feed stream comprising a solvent and a solute to form a pressurized feed stream;
transporting, during the first period of time and the second period of time, a first reverse osmosis unit retentate inlet stream to a retentate side of a first reverse osmosis unit such that:
   a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and
   at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit;
transporting, during at least the first period of time, a second reverse osmosis unit retentate inlet stream to a retentate side of a second reverse osmosis unit such that:
   a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and
   at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit;
reducing, during the first period of time and the second period of time, a pressure of a concentrate stream to form a reduced-pressure concentrate stream; and
using, during the first period of time and the second period of time, at least a portion of energy recovered from the reducing of the pressure of the concentrate stream to increase a pressure of an energy recovery stream to form a pressurized energy recovery stream;
wherein:
   during at least the first period of time:
     the second reverse osmosis unit retentate inlet stream comprises at least a portion of the first reverse osmosis unit retentate outlet stream;
     the energy recovery stream comprises at least a portion of the second reverse osmosis unit permeate outlet stream; and
     the concentrate stream comprises at least a portion of the second reverse osmosis unit retentate outlet stream;
   during at least the second period of time:
     the retentate side of the second reverse osmosis unit does not receive any portion of the first reverse osmosis unit retentate outlet stream or receives an amount of the first reverse osmosis unit retentate outlet stream that is at least 80 wt % less than an amount of the first reverse osmosis unit retentate outlet stream received by the retentate side of the second reverse osmosis unit during the first period of time, and the permeate side of the second reverse osmosis unit does not receive any portion of the reduced-pressure concentrate stream or receives an amount of the reduced-pressure concentrate stream that is at least 80 wt % less than an amount of the reduced-pressure concentrate stream received by the permeate side of the second reverse osmosis unit during the first period of time; and the concentrate stream comprises at least a portion of a bypass stream comprising at least a portion of the first reverse osmosis unit retentate outlet stream; and during both the first period of time and the second period of time:

the first reverse osmosis unit retentate inlet stream comprises at least a portion of the pressurized feed stream and at least a portion of the pressurized energy recovery stream.

28. The method of claim 27, wherein the concentrate stream does not comprise the at least a portion of the bypass stream during the first period of time.

29. The method of claim 27, wherein, during at least the second period of time, the energy recovery stream comprises a balancing stream comprising at least a portion of the feed stream.

30. The method of claim 29, wherein the energy recovery stream does not comprise the balancing stream comprising at least a portion of the feed stream during the first period of time.

31. The method of claim 27, further comprising discharging at least a portion of the reduced-pressure concentrate stream.

32. The method of claim 27, further comprising discharging a portion of the bypass stream via a bypass discharge stream.

33. The method of claim 32, further comprising adjusting a mass flow rate of the bypass stream and/or a mass flow rate of the bypass discharge stream such that a mass flow rate of the concentrate stream is within 20% of a mass flow rate of the energy recovery stream.

34. The method of claim 27, further comprising combining a portion of the bypass stream with the reduced-pressure concentrate stream via a bypass discharge stream.

35. The method of claim 27, further comprising adjusting a mass flow rate of the second reverse osmosis unit permeate outlet stream and/or the balancing stream such that the energy recovery stream has a mass flow rate within 20% of a mass flow rate of the at least a portion of the second reverse osmosis unit retentate outlet stream.

36. The method of claim 27, wherein the first reverse osmosis unit retentate inlet stream comprises a recirculation stream comprising a first portion of the first reverse osmosis unit retentate outlet stream.

37. The method of claim 27, wherein the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device.

38. The method of claim 37, wherein the energy recovery device is an isobaric energy recovery device.

39. A method, comprising:

increasing, during a first period of time and a second period of time, a pressure of at least a portion of a feed stream comprising a solvent and a solute to form a pressurized feed stream;

transporting, during the first period of time and the second period of time, a first reverse osmosis unit retentate inlet stream to a retentate side of a first reverse osmosis unit such that:

a first reverse osmosis unit retentate outlet stream exits the retentate side of the first reverse osmosis unit, the first reverse osmosis unit retentate outlet stream having an osmotic pressure that is greater than an osmotic pressure of the first reverse osmosis unit retentate inlet stream, and at least a portion of liquid from the first reverse osmosis unit retentate inlet stream is transported from the retentate side of the first reverse osmosis unit, through an osmotic membrane of the first reverse osmosis unit, to a permeate side of the first reverse osmosis unit;

transporting, during at least the first period of time, a second reverse osmosis unit retentate inlet stream to a retentate side of a second reverse osmosis unit such that:

a second reverse osmosis unit retentate outlet stream exits the retentate side of the second reverse osmosis unit, the second reverse osmosis unit retentate outlet stream having an osmotic pressure that is greater than an osmotic pressure of the second reverse osmosis unit retentate inlet stream, and at least a portion of liquid from the second reverse osmosis unit retentate inlet stream is transported from the retentate side of the second reverse osmosis unit, through an osmotic membrane of the second reverse osmosis unit, to a permeate side of the second reverse osmosis unit where the portion of the liquid forms some or all of a second reverse osmosis unit permeate outlet stream that is transported out of the permeate side of the second reverse osmosis unit;

reducing, during the first period of time and the second period of time, a pressure of a concentrate stream to form a reduced-pressure concentrate stream; and using, during the first period of time and the second period of time, at least a portion of energy recovered from the reducing of the pressure of the concentrate stream to increase a pressure of an energy recovery stream to form a pressurized energy recovery stream;

wherein:

during at least the first period of time:

the second reverse osmosis unit retentate inlet stream comprises at least a portion of the first reverse osmosis unit retentate outlet stream; and the concentrate stream comprises at least a portion of the second reverse osmosis unit retentate outlet stream;

during at least the second period of time:

the retentate side of the second reverse osmosis unit does not receive any portion of the first reverse osmosis unit retentate outlet stream or receives an amount of the first reverse osmosis unit retentate outlet stream that is at least 80 wt % less than an amount of the first reverse osmosis unit retentate outlet stream received by the retentate side of the second reverse osmosis unit during the first period of time, and the permeate side of the second reverse osmosis unit does not receive any portion of the reduced-pressure concentrate stream or receives an amount of the reduced-pressure concentrate stream that is at least 80 wt % less than an amount of the reduced-pressure concentrate stream received by the permeate side of the second reverse osmosis unit during the first period of time; and the concentrate stream comprises at least a portion of a bypass stream comprising at least a portion of the first reverse osmosis unit retentate outlet stream; and during both the first period of time and the second period of time:
the energy recovery stream comprises at least a portion of the pressurized feed stream; and
the first reverse osmosis unit retentate inlet stream comprises at least a portion of the pressurized energy recovery stream.

40. The method of claim 39, wherein the concentrate stream comprises the at least a portion of the bypass stream during the first period of time.

41. The method of claim 39, wherein the concentrate stream does not comprise the at least a portion of the bypass stream during the first period of time.

42. The method of claim 39, wherein the feed stream comprises at least a portion of the second reverse osmosis unit permeate outlet stream.

43. The method of claim 39, further comprising discharging at least a portion of the reduced-pressure concentrate stream.

44. The method of claim 39, further comprising increasing a pressure of the pressurized energy recovery stream with a pump.

45. The method of claim 39, further comprising discharging a portion of the bypass stream via a bypass discharge stream.

46. The method of claim 45, further comprising adjusting a mass flow rate of the bypass stream and/or a mass flow rate of the bypass discharge stream such that a mass flow rate of the concentrate stream is within 20% of a mass flow rate of the energy recovery stream.

47. The method of claim 39, further comprising combining a portion of the bypass stream with the reduced-pressure concentrate stream via a bypass discharge stream.

48. The method of claim 39, wherein the energy recovery stream comprises a recirculation stream comprising a first portion of the first reverse osmosis unit retentate outlet stream.

49. The method of claim 39, wherein the step of using at least a portion of energy recovered from the reducing of the pressure of the at least a portion of the second reverse osmosis unit retentate outlet stream to increase a pressure of an energy recovery stream to form a pressurized energy recovery stream is performed using an energy recovery device.

50. The method of claim 49, wherein the energy recovery device is an isobaric energy recovery device.

51. The method of claim 49, wherein the energy recovery device is a turbine energy recovery device.

* * * * *